US011350371B2

(12) United States Patent
Itagaki et al.

(10) Patent No.: US 11,350,371 B2
(45) Date of Patent: May 31, 2022

(54) COMMUNICATION CONTROL APPARATUS, COMMUNICATION APPARATUS, COMMUNICATION CONTROL METHOD, COMMUNICATION METHOD, AND PROGRAM WHICH USE UPLINK MULTIPLEX COMMUNICATION

(71) Applicant: SONY CORPORATION, Tokyo (JP)

(72) Inventors: Takeshi Itagaki, Saitama (JP); Tomoya Yamaura, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/548,246

(22) PCT Filed: Dec. 8, 2015

(86) PCT No.: PCT/JP2015/084415
§ 371 (c)(1),
(2) Date: Aug. 2, 2017

(87) PCT Pub. No.: WO2016/143209
PCT Pub. Date: Sep. 15, 2016

(65) Prior Publication Data
US 2018/0020411 A1 Jan. 18, 2018

(30) Foreign Application Priority Data
Mar. 6, 2015 (JP) .............................. JP2015-045002

(51) Int. Cl.
*H04W 52/24* (2009.01)
*H04W 52/08* (2009.01)
(Continued)

(52) U.S. Cl.
CPC ......... *H04W 52/242* (2013.01); *H04W 52/08* (2013.01); *H04W 52/146* (2013.01);
(Continued)

(58) Field of Classification Search
CPC .................................................. H04W 52/242
(Continued)

(56) References Cited

U.S. PATENT DOCUMENTS

| 6,594,251 B1 | 7/2003 | Raissinia et al. |
| 2007/0054690 A1 | 3/2007 | Wu et al. |

(Continued)

FOREIGN PATENT DOCUMENTS

| JP | 2007-504703 A | 3/2007 |
| JP | 2009-100452 A | 5/2009 |

(Continued)

OTHER PUBLICATIONS

International Search Report dated Mar. 1, 2016 in PCT/JP2015/084415 filed Dec. 8, 2015.

(Continued)

*Primary Examiner* — Jeffrey M Rutkowski
*Assistant Examiner* — Luna Weissberger
(74) *Attorney, Agent, or Firm* — Xsensus LLP

(57) ABSTRACT

A communication control apparatus includes: a control unit configured to decide transmission power for multiplex communication in a wireless local area network (WLAN) on the basis of information obtained through reception from another communication apparatus; a processing unit configured to generate a frame including transmission power information indicating the transmission power for the multiplex communication decided by the control unit; and a communication unit configured to transmit the frame generated by the processing unit to the other communication apparatus. The communication control apparatus, communication apparatus, communication control method, communication method, and program can suppress deterioration in reception characteristics of a multiplexed frame in a wireless LAN.

14 Claims, 30 Drawing Sheets

(51) Int. Cl.
  *H04W 52/14* (2009.01)
  *H04W 52/28* (2009.01)
  *H04W 52/36* (2009.01)
  *H04W 84/12* (2009.01)

(52) U.S. Cl.
  CPC ......... *H04W 52/283* (2013.01); *H04W 84/12* (2013.01); *H04W 52/36* (2013.01)

(58) Field of Classification Search
  USPC ..................................................... 370/338
  See application file for complete search history.

(56) References Cited

U.S. PATENT DOCUMENTS

| | | | |
|---|---|---|---|
| 2008/0009306 A1* | 1/2008 | Suga | H04W 52/10 455/522 |
| 2009/0088083 A1 | 4/2009 | Fujii et al. | |
| 2011/0077044 A1* | 3/2011 | Sampath | H04W 52/247 455/522 |
| 2011/0111766 A1* | 5/2011 | Yang | H04W 52/247 455/452.2 |
| 2011/0319119 A1 | 12/2011 | Ishii | |
| 2012/0122392 A1* | 5/2012 | Morioka | H04B 7/0695 455/25 |
| 2013/0286955 A1 | 10/2013 | Morinaga et al. | |
| 2014/0126403 A1* | 5/2014 | Siomina | H04J 11/005 370/252 |
| 2015/0063320 A1* | 3/2015 | Merlin | H04L 1/1621 370/336 |
| 2015/0098392 A1* | 4/2015 | Homchaudhuri | H04W 48/20 370/329 |
| 2015/0288427 A1* | 10/2015 | Wang | H04W 72/1273 370/329 |
| 2015/0319700 A1* | 11/2015 | Oteri | H04W 52/28 455/127.1 |
| 2016/0044711 A1* | 2/2016 | Lou | H04W 74/0816 370/338 |
| 2016/0119881 A1* | 4/2016 | Merlin | H04W 52/10 370/328 |
| 2016/0302156 A1* | 10/2016 | Choi | H04W 52/146 |
| 2016/0374085 A1* | 12/2016 | Chun | H04W 52/146 |
| 2017/0078107 A1* | 3/2017 | Itagaki | H04L 1/18 |

FOREIGN PATENT DOCUMENTS

| | | |
|---|---|---|
| JP | 2009-272941 A | 11/2009 |
| JP | 2010-171931 A | 8/2010 |
| JP | 2010-263490 A | 11/2010 |
| JP | 2010-263493 A | 11/2010 |
| JP | 2012531829 A | 12/2012 |
| WO | 2006/085365 A1 | 8/2006 |
| WO | 2010032385 A1 | 3/2010 |
| WO | 2012-39225 A | 2/2012 |
| WO | 2015000304 A1 | 1/2015 |

OTHER PUBLICATIONS

Search Report and Written Opinion issued in Singaporean Application 11201705883P dated Jun. 26, 2018.
Extended European Search Report dated Sep. 20, 2018, issued in European Patent Application No. 15884693.1.
Notification of Reasons for Refusal dated Feb. 12, 2020, issued in corresponding Japanese Patent Application No. 2017-504568, 12 pages, with English Translation.
Communication pursuant to Article 94(3) EPC issued in European Application 15 884 693.1-1219 dated Oct. 25, 2019.
IEEE Standards Association, "IEEE Standard for WirelessMAN-Advanced Air Interface for Broadband Wireless Access Systems", IEEE Std 802.16.1-2012, 1090 Pages total, (Sep. 7, 2012).

* cited by examiner

COMMUNICATION CONTROL APPARATUS, COMMUNICATION APPARATUS, COMMUNICATION CONTROL METHOD, COMMUNICATION METHOD, AND PROGRAM WHICH USE UPLINK MULTIPLEX COMMUNICATION

TECHNICAL FIELD

The present disclosure relates to a communication control apparatus, a communication apparatus, a communication control method, a communication method, and a program.

BACKGROUND ART

Wireless local area networks (WLANs), typified by IEEE (Institute of Electrical and Electronics Engineers) 802.11, have in recent years been widespread, leading to an increase in the information amount of transmitted contents and the number of wireless LAN-capable products. Therefore, to improve the efficiency of communication over an entire network, the standard IEEE 802.11 is still being enhanced.

In the 802.11ac standard, which is an example enhanced version of the standard IEEE 802.11, multi-user multi-input multi-output (MU-MIMO) is employed for a downlink (DL). MU-MIMO is a technique for allowing transmission of a plurality of signals during the same period of time through space-division multiplexing. The technique can improve the efficiency of use of frequencies, for example.

However, different communication apparatuses may transmit frames during different transmission time periods. In this case, the number of multiplexed frames fluctuates during a period of time when the frames are received. Therefore, the reception power of a communication apparatus that receives multiplexed frames fluctuates during the reception time period. The fluctuation of the reception power may have an influence on the performance of reception. To address this problem, a technique of transmitting frames during equal transmission time periods has been proposed.

For example, Patent Literature 1 describes a communication apparatus that appropriately adds a padding to a plurality of frames having different transmission time periods and thereby transmits the plurality of frames during equal transmission time periods.

In addition, Patent Literature 2 describes a communication method in which a communication apparatus serving as an access point (AP) transmits uplink (UL) permission information designating a transmission time period of a UL frame and a communication apparatus receiving the UL permission information transmits a UL frame over the designated transmission time period.

CITATION LIST

Patent Literature

Patent Literature 1: JP 2010-263490A
Patent Literature 2: JP 2010-263493A

DISCLOSURE OF INVENTION

Technical Problem

In the inventions disclosed in Patent Literatures 1 and 2, reception characteristics of multiplexed frames deteriorate in some cases. For example, when reception signal strengths of frames received from communication apparatuses performing multiplex communication are different and signals are amplified in accordance with a reception signal strength of a frame to be transmitted from a certain communication apparatus, a reception signal of a frame to be transmitted from another communication apparatus different from the certain communication apparatus may be saturated. A reception signal involved in the other communication apparatus is relatively compressed with respect to a reception signal involved in the certain communication apparatus. As a result, it may be difficult to receive a frame transmitted from the other communication apparatus.

Accordingly, the present disclosure proposes a novel and improved communication control apparatus, a novel and improved communication apparatus, a novel and improved communication control method, a novel and improved communication method, and a novel and improved program capable of suppressing deterioration in reception characteristics of a multiplexed frame in a wireless LAN.

Solution to Problem

According to the present disclosure, there is provided a communication control apparatus including: a control unit configured to decide transmission power for multiplex communication in a wireless local area network (WLAN) on the basis of information obtained through reception from another communication apparatus; a processing unit configured to generate a frame including transmission power information indicating the transmission power for the multiplex communication decided by the control unit; and a communication unit configured to transmit the frame generated by the processing unit to the other communication apparatus.

In addition, according to the present disclosure, there is provided a communication apparatus including: a control unit configured to set transmission power of the own apparatus on the basis of transmission power information indicating transmission power for multiplex communication in a wireless local area network (WLAN) decided on the basis of information obtained through reception from the communication apparatus; and a communication unit configured to receive a frame including the transmission power information and transmit a frame with the transmission power set by the control unit.

In addition, according to the present disclosure, there is provided a communication control method including: deciding, by a control unit, transmission power for multiplex communication in a wireless local area network (WLAN) on the basis of information obtained through reception from another communication apparatus; generating a frame including transmission power information indicating the decided transmission power for the multiplex communication; and transmitting the generated frame to the other communication apparatus.

In addition, according to the present disclosure, there is provided a communication method including: receiving, by a communication unit, a frame including the transmission power information indicating transmission power of multiplex communication in a wireless local area network (WLAN); setting transmission power of an own apparatus on the basis of the transmission power information decided on the basis of information obtained through reception from a communication apparatus; and transmitting a frame with the set transmission power.

In addition, according to the present disclosure, there is provided a program causing a computer to realize: a control function of deciding transmission power for multiplex communication in a wireless local area network (WLAN) on the basis of information obtained through reception from another communication apparatus; a processing function of generating a frame including transmission power information indicating the transmission power for the multiplex communication decided through the control function; and a communication function of transmitting the frame generated by the processing function to the other communication apparatus.

In addition, according to the present disclosure, there is provided a program causing a computer to realize: a communication function of receiving a frame including transmission power information indicating transmission power for multiplex communication in a wireless local area network (WLAN); a control function of setting transmission power of an own apparatus on the basis of the transmission power information decided on the basis of information obtained through reception from a communication apparatus; and a communication function of transmitting a frame with the set transmission power.

Advantageous Effects of Invention

As described above, the present disclosure provides a novel and improved communication control apparatus, a novel and improved communication apparatus, a novel and improved communication control method, a novel and improved communication method, and a novel and improved program capable of suppressing deterioration in reception characteristics of a multiplexed frame in a wireless LAN. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
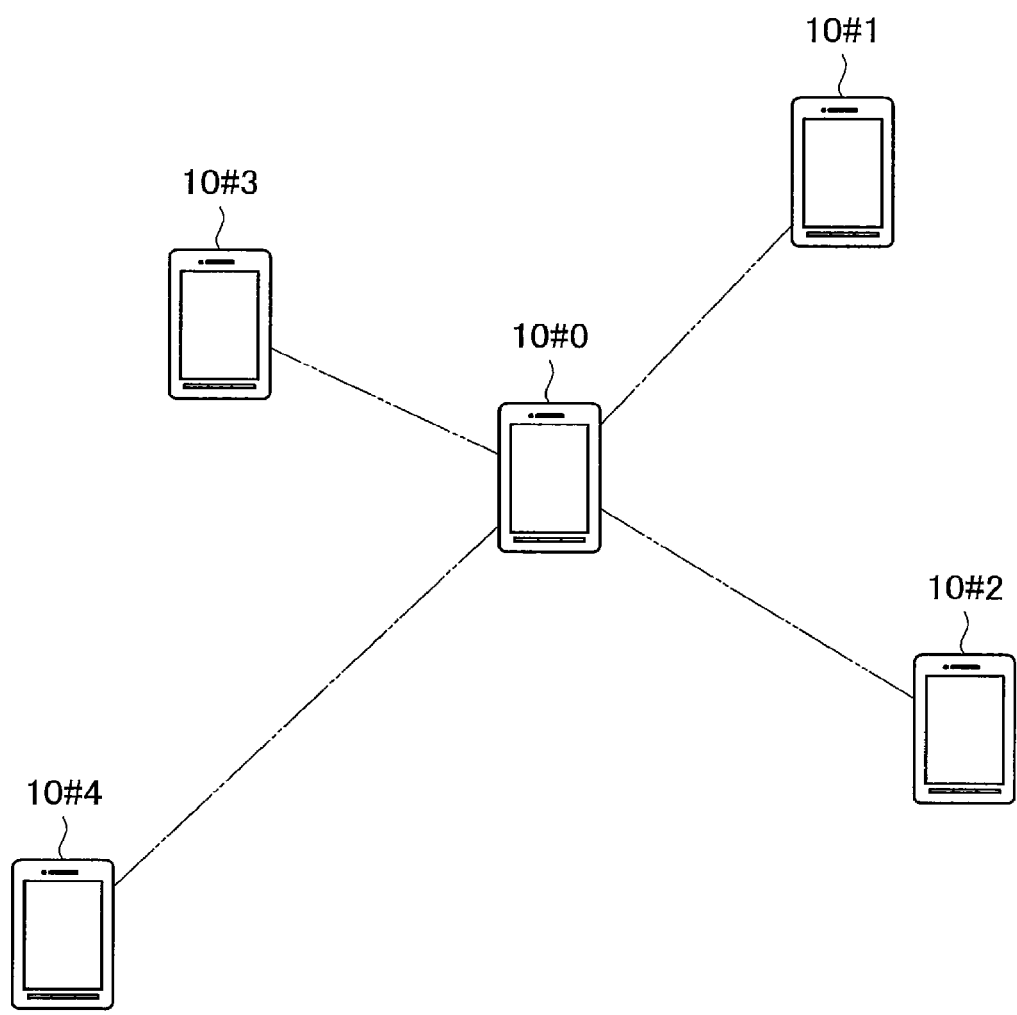
FIG. 1 is a diagram exemplifying a communication system configured to include communication apparatuses according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description will be made in the following order.
1. Overview of communication system according to embodiment of present disclosure
2. First embodiment (example in which transmission power is notified of with space division multiplexing frame)
3. Second embodiment (example in which transmission power is notified of with frequency division multiplexing frame)
4. Third embodiment (example in which transmission power is notified with aggregation frame)
5. Fourth embodiment (example in which transmission power is notified with poll frame)
6. Fifth embodiment (example in which transmission power for channel estimation is shared in advance)
7. Sixth embodiment (example in which length of transmission period of frame is adjusted)
8. Application examples
9. Conclusion

1. OVERVIEW OF COMMUNICATION SYSTEM ACCORDING TO EMBODIMENT OF PRESENT DISCLOSURE

First, an overview of a communication control apparatus and a communication apparatus according to an embodiment of the present disclosure will be described with reference to FIG. 1. FIG. 1 is a diagram exemplifying a communication system configured to include a communication control apparatus and communication apparatuses according to an embodiment of the present disclosure. Also, hereinafter, the communication control apparatus and the communication apparatus are collectively referred to as a communication apparatus.

The communication system is configured to include a plurality of communication apparatuses 10. The communication apparatus 10 has a wireless communication function and performs communication using multiplexing. In addition, the communication apparatus 10 operates as an AP, that is, a communication control apparatus and operates as a terminal. Hereinafter, the communication apparatus operating as an AP is also referred to as a master station and the communication apparatus operating as a terminal is also referred to as a slave apparatus. Therefore, in the communication system, one-to-many communication using multiplexing can be performed between the master station and slave apparatuses. Also, communication from a master station to a slave apparatus is also referred to as downlink (DL) communication and communication from a slave apparatus to a master station is also referred to as uplink (UL) communication.

For example, as shown in FIG. 1, the communication system includes a plurality of communication apparatuses 10 #0 to 10 #4. The communication apparatus 10 #0 which is a master station and the communication apparatuses 10 #1 to 10 #4 which are slave apparatuses are connected through wireless communication and directly transmit and receive frames to and from each other. For example, the master station 10 #0 is a communication apparatus conforming to IEEE 802.11ac and perform space division multiple access (SDMA) by adaptive array antennas.

Here, in multiplex communication, reception performance for multiplexed frames deteriorates in some cases depending on a reception mode of the multiplexed frames. For example, when transmission periods of multiplexed frames are different between the frames, reception power of the frames is steeply changed, and thus reception performance can deteriorate.

On the other hand, unformizing the transmission periods of the multiplexed frames can be considered. However, even when the transmission periods are uniformized, the reception performance can deteriorate when there is a variation in reception signal strengths involved in the multiplexed frames.

For example, a case in which frames transmitted with the same transmission power are multiplexed in a certain slave station and a slave station located further away from a master station than the certain slave station is assumed. In this case, when a signal is amplified in the master station in accordance with a reception signal strength of a frame received from the former slave station (hereinafter also referred to as a reception signal strength involved in the slave station), a received signal involved in the latter slave station is relatively compressed with respect to a received signal involved in the former slave station and reception characteristics of the compressed received signal deteriorate due to an influence of quantization noise. In addition, when a signal is amplified in the master station in accordance with the reception signal intensity involved in the latter slave station, a received signal involved in the former slave station is saturated and a frame transmitted from the former slave station may not be received normally.

Accordingly, the present disclosure proposes a communication apparatus capable of suppressing deterioration in reception characteristics of a multiplexed frame in a wireless LAN. Hereinafter, the details will be described. Also, in FIG. 1, an example in which the communication apparatus 10 #0 is the master station will be described as an example of the communication system. Another communication apparatus 10 may be a master station or the communication apparatus 10 #0 may be a communication apparatus that has a plurality of direct links with other communication apparatuses 10 #1 to 10 #4. Also, in the latter case, the above-described DL can be replaced with "simultaneous transmission from one apparatus to a plurality of apparatuses" and the above-described UL can be replaced with "simultaneous transmission from a plurality of apparatuses to one apparatus." To facilitate the description, the communication apparatuses 10 according to the first to third embodiments are distinguished from each other by suffixing numbers corresponding to the embodiments like the communication apparatuses 10-1 and 10-2.

2. FIRST EMBODIMENT (EXAMPLE IN WHICH TRANSMISSION POWER IS NOTIFIED OF WITH SPACE DIVISION MULTIPLEXING FRAME)

The overview of the communication apparatuses according to the present embodiment of the present disclosure has been described above. Next, the communication apparatus 10-1 according to a first embodiment of the present disclosure will be described. In the first embodiment, a space division multiplex scheme is used for DL communication and UL communication.

2-1. Configuration of Apparatus

First, a configuration of the communication apparatus 10-1 according to the first embodiment of the present disclosure will be described with reference to FIG. 2. FIG.

2 is a block diagram showing a schematic functional configuration of the communication apparatus 10-1 according to the first embodiment of the present disclosure.

Figure 2:
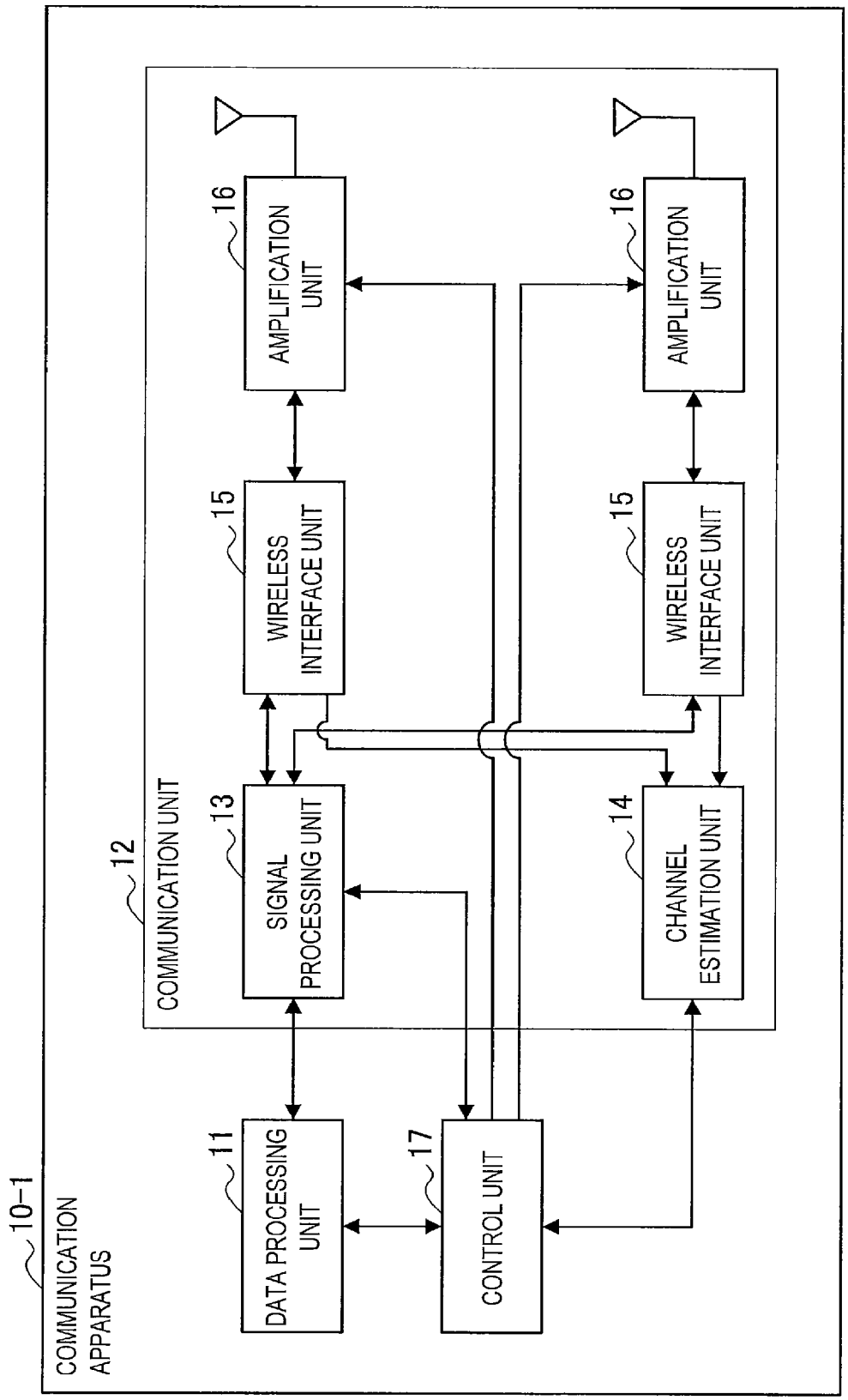
FIG. 2 is a block diagram showing a schematic functional configuration of a communication apparatus according to a first embodiment of the present disclosure.

As shown in FIG. 2, the communication apparatus 10-1 includes a data processing unit 11, a communication unit 12, and a control unit 17. First, a basic function of the communication apparatus 10-1 will be described.

((Basic Function))

The data processing unit 11 performs a process of transmitting and receiving data. Specifically, the data processing unit 11 generates a frame on the basis of data from a higher communication layer and supplies the generated frame to a signal processing unit 13 to be described below. For example, the data processing unit 11 generates a frame (or a packet) from the data and performs processes of adding a header and adding an error detection code to the generated frame. In addition, the data processing unit 11 extracts data from the received frame and supplies the extracted data to the higher communication layer. For example, the data processing unit 11 acquires data by performing header analysis, code error detection and correction, a reordering process, and the like on the received frame.

As shown in FIG. 2, the communication unit 12 includes the signal processing unit 13, a channel estimation unit 14, wireless interface units 15, and amplification units 16. Also, although not shown, a power supply such as a fixed power supply or a battery is installed in the communication apparatus 10-1.

The signal processing unit 13 performs a modulation process or the like on a frame. Specifically, the signal processing unit 13 generates a symbol stream by performing encoding, interleaving, and modulation on the frame supplied from the data processing unit 11 in conformity to coding and modulation schemes or the like set by the control unit 17. In addition, the signal processing unit 13 acquires a frame by performing demodulation, decoding, and the like on a symbol stream obtained through a spatial process and supplies the acquired frame to the data processing unit 11 or the control unit 17.

Further, the signal processing unit 13 performs a process involved in space-division multiplex communication. Specifically, the signal processing unit 13 performs a signal process involved in space separation, on a symbol stream generated, and provides symbol streams obtained by the process to the respective wireless interface units 15. The signal processing unit 13 also performs a spatial process, such as a symbol stream separation process or the like, on symbol streams obtained from the wireless interface units 15.

The channel estimation unit 14 estimates a channel gain. Specifically, the channel estimation unit 14 calculates complex channel gain information from a preamble part or reference signal part for training of a signal contained in the symbol stream obtained from the wireless interface unit 15. Note that the calculated complex channel gain information is provided to the signal processing unit 13 through the control unit 17, and is used in a demodulation process and a space separation process or the like.

The wireless interface unit 15 generates a signal transmitted and received via an antenna. Specifically, the wireless interface unit 15 converts a signal involved in the symbol stream supplied from the signal processing unit 13 into an analog signal and performs filtering and frequency up-conversion. Then, the wireless interface unit 15 supplies the obtained signal to the amplification unit 16. In addition, the wireless interface unit 15 performs processes reverse to processes at the time of signal transmission, for example, frequency down-conversion and digital signal conversion, on the signal obtained from the amplification unit 16 and supplies a signal obtained through the processes to the channel estimation unit 14 and the signal processing unit 13. Also, the plurality of wireless interface units 15 may not be included.

The amplification unit 16 amplifies a signal. Specifically, the amplification unit 16 amplifies the analog signal supplied from the wireless interface unit 15 up to predetermined power and transmits a signal obtained through the amplification via an antenna. In addition, the amplification unit 16 amplifies a signal involved in radio waves received via the antenna up to predetermined power and supplies a signal obtained through the amplification to the wireless interface unit 15. For example, the amplification unit 16 can be a power amplifier module. Also, one or both of a function of amplifying transmission radio waves and a function of amplifying received radio waves in the amplification unit 16 may be embedded in the wireless interface unit 15.

Also, hereinafter, the signal processing unit 13, the channel estimation unit 14, the wireless interface unit 15, and the amplification unit 16 are also collectively referred to as the communication unit 12.

The control unit 17 controls an overall operation of the communication apparatus 10-1. Specifically, the control unit 17 exchanges information between functions and performs processes such as setting of communication parameters and scheduling of frames (or packets) in the data processing unit 11.

((Functions when Communication Apparatus Operates as Master Station))

Next, functions when the communication apparatus 10-1 operates as the master station will be described in detail.

(Function of Acquiring Transmission Power Setting Range)

The control unit 17 retains a settable range of transmission power of a slave station to be notified of (hereinafter also referred to as a transmission power setting range). Specifically, when a frame including information indicating the transmission power setting range (hereafter also referred to as transmission power range information) is received, the control unit 17 stores the transmission power range information acquired from the frame in a separately included storage unit.

When the frame including the transmission power range information is received from the slave station, the data processing unit 11 acquires the transmission power range information from the frame and supplies the acquired transmission power range information to the control unit 17.

Figure 3:
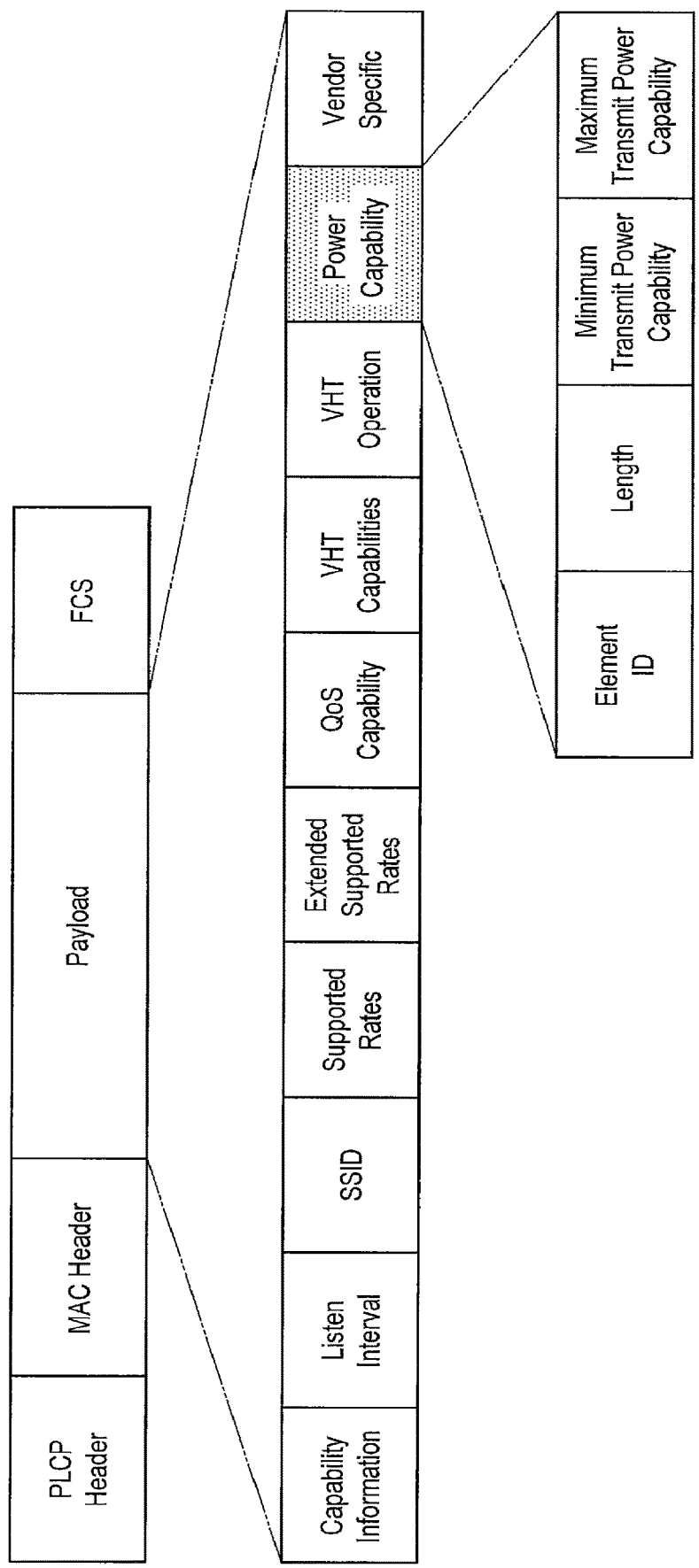
FIG. 3 is a diagram showing a configuration example of a frame including transmission power range information according to the present embodiment.

The communication unit 12 receives the frame including the transmission power range information from the slave station. Specifically, when communication connection with the slave station is established, the communication unit 12 receives the frame including the transmission power range information from the slave station. For example, the frame including the transmission power range information used at the time of the communication connection can be an association request frame. Further, a configuration of the frame including the transmission power range information will be described with reference to FIG. 3. FIG. 3 is a diagram showing a configuration example of the frame including the transmission power range information according to the present embodiment.

As shown in FIG. 3, the association request frame includes a PLCP header, a MAC header, a payload, and a frame check sequence (FCS). Also, in the MAC header, a frame type of an "association request" indicating that the frame is an association request frame is stored. Further, the payload has a field group shown in FIG. 3. Then, in the field group, a power capability includes an element ID, a length, and a minimum transmit power capability (hereinafter also referred to minimum transmission power) and a maximum transmit power capability (hereinafter also referred to as maximum transmission power) serving as the transmission power range information. In the minimum transmission power and the maximum transmission power, a minimum value and a maximum value of transmission power settable in a slave station are stored.

Also, when a range of the transmission power is specified, the transmission power range information may be information with a different format from the foregoing format. For example, the transmission power range information may be a pair of a specific value of the transmission power and a variable width of the specific value.

Figure 4:
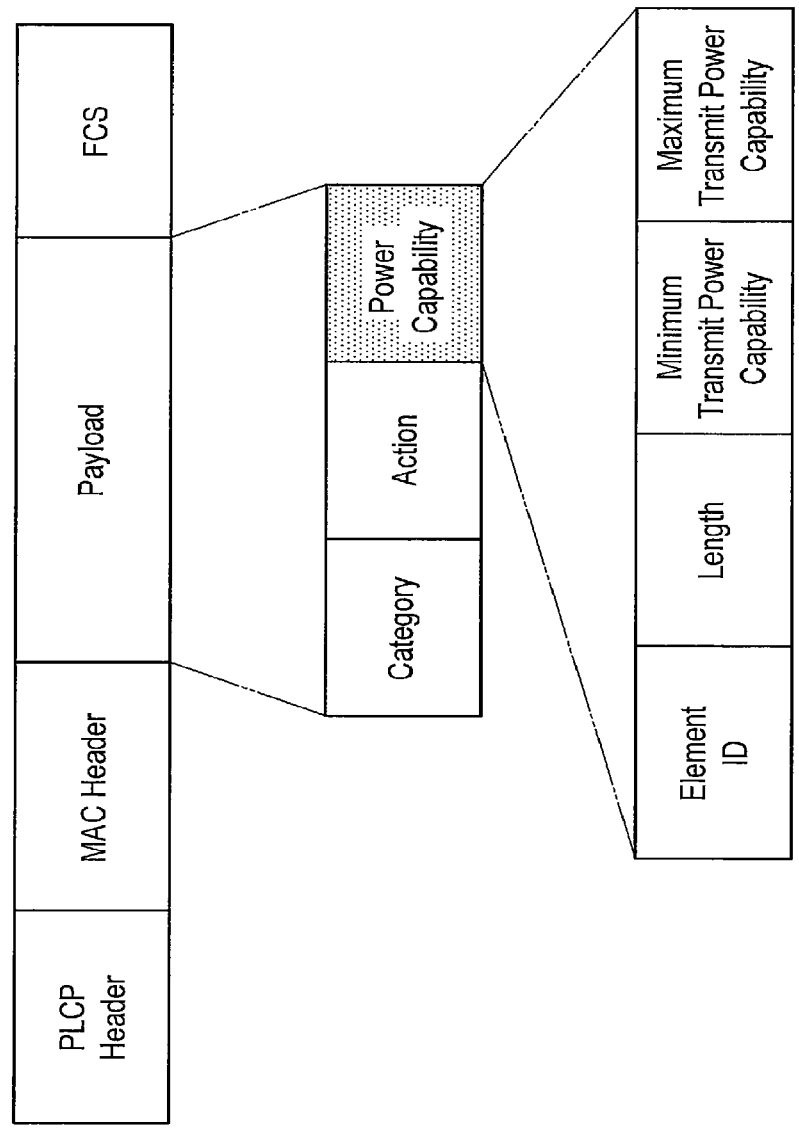
FIG. 4 is a diagram showing another configuration example of the frame including the transmission power range information according to the present embodiment.

In addition, the example in which the frame including the transmission power range information is a frame transmitted at the time of establishing the communication connection has been described above. However, the frame including the transmission power range information may be any other frame. For example, the frame including the transmission power range information can be an action frame transmitted when a slave station performs a power saving operation. Further, an example in which the frame including the transmission power range information is an action frame will be described with reference to FIG. 4. FIG. 4 is a diagram showing another configuration example of the frame including transmission power range information according to the present embodiment.

As shown in FIG. 4, the action frame includes a PLCP header, a MAC header, a payload, and FCS as in the association request frame. Also, in the MAC header, a frame type of "action" indicating that the frame is an action frame is stored. Further, the payload has a field group shown in FIG. 4. Also, in a category, "transmit power control (TPC)" indicating TPC data is stored. In the action, a "notify range" indicating that data stored in a power capability is range information is stored. Then, in the field group, the power capability includes an element ID, a length, and a minimum transmit power capability and a maximum transmit power capability serving as the transmission power range information.

Also, the example in which the transmission power range information is spontaneously transmitted from the slave station has been described above. However, the master station may request the transmission power range information from the slave station.

(Function of Acquiring Channel Information)

The control unit 17 acquires channel information for space multiplex communication. Specifically, the control unit 17 causes the data processing unit 11 to generate a frame for requesting a reference signal for training (hereinafter also referred to as a training request (TRQ) frame) as a first frame and causes the communication unit 12 to transmit the generated TRQ frame to the slave station. In addition, when a frame serving as a response to the TRQ frame (hereinafter also referred to as a training feedback (TFB) frame) is received as a second frame, the control unit 17 acquires information indicating an antenna weight estimated on the basis of the TFB frame from the communication unit 12.

In addition, the control unit 17 acquires the channel information for deciding transmission power to be set in the slave station. Specifically, the control unit 17 generates the channel information on the basis of power involved in communication of the TFB frame in the communication of the TRQ frame and the TFB frame. More specifically, the TRQ frame includes information indicating transmission power of the TFB frame (hereinafter also referred to as TFB transmission power) as second power information. Then, when the TFB frame transmitted with the TFB transmission power is received by the communication unit 12, the control unit 17 estimates a propagation attenuation amount on the basis of the TFB transmission power and reception power of the TFB frame.

For example, the control unit 17 causes the data processing unit 11 to generate the TRQ frame which includes the information indicating the TFB transmission power and causes the communication unit 12 to transmit the generated TRQ frame. Also, the control unit 17 stores the information indicating the TFB transmission power in the storage unit.

Then, when the TFB frame is received as a response to the TRQ frame, the control unit 17 acquires information indicating the reception power of the TFB frame (hereinafter also referred to as TFB reception power) as a response to the TRQ frame from the communication unit 12 measuring the TFB reception power.

Next, the control unit 17 estimates the propagation attenuation amount on the basis of the TFB transmission power and the TFB reception power. More specifically, the control unit 17 calculates a propagation attenuation amount Path-Loss for each slave station using the following equation.

[Math. 1]

$$\text{PathLoss}(n) = P_{TX\_TFB}(n) - P_{RX\_TFB}(n) \quad \text{(Equation 1)}$$

In the foregoing Equation 1, PathLoss(n) indicates a propagation attenuation amount of an n-th slave station. In addition, $P_{TX\_TFB}(n)$ indicates the TFB transmission power of the n-th slave station and $P_{RX\_TFB}(n)$ indicates reception power of the TFB frame of the n-th slave station. Also, Equation 1 is a calculation equation in logarithmic (dB) values.

The data processing unit 11 generates the frame involved in a process of acquiring the channel information. Specifically, the data processing unit 11 generates the TRQ frame including the information indicating the TFB transmission power and supplies the generated frame to the communication unit 12. In addition, the TRQ frame includes information indicating a slave station which is a destination (hereinafter also referred to as destination information). For example, the destination information can be a media access control (MAC) address of a slave station or an identifier which indicates a group to which a slave station belongs and of which each slave station is notified in advance. Also, when the destination of the TRQ frame or the identifier of the group is known in the slave station before the notification of the TRQ frame, information such as the destination of the TRQ frame or the identifier of the group may not be included. In addition, when a plurality of modes are set in TRQ/TFB frame exchange, information indicating the modes may be included in the TRQ frame.

The communication unit 12 performs a process of transmitting the TRQ frame and a process of receiving the TFB frame. In addition, the communication unit 12 generates channel information for space division multiplex communication. Specifically, the communication unit 12 transmits the TRQ frame to be supplied from the data processing unit 11 to a slave station and receives the TFB frame as a response to the TRQ frame from a slave station. Then, the communication unit 12 estimates an antenna weight using the reference signal for training included in the TFB frame and supplies information indicating the estimated antenna weight to the control unit 17.

(Function of Deciding Transmission Power for Uplink Multiplex Communication)

The control unit 17 decides transmission power for uplink multiplex communication on the basis of information obtained through reception from a slave station. Specifically, the control unit 17 decides the transmission power on the basis of the information changed in accordance with a propagation path, that is, the propagation attenuation amount in regard to each slave station.

For example, the control unit 17 first decides target reception power. More specifically, the control unit 17 decides reception signal characteristics of a frame received from the slave station, for example, target reception power (hereinafter also referred to as $P_{RX\_TARGET}$) to reception power with which an SN ratio falls within a predetermined range.

Next, the control unit 17 decides transmission power (hereinafter also referred to as $P_{TX\_MUX}$) of a slave station to be used for the uplink multiplex communication on the basis of the target reception power and the propagation attenuation amount. More specifically, the control unit 17 decides $P_{TX\_MUX}$ using the following equation.

[Math. 2]

$$P_{TX\_MUX}(n) = P_{RX\_TARGET}(n) + \text{PathLoss}(n) \quad \text{(Equation 2)}$$

In the foregoing Equation 2, $P_{TX\_MUX}(n)$ indicates $P_{TX\_MUX}$ of the n-th slave station and $P_{RX\_TARGET}(n)$ indicates target reception power of the n-th slave station. Also, Equation 2 is a calculation equation in logarithmic (dB) values.

Next, the control unit 17 determines whether the decided $P_{TX\_MUX}$ is settable transmission power of the slave station. More specifically, the control unit 17 determines whether each $P_{TX\_MUX}$ decided using Equation 2 is within the transmission power setting range indicated by each piece of transmission power range information. Also, when the control unit 17 determines that $P_{TX\_MUX}$ is within the transmission power setting range, the control unit 17 confirms $P_{TX\_MUX}$ as the transmission power for the uplink multiplex communication.

Also, the example in which the propagation attenuation amount is estimated on the basis of the power involved in communication in the TRQ/TFB frame exchange has been described. However, the propagation attenuation amount may be estimated further using previous propagation attenuation amount. For example, the control unit 17 stores the previous propagation attenuation amount in the storage unit and estimates a propagation attenuation amount by weighting the calculated propagation attenuation amount and the previous propagation attenuation amount, as described above. Also, the previous propagation attenuation amount may be a value estimated in communication other than the TRQ/TFB frame exchange.

(Function of Notifying of Transmission Power for Uplink Multiplex Communication)

The control unit 17 controls a process of notifying a slave station of the transmission power for the uplink multiplex communication. Specifically, when $P_{TX\_MUX}$ is decided, the control unit 17 causes the data processing unit 11 to generate a DL frame including information indicating $P_{TX\_MUX}$ serving as transmission power information (hereinafter also referred to as UTP information) and causes the communication unit 12 to transmit the generated DL frame to the slave station. Also, since the DL frame is triggered in transmission of a UL frame to a slave station, the DL frame is also referred to as a trigger frame below. In addition, the trigger frame may be a data frame, as will be described below, or may be a control frame or a management frame.

In addition, the control unit 17 instructs the data processing unit 11 to generate a trigger frame including information indicating a permission transmission period of the frame (hereinafter also referred to as reverse direction grant (RDG) information) in uplink multiplex communication. For example, the RDG information is decided in advance and stored in the storage unit. Then, when $P_{TX\_MUX}$ is decided, the control unit 17 acquires the RDG information from the storage unit and supplies the acquired RDG information to the data processing unit 11 along with an instruction to generate the trigger frame.

The data processing unit 11 generates a frame involved in a process of notifying of $P_{TX\_MUX}$. Specifically, the data processing unit 11 generates a trigger frame including the UTP information and the RDG information and supplies the generated trigger frame to the communication unit 12. Also, the UTP information and the RDG information in the trigger frame may be stored at any position.

The communication unit 12 transmits the frame involved in the process of notifying of $P_{TX\_MUX}$ to each slave station through space multiplex communication. Specifically, the communication unit 12 performs space multiplexing on the trigger frame supplied from the data processing unit 11 using the antenna weight obtained through the above-described TRQ/TFB frame exchange and transmits the multiplexed trigger frame to each slave station.

((Functions when Communication Apparatus Operates as Slave Station))

Next, functions when the communication apparatus 10-1 operates as the slave station will be described in detail.

(Function of Notifying of Transmission Power Setting Range)

The control unit 17 controls a process of notifying the master station of the transmission power range information. Specifically, when communication connection with the master station is established, the control unit 17 causes the data processing unit 11 to generates a frame including the transmission power range information and causes the communication unit 12 to transmit the generated frame to the master station. Also, as described above, in a case other than the case in which the communication connection with the master station is established, a frame including the transmission power range information may be generated.

The data processing unit 11 generates the frame including the transmission power range information on the basis of an instruction from the control unit 17 and supplies the generated frame to the communication unit 12.

The communication unit 12 transmits the frame including the transmission power range information supplied from the data processing unit 11 to the master station.

(Function of Acquiring and Supporting Channel Information)

The control unit 17 controls a support process of acquiring the channel information on the basis of a request from the master station. Specifically, when the TRQ frame addressed to a slave station from the master station is received, the control unit 17 causes the data processing unit 11 to generate the TFB frame and causes the communication unit 12 to transmit the generated TFB frame to the master station.

The data processing unit 11 determines whether the TRQ frame is addressed to the slave station. In addition, when the TRQ frame is received, the data processing unit 11 acquires destination information included in the TRQ frame and determines whether the acquired destination information includes the slave station. When the acquired information includes the slave station, the data processing unit 11 notifies the control unit 17 that the TRQ frame addressed to the slave station is received. The data processing unit 11 acquires the information indicating the TFB transmission power from the TRQ frame and supplies the acquired information indicating the TFB transmission power to the control unit 17.

In addition, the data processing unit 11 generates the TFB frame on the basis of an instruction from the control unit 17. Specifically, the data processing unit 11 generates the TFB frame including the reference signal for training and supplies the generated TFB frame to the communication unit 12. Also, when a mode of the TFB frame is designated, the data processing unit 11 generates the TFB frame involved in the designated mode.

The communication unit 12 performs a process of receiving the TRQ frame and a process of transmitting the TFB frame. Specifically, the communication unit 12 receives the TRQ frame from the master station and transmits the TFB frame supplied from the data processing unit 11 to the master station. Also, the communication unit 12 transmits the TFB frame with the TFB transmission power notified of with the TRQ frame. Setting of the TFB transmission power will be described below.

(TPC Function)

The control unit 17 performs transmission power control (TPC) in a slave station. Specifically, the control unit 17 gives an instruction to set transmission power based on the TFB transmission power included in the TRQ frame received from the master station and an instruction to set transmission power based on the UTP information included in the trigger frame received from the master station. For example, the control unit 17 sets the TFB transmission power or the transmission power indicated by the UTP information as the transmission power of the slave station in the communication unit 12, that is, the amplification unit 16.

Also, when the control unit 17 does not perform the TPC as in a case in which the TPC function is turned off, the control unit 17 may not instruct the amplification unit 16 to set the transmission power or may instruct the amplification unit 16 to set a pre-decided value (hereinafter also referred to as a default value), for example, a value of transmission power generally used in wireless LAN communication.

The communication unit 12 amplifies a transmission signal on the basis of an instruction from the control unit 17. Specifically, when the amplification unit 16 is instructed to set the transmission power by the control unit 17, the amplification unit 16 sets the transmission power of the slave station so that the transmission power involved in the instruction is set. Also, when the amplification unit 16 is not instructed to set the value of the transmission power by the control unit 17 or is instructed to set the default value, the amplification unit 16 sets the transmission power to the default value. Then, the amplification unit 16 amplifies the transmission power until a signal supplied from the wireless interface unit 15 is set.

(Uplink Transmission Function)

The control unit 17 controls a process responding to the trigger frame. Specifically, when the trigger frame is received, the control unit 17 causes the data processing unit 11 to generate a UL frame and causes the communication unit 12 to transmit the generated UL frame to the master station.

The data processing unit 11 acquires the UTP information and the RDG information from the trigger frame and supplies the acquired UTP information and RDG information to the control unit 17.

In addition, the data processing unit 11 generates a UL frame on the basis of the RDG information acquired from the trigger frame. Specifically, the data processing unit 11 generates the UL frame to which a confirmation response (hereinafter also referred to as ACK) frame to the trigger frame received from the master station is connected so that a transmission period of the UL frame is a permission transmission period indicated by the RDG information.

For example, the data processing unit 11 first generates a data frame on the basis of data to be transmitted, and subsequently generates an ACK frame of the trigger frame. Thereafter, the data processing unit 11 generates a UL frame by connecting the data frame and the ACK frame together. Here, a position of the ACK frame in the UL frame is arbitrary.

Further, when a transmission time period of the UL frame is shorter than the permitted transmission time period, the data processing unit 11 makes the transmission time period of the UL frame the same as the permitted transmission time period by adding a padding to the UL frame.

Although an example in which a transmission time period of a generated UL frame is equal to or shorter than a permitted transmission time period has been described above, the data processing unit 11 may adjust the UL frame when the transmission time period of the generated UL frame exceeds the permitted transmission time period. Specifically, the data processing unit 11 separates a data frame from the UL frame in a plurality units.

For example, the data processing unit 11 calculates a transmission period (hereinafter referred to as an available transmission period) obtained by subtracting the transmission period of the ACK frame (hereinafter also referred to as an ACK transmission period) from the transmission period of the UL frame, that is, the permission transmission period and determines whether the transmission period of the data frame exceeds the available transmission period. When it is determined that the transmission time period of the data frame exceeds the available transmission time period, the data processing unit 11 divides the data frame using a method such as fragmentation so that transmission time periods become equal to or shorter than the available transmission time period. Here, when the data frame is an aggregation frame, the data processing unit 11 may change the data frame by disconnecting some of subframes of the data frame so that transmission time periods of the data frame become equal to or shorter than the available transmission time period.

In this case, even when the UL frame exceeds the permission transmission period, a transmission opportunity can be ensured and communication efficiency can be improved.

The communication unit 12 performs a process of receiving the trigger frame and a process of transmitting the UL frame. Specifically, the communication unit 12 receives the trigger frame from the master station and transmits the UL frame supplied from the data processing unit 11 to the master station. Also, the UL frame is transmitted with transmission power set on the basis of the UTP information included in the trigger frame.

2-2. Process of Apparatus

Next, processes of the communication system and the communication apparatus 10-1 according to the present embodiment will be described with reference to FIGS. 5 to 10.

(Whole Flow of Process)

Figure 5:
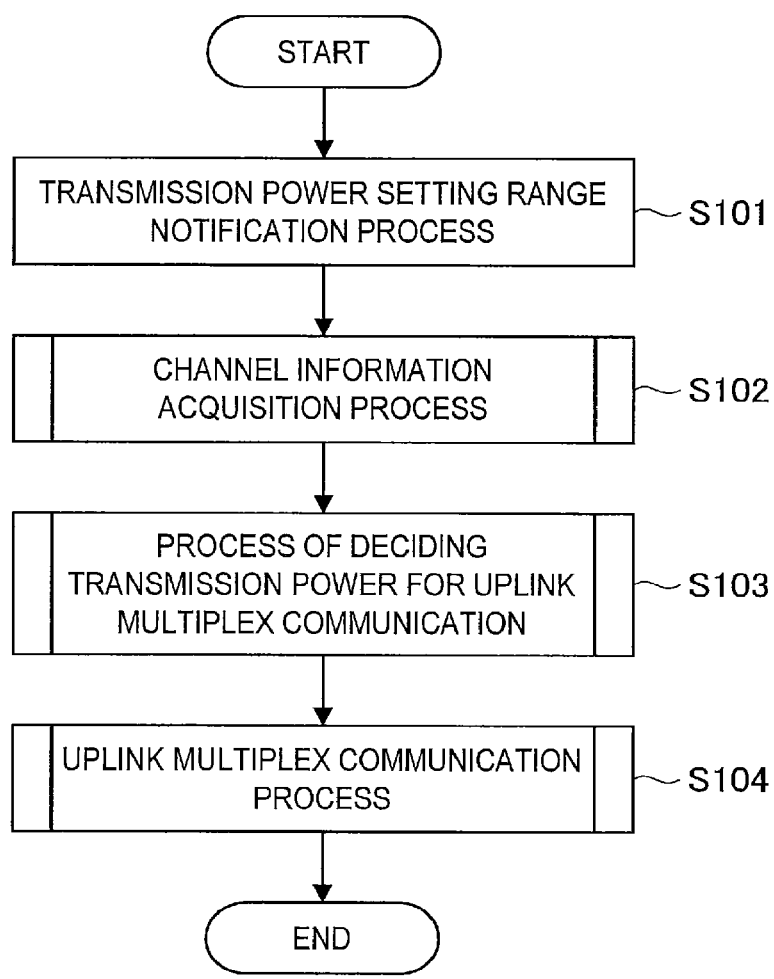
FIG. 5 is a flowchart conceptually showing a process of the communication system according to the present embodiment.

First, a flow of a process of the communication system will be described with reference to FIG. 5. FIG. 5 is a flowchart conceptually showing a process of the communication system according to the present embodiment.

The communication system first performs a transmission power setting range notification process. Specifically, a slave station transmits a frame including the transmission power range information of the slave station to the master station when communication connection with the master station is established. The master station receiving the frame stores the transmission power range information included in the frame. Also, when the frame including the transmission power range information is received thereafter, the master station may update the transmission power range information.

Figure 6:
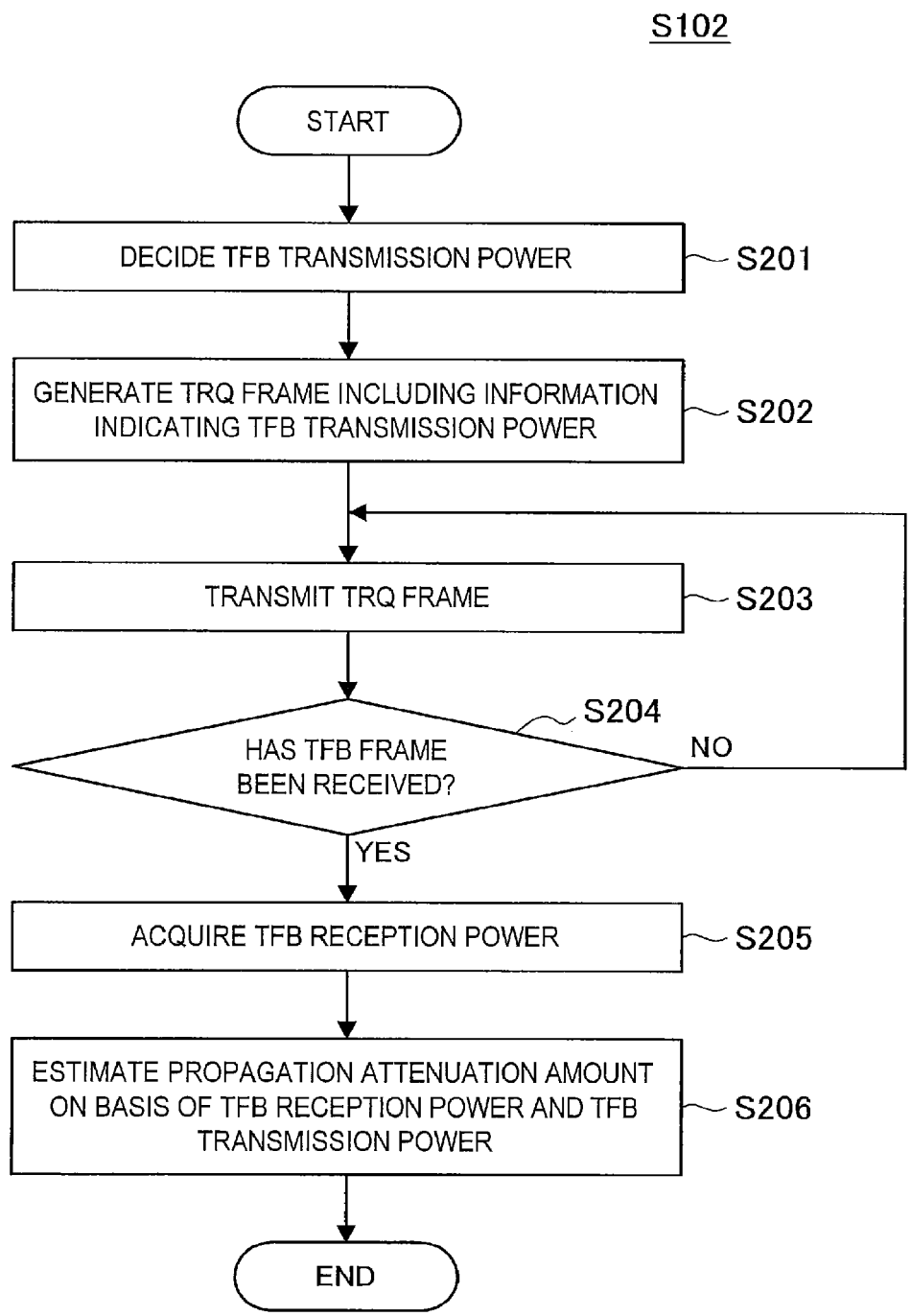
FIG. 6 is a flowchart conceptually showing a process of a master station in a channel information acquisition process according to the present embodiment.
Figure 7:
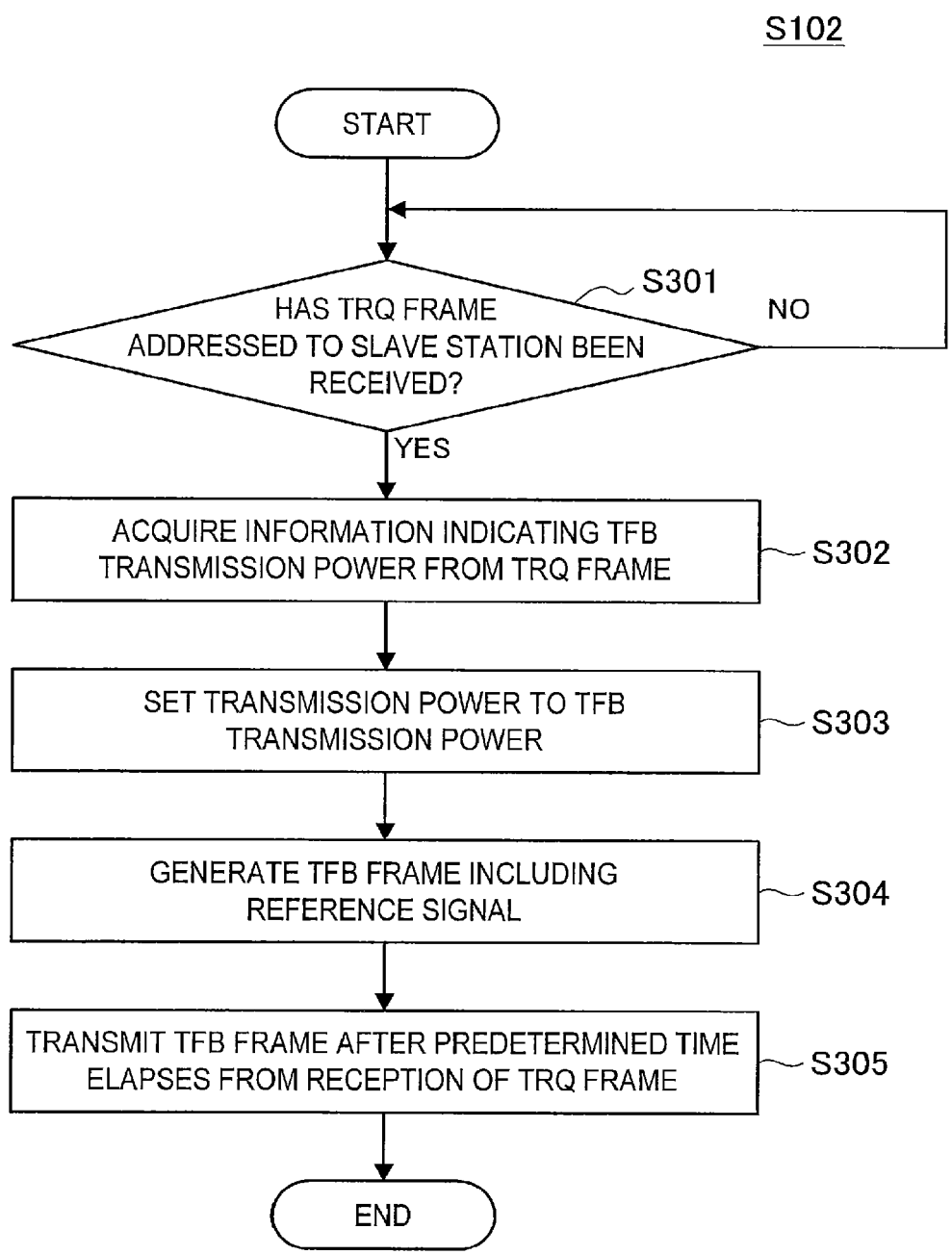
FIG. 7 is a flowchart conceptually showing a process of a slave station in the channel information acquisition process according to the present embodiment.

Subsequently, the communication system performs a channel information acquisition process. Specifically, the master station transmits the TRQ frame to the slave station. Then, the slave station receiving the TRQ frame transmits the TFB frame with the transmission power indicated by the TRQ frame to the master station. For example, processes shown in FIGS. 6 and 7 are performed.

Figure 8:
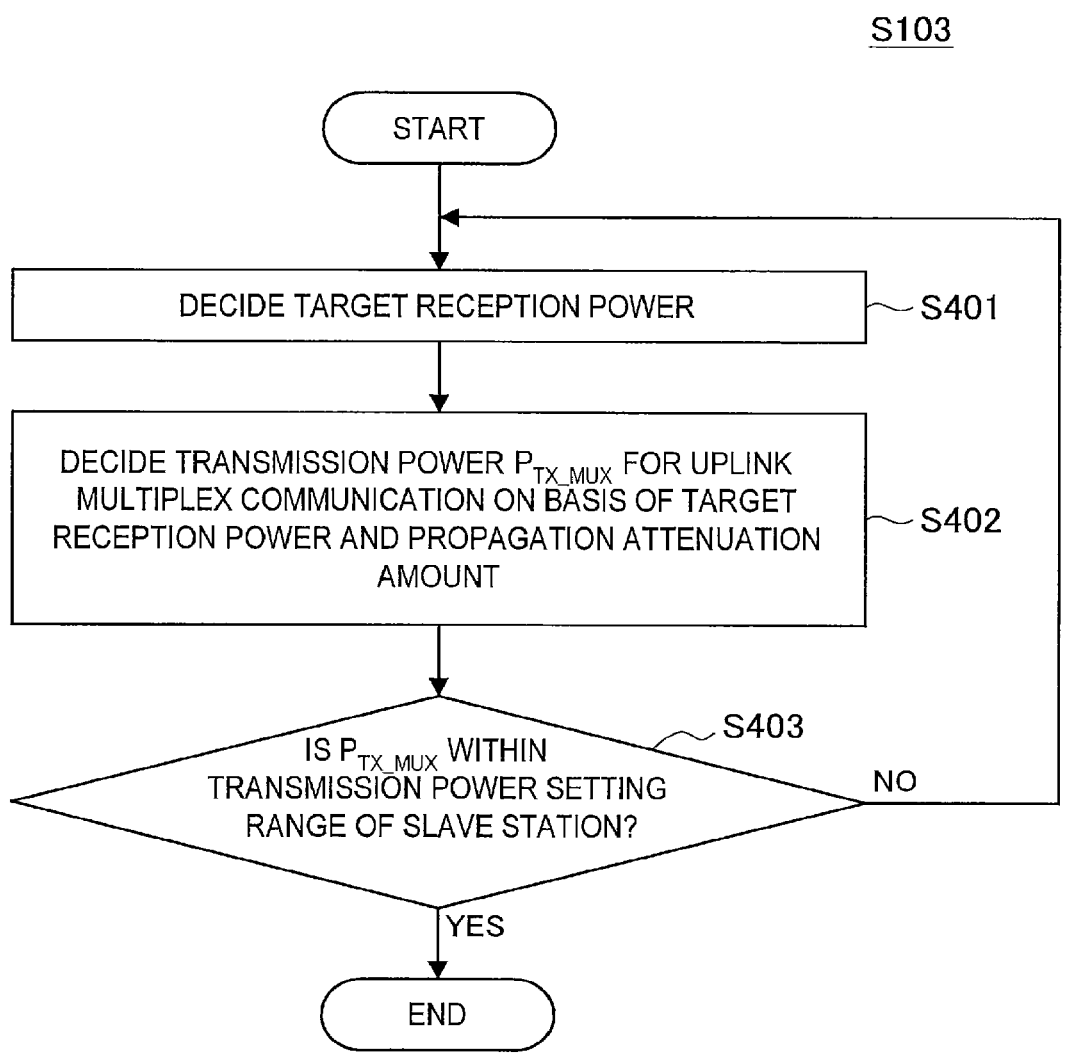
FIG. 8 is a flowchart conceptually showing a process of the master station performing a process of deciding transmission power for uplink multiplex communication according to the present embodiment.

Subsequently, the communication system performs a process of deciding the transmission power for the uplink multiplex communication. Specifically, the master station decides transmission power of the slave station to be used in the uplink multiplex communication using the acquired channel information. For example, a process shown in FIG. 8 is performed.

Figure 9:
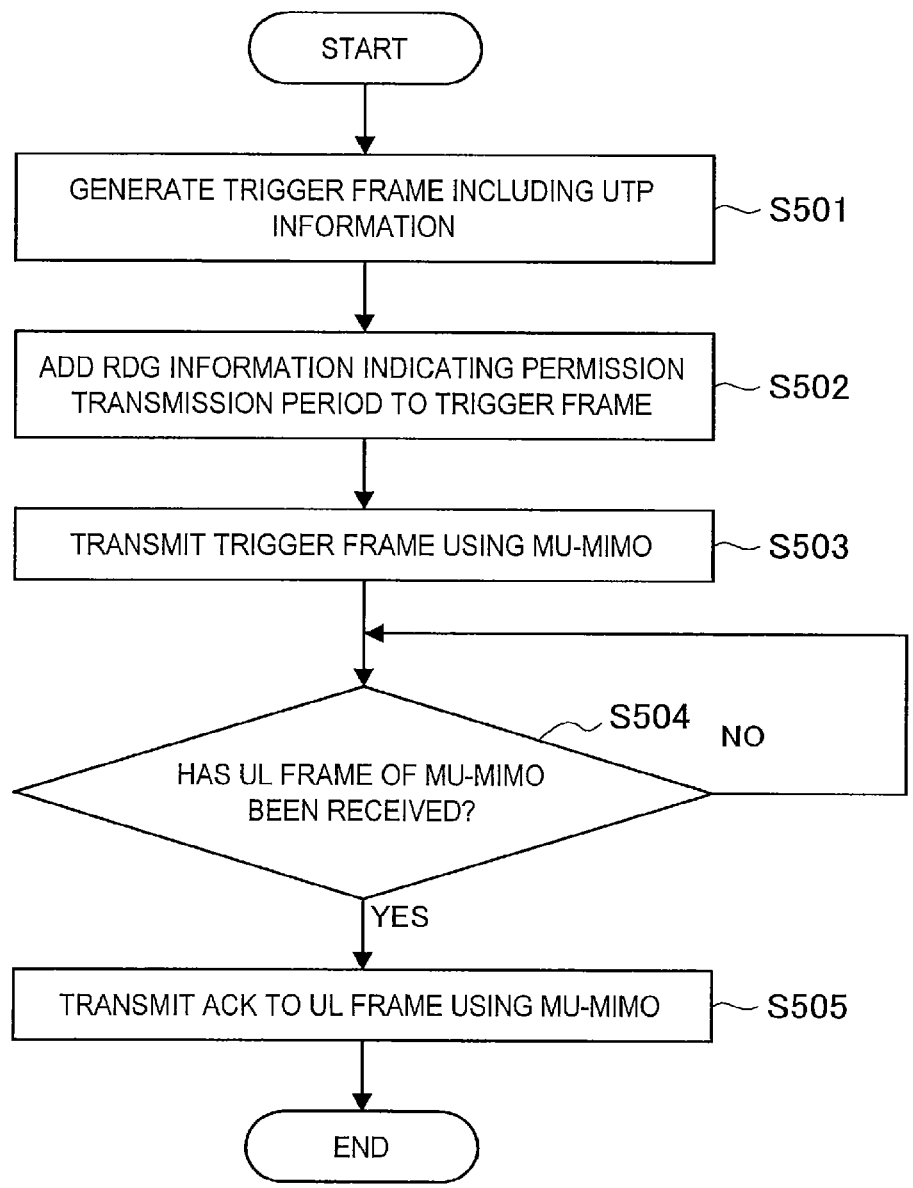
FIG. 9 is a flowchart conceptually showing a process of the master station in an uplink multiplex communication process according to the present embodiment.
Figure 10:
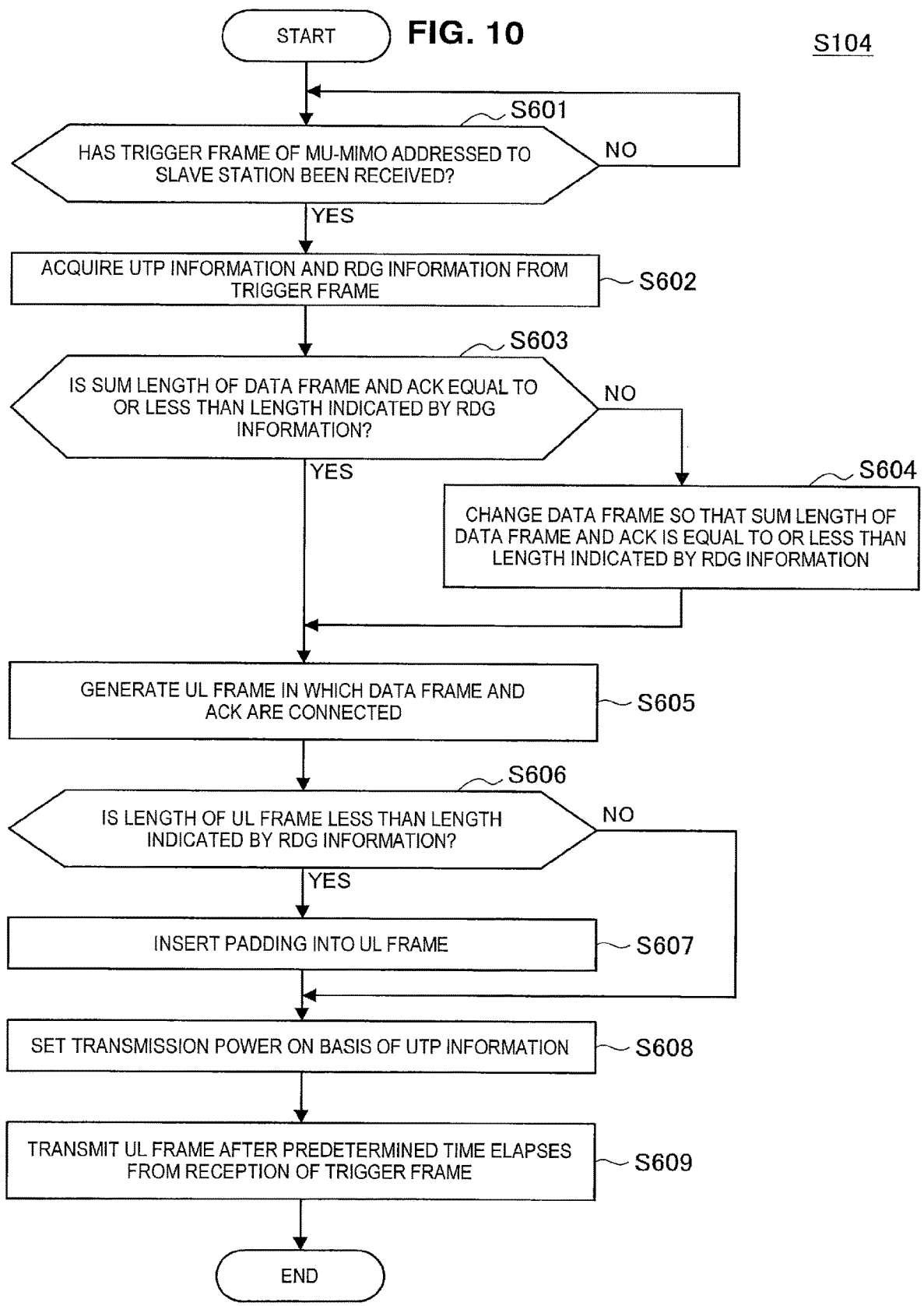
FIG. 10 is a flowchart conceptually showing a process of the slave station in the uplink multiplex communication process according to the present embodiment.

Subsequently, the communication system performs an uplink multiplex communication process. Specifically, the master station transmits the trigger frame indicating the decided transmission power of the slave station to be used for the uplink multiplex communication to the slave station. The slave station receiving the trigger frame transmits the UL frame with the transmission power set on the basis of the UTP information indicated by the trigger frame to the master station. For example, processes shown in FIGS. 9 and 10 are performed.

(Flow of Channel Information Acquisition Process)

Next, the details of the channel information acquisition process which is the process of step S102 in FIG. 5 will be described. First, a process of the master station in the channel information acquisition process will be described with reference to FIG. 6. FIG. 6 is a flowchart conceptually showing a process of a master station in the channel information acquisition process according to the present embodiment.

The master station decides the TFB transmission power (step S201). Specifically, the control unit 17 decides the TFB transmission power within the transmission power setting range notified of by the slave station. Also, the TFB transmission power may be common among the slave stations or may differ for each slave station.

Subsequently, the master station generates the TRQ frame including the information indicating the TFB transmission power (step S202). Specifically, the data processing unit 11 generates the TRQ frame including the information indicating the TFB transmission power and supplies the generated TRQ frame to the communication unit 12.

Subsequently, the master station transmits the TRQ frame to the slave station (step S203). Specifically, the communication unit 12 transmits the TRQ frame supplied from the data processing unit 11 to the slave station with the transmission power instructed from the control unit 17.

Subsequently, the master station stands by until the TFB frame is received from the slave station (step S204). Specifically, the communication unit 12 determines whether the TFB frame has been received within a predetermined time. When the communication unit 12 determines that the TFB frame is not received within the predetermined time, the communication unit 12 retransmits the TRQ frame. Also, an upper limit of the number of retransmissions may be set.

When the TFB frame is received from the slave station, the master station acquires the TFB reception power (step S205). Specifically, when the TFB frame is received, the communication unit 12 measures reception power of the TFB frame. In addition, the communication unit 12 calculates an antenna weight on the basis of the reference signal for training included in the TFB frame.

Subsequently, the master station estimates a propagation attenuation amount on the basis of the TFB reception power and the TFB transmission power (step S206). Specifically, the control unit 17 calculates the propagation attenuation amount by applying the TFB reception power measured by the communication unit 12 and the TFB transmission power of which the slave station is notified to Equation 1 described above.

Next, a process of the slave station in the channel information acquisition process will be described with reference to FIG. 7. FIG. 7 is a flowchart conceptually showing a process of a slave station in the channel information acquisition process according to the present embodiment.

The slave station determines whether the TRQ frame addressed to the slave station has been received from the master station (step S301). Specifically, when the TRQ frame is received, the data processing unit 11 acquires the destination information included in the TRQ frame and determines whether the acquired destination information indicates the slave station.

When it is determined that the TRQ frame addressed to the slave station is received, the slave station acquires the information indicating the TFB transmission power from the TRQ frame (step S302). Specifically, when the data processing unit 11 determines that the destination information included in the TRQ frame indicates the slave station, the data processing unit 11 acquires the information indicating the TFB transmission power from the TRQ frame.

Subsequently, the slave station sets the transmission power to the TFB transmission power (step S303). Specifically, the control unit 17 causes the communication unit 12, that is, the amplification unit 16, to set the transmission power of the slave station to the TFB transmission power acquired by the data processing unit 11.

Subsequently, the slave station generates the TFB frame including the reference signal (step S304). Specifically, the data processing unit 11 generates the TFB frame including the reference signal for training on the basis of an instruction from the control unit 17 and supplies the generated TFB frame to the communication unit 12

Subsequently, the slave station transmits the TFB frame to the master station after a predetermined time elapses from the reception of the TRQ frame (step S305). Specifically, the communication unit 12 transmits the TFB frame supplied from the data processing unit 11 to the master station with the transmission power set on the basis of the TFB transmission power after the predetermined time, for example, a period of a short inter frame space (SIFS), elapses from the reception of the TRQ frame. Also, the period of the SIFS can be 16 μs (microseconds).

(Flow of Process of Deciding Transmission Power for Uplink Multiplex Communication)

Next, the details of the process of deciding the transmission power for the uplink multiplex communication which is the process of step S103 in FIG. 5 will be described with reference to FIG. 8. FIG. 8 is a flowchart conceptually showing a process of the master station performing the process of deciding the transmission power for the uplink multiplex communication according to the present embodiment.

The master station decides target reception power (step S401). Specifically, the control unit 17 decides the target reception power to reception power with which a frame is received from the slave station normally.

Subsequently, the master station decides transmission power $P_{TX\_MUX}$ for the uplink multiplex communication on the basis of the target reception power and the propagation attenuation amount (step S402). Specifically, the control unit 17 decides $P_{TX\_MUX}$ by applying the target reception power and the propagation attenuation amount to Equation 2 described above.

Subsequently, the master station determines whether $P_{TX\_MUX}$ is within the transmission power setting range of the slave station (step S403). Specifically, the control unit 17 determines whether the decided $P_{TX\_MUX}$ is within the transmission power setting range of the slave station. Then, when it is determined that $P_{TX\_MUX}$ is within the transmission power setting range, the process of deciding the transmission power for the uplink multiplex communication ends. Conversely, when it is determined that $P_{TX\_MUX}$ is outside of the transmission power setting range, the process returns to step S401 to perform the process. In addition, when a combination of $P_{TX\_MUX}$ in which each $P_{TX\_MUX}$ falls within the transmission power setting range is not discovered, $P_{TX\_MUX}$ in which a sum of amounts deviating from the transmission power setting range in the slave stations is less than another $P_{TX\_MUX}$ is selected.

(Flow of Uplink Multiplex Communication Process)

Next, the details of the uplink multiplex communication process which is the process of step S104 in FIG. 5 will be described. First, a process of the master station in the uplink multiplex communication process will be described with reference to FIG. 9. FIG. 9 is a flowchart conceptually showing a process of the master station in the uplink multiplex communication process according to the present embodiment.

The master station generates a trigger frame including the UTP information (step S501). Specifically, the data processing unit 11 generates the trigger frame including the UTP information on the basis of an instruction from the control unit 17.

Subsequently, the master station adds the RDG information to the trigger frame (step S502). Specifically, the data processing unit 11 adds the RDG information to the generated trigger frame and supplies the trigger frame to the communication unit 12.

Subsequently, the master station transmits the trigger frame using MU-MIMO (step S503). Specifically, the communication unit 12 performs a process for space division multiplexing on the trigger frame supplied from the data processing unit 11 using the antenna weight obtained through the TRQ/TFB frame exchange and transmits the processed trigger frame to the slave station.

Subsequently, the master station stands by until the UL frames multiplexed with MU-MIMO are received from the slave station (step S504). Specifically, when the UL frames are received, the communication unit 12 separates the UL frames multiplexed using the retained antenna weight and performs a subsequent reception process on each of the UL frames obtained through the separation. In addition, the communication unit 12 determines whether the UL frames are received within a predetermined period from the transmission of the trigger frame. When the communication unit 12 determines that the UL frames are not received within the predetermined period, the communication unit 12 retransmits the trigger frame. Also, an upper limit of the number of retransmissions may be set.

When the UL frame multiplexed with MU-MIMO is received, the master station transmits an ACK frame to the UL frame to the slave station using MU-MIMO (step S505). Specifically, when it is determined that the UL frame is received within the predetermined period, the data processing unit 11 generates the ACK frame corresponding to each of the UL frames. Then, the communication unit 12 performs a process for space division multiplexing on the generated ACK frame using the retained antenna weight and transmits the processed ACK frame to the slave station.

Next, a process of the slave station in the uplink multiplex communication process will be described with reference to FIG. 10. FIG. 10 is a flowchart conceptually showing a process of the slave station in the uplink multiplex communication process according to the present embodiment.

The slave station stands by until the trigger frame addressed to the slave station transmitted using MU-MIMO is received (step S601). Specifically, the communication unit 12 stands by to receive the trigger frame. Then, when the trigger frame is received, the communication unit 12 corrects a frequency offset of a reference oscillator of the master station using a signal in a preamble (for example, a preamble of a physical layer (PHY)) of the trigger frame. Then, the data processing unit 11 determines whether the destination information included in the received trigger frame indicates the slave station.

When the trigger frame addressed to the slave station is received, the slave station acquires the UTP information and the RDG information from the trigger frame (step S602). Specifically, when the data processing unit 11 determines the destination information included in the trigger frame indicates the slave station, the data processing unit 11 acquires the UTP information and the RDG information from the trigger frame.

Subsequently, the slave station determines whether a sum length of a data frame and the ACK frame to the trigger frame is equal to or less than a length indicated by the RDG information (step S603). Specifically, the control unit 17 calculates a sum transmission period length by calculating a sum of an ACK transmission period length and a transmission period length of the data frame. Then, it is determined whether the calculated sum transmission period length is equal to or less than the transmission period length indicated by the RDG information.

When the sum length of the data frame and the ACK frame is not equal to or less than the length indicated by the RDG information, the slave station changes the data frame so that the sum length is equal to or less than the length indicated by the RDG information (step S604). Specifically, the data processing unit 11 performs fragmentation so that the sum transmission period length is equal to or less than the transmission period length indicated by the RDG information in a part of any data frame obtained, for example, by fragmenting the data frame.

Subsequently, the slave station generates an UL frame in which the data frame and the ACK frame to the trigger frame are connected (step S605). Specifically, when the sum length of the data frame and the ACK frame is equal to or less than the transmission period length indicated by the RDG information, the data processing unit 11 generates the data frame and the ACK frame. Then, the data processing unit 11 generates the UL frame by connecting the data frame and the ACK frame.

Subsequently, the slave station determines whether the frame length of the UL frame is less than the length indicated by the RDG information (step S606). Specifically, the data processing unit 11 determines whether the frame length of the generated UL frame is less than the transmission period length indicated by the RDG information.

When it is determined that the frame length of the UL frame is less than the length indicated by the RDG information, the slave station inserts a padding into the UL frame (step S607). Specifically, when the data processing unit 11 determines that the frame length of the UL frame is less than the transmission period length indicated by the RDG information, the data processing unit 11 inserts the padding into the UL frame until the frame length of the UL frame is identical to the transmission period indicated by the RDG information.

Subsequently, the slave station sets the transmission power of the slave station on the basis of the UTP information (step S608). Specifically, the control unit 17 instructs the communication unit 12 to set transmission power to the transmission power requested from the UTP information acquired from the trigger frame. The communication unit 12, that is, the amplification unit 16, sets the transmission power of the slave station to the transmission power involved in the instruction. Also, when the transmission power indicated by the UTP information deviates from the transmission power setting range of the slave station, the control unit 17 causes the communication unit 12 to set the transmission power to an upper limit or a lower limit of the transmission power of the slave station.

Subsequently, the slave station transmits the UL frame after a predetermined period elapses from the reception of the trigger frame (step S609). Specifically, when the predetermined time elapses from the reception of the trigger frame, the control unit 17 causes the communication unit 12 to transmit the generated UL frame to the master station. Also, the predetermined time involved in the transmission standby of the UL frame may not be the same in each slave station of a multiplexing communication target.

(Frame Exchange Sequence According to Present Embodiment)

Figure 11:
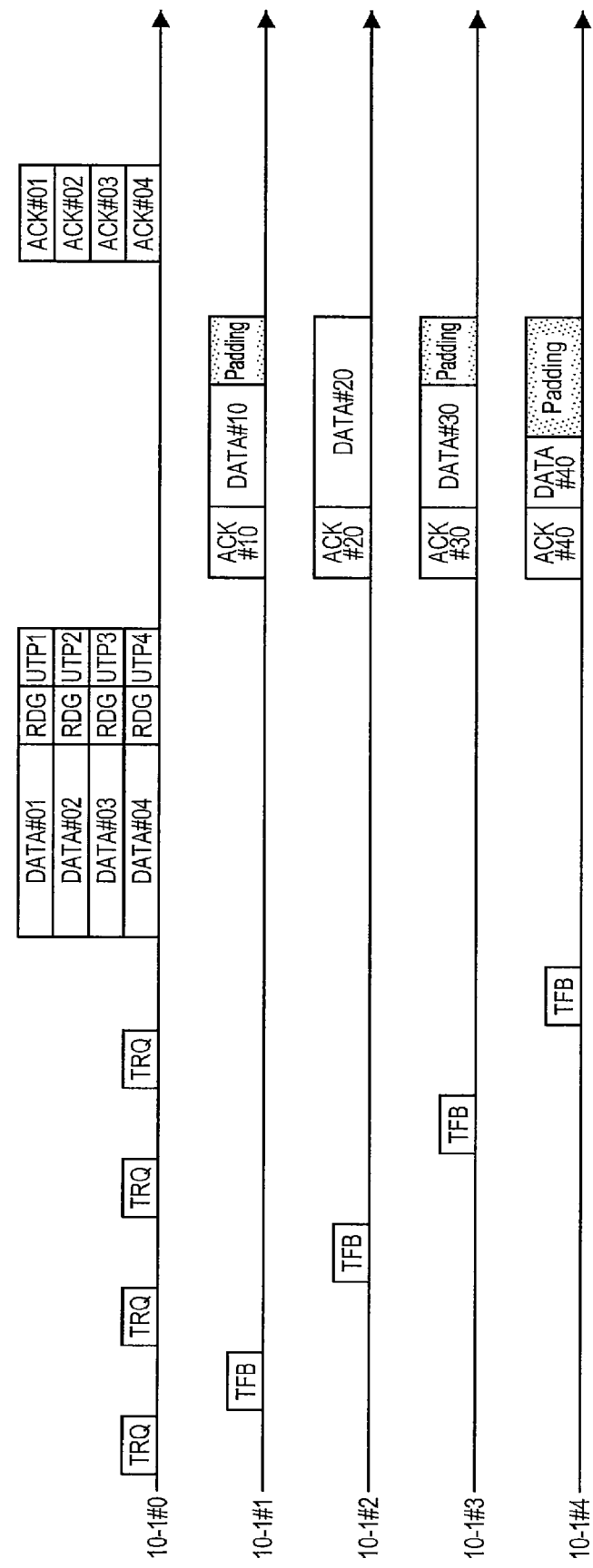
FIG. 11 is a diagram showing an example of a frame exchange sequence performed by a communication system according to the present embodiment.

The processes of the communication system and the communication apparatus 10-1 according to the present embodiment have been described above. Subsequently, transmission and reception of frames performed in the communication system will be described with reference to FIG. 11. FIG. 11 is a diagram showing an example of a frame exchange sequence performed by the communication system according to the present embodiment.

The master station sequentially performs exchanging the TRQ frame and the TFB frame with each slave station. For example, as shown in FIG. 11, the master station 10-1 #0 transmits the TRQ frame addressed to one slave station. When the TFB frame is received, the TRQ frame is transmitted to a subsequent slave station. Then, each of the slave stations 10-1 #1 to 10-1 #4 transmits the TFB frame as a response to the TRQ frame to the master station 10-1 #0.

Subsequently, the master station transmits the trigger frame to each slave station using space division multiplexing. For example, the trigger frames include data portions DATA #01 to #04 corresponding to the slave stations 10-1 #1 to 10-1 #4, the RDG information, and pieces of UTP1 to UTP4 information, respectively, as shown in FIG. 11.

Subsequently, each slave station transmits the UL frame to the master station. For example, the slave station 10-1 #1 transmits the UL frame including the ACK #10 to the trigger frame, the data portion DATA #10, and the padding to the master station 10-1 #0. Also, the UL frames transmitted by the slave stations 10-1 #1 to 10-1 #4 are consequently subjected to space multiplexing.

Subsequently, the master station transmits each of the ACK frames to the received UL frames to the slave stations. For example, the master station 10-1 #0 transmits the ACK frames to the slave stations 10-1 #1 to 10-1 #4 through space multiplex communication, as shown in FIG. 11.

Figure 12:
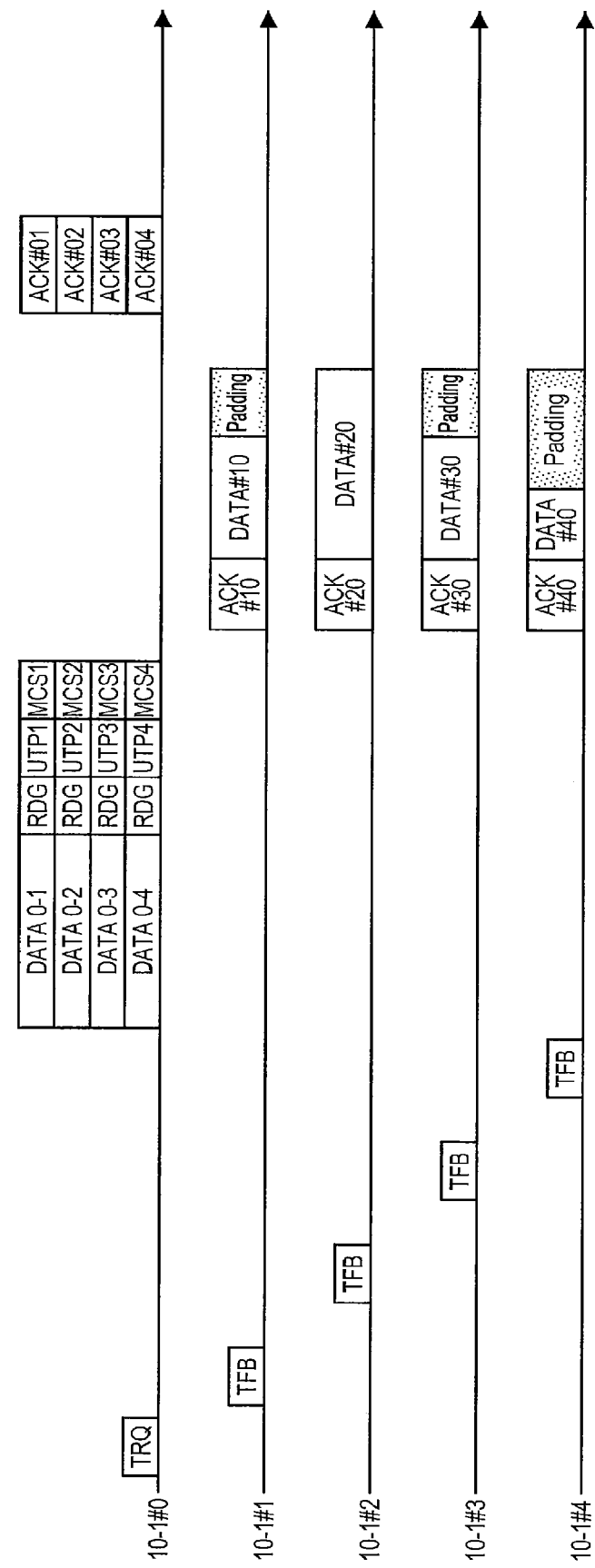
FIG. 12 is a diagram showing another example of the frame exchange sequence performed by the communication system according to the present embodiment.

Also, the example in which the TRQ frames are sequentially transmitted to the slave stations has been described above, but the TFQ frames may be transmitted en block to the slave stations. For example, the TRQ frames are transmitted to the slave stations using broadcasting or multicasting. Further, the TRQ frames transmitted en block will be described in detail with reference to FIG. 12. FIG. 12 is a diagram showing another example of the frame exchange sequence performed by the communication system according to the present embodiment.

The master station transmits the TRQ frames en block to the slave stations. For example, the master station 10-1 #0 transmits the TRQ frames to the plurality of slave stations, as shown in FIG. 12. Also, the TRQ frame includes information indicating a transmission order or transmission timing of the TFB corresponding to the destination information. Then, each of the slave stations 10-1 #1 to 10-1 #4 transmits the TFB frame as a response to the TRQ frame to the master station 10-10 in accordance with an order notified of with the TRQ frame.

Also, since the subsequent frame exchange sequence is substantially the same as the sequence shown in FIG. 11, the description thereof will be omitted.

In this way, according to the first embodiment of the present disclosure, the master station decides transmission power for multiplex communication in a wireless local area network (WLAN) on the basis of information obtained through reception from the slave station. Then, the master station generates a frame including the transmission power information indicating the decided transmission power and transmits the generated frame to the slave station. In addition, the slave station sets transmission power of the own apparatus to the transmission power for the multiplex communication in the wireless LAN decided on the basis of the information obtained through the reception from the slave station. In addition, the slave station receives a frame including the transmission power information indicating the transmission power for the multiplex communication and transmits a frame with the transmission power set on the basis of the transmission power information. Therefore, since the transmission power of the multiplexed frames received from the slave station is controlled by the master station, the reception power of the frame is adjusted so that the frame is received normally. Thus, it is possible to suppress deterioration in reception characteristics of the multiplexed frames in the wireless LAN.

In addition, the information obtained through the reception includes information changed in accordance with a propagation path. Therefore, by controlling the transmission power of the slave station in accordance with a mode or a state of the propagation path which changes the propagation attenuation amount, the reception power of the frame to be received can approach target reception power. Thus, it is possible to more efficiently suppress the deterioration in the reception characteristics of the frame.

In addition, the information changed in accordance with the propagation path includes the information indicating the propagation attenuation amount. Therefore, by deciding the transmission power for uplink multiplexing on the basis of the propagation attenuation amount, it is possible to improve precision and accuracy of the decided transmission power. Also, the information changed in accordance with the propagation path may also indicate a communication distance of the communication between the master station and the slave station or indicate whether there is an obstacle on the propagation path, that is, an object causing propagation attenuation.

In addition, in communication of a first frame and a second frame received as a response to the first frame, the master station estimates the propagation attenuation amount on the basis of power involved in communication of the first frame or the second frame. Therefore, the propagation attenuation amount obtained through actual transmission and reception of frames is used to decide the transmission power for uplink multiplexing, and thus it is possible to improve accuracy of the decided transmission power.

In addition, the first frame includes second power information indicating the transmission power of the second frame. Then, the master station receives the second frame transmitted with the transmission power indicated by the second power information included in the first frame and estimates the propagation attenuation amount on the basis of the transmission power indicated by the second power information and reception power of the second frame. Therefore, no function other than the TPC function is requested from the slave station side, and thus it is possible to simplify the configuration of the slave station.

In addition, the first frame includes a frame indicating a request for a reference signal and the second frame received as the response to the first frame includes a frame including the reference signal. Therefore, a known channel estimation sequence is used, and thus it is possible to further simplify the processes of the master station and the slave station than when a new sequence is added.

In addition, the master station receives a frame including the transmission power range information indicating the range of the transmission power settable in the slave station from the slave station and decides transmission power which falls within the range indicated by the transmission power range information as the transmission power for the multiplex communication. Therefore, transmission power difficult to be set in the slave station is rarely selected. Thus, when transmission from the slave station in which it is difficult to set the transmission power to be notified of is suppressed, it is possible to suppress deterioration in communication efficiency due to a decrease in a transmission opportunity of the slave station. In addition, when transmission is performed at an upper limit or a lower limit of the transmission power settable in the slave station in which it is difficult to set the transmission power to be notified of, it is possible to suppress a variation in reception power density.

In addition, a multiplex scheme of the multiplex communication includes the space division multiplex scheme. Therefore, in the multiplex communication of the master station and the slave station, it is possible to improve frequency utilization efficiency.

In addition, the frame including the transmission power information includes the information indicating the permission transmission period in which transmission of the frame is permitted as a response to the frame including the transmission power information. Therefore, the permission transmission period appropriate for a situation of the slave station is decided and the transmission periods of the transmitted frames are uniformized for the permission transmission period, and thus efficient use of communication resources and stabilization of reception performance can be compatible. In addition, since the permission transmission period is decided in the master station and the slave station is notified of the permission transmission period and the slave station does not perform a process of deciding the transmission period, it is possible to simply the process in the slave station and realize power saving.

2-3. Modification Examples

The first embodiment of the present disclosure has been described above. Also, the present embodiment is not limited to the above-described examples. Hereinafter, first and second modification examples of the present embodiment will be described.

First Modification Example

According to a first modification example of the present embodiment, the master station may also decide the transmission power for the uplink multiplex communication for each frequency. Specifically, the control unit 17 estimates a propagation attenuation amount for each frequency and decides the transmission power for the uplink multiplex communication using the propagation attenuation amount. Then, the control unit 17 notifies the slave station of the transmission power for the uplink multiplex communication for each frequency via the communication unit 12.

For example, the control unit 17 first estimates the propagation attenuation amount for each frequency using the TFB transmission power and the TFB reception power. More specifically, the control unit 17 converts the TFB transmission power into a value $D_{TX\_TFB}$ indicated by power spectrum density. Then, the control unit 17 calculates a propagation attenuation amount PathLoss for each frequency component using the following equation.

[Math. 3]

$$\text{PathLoss}(n,f) = D_{TX_{TFB}}(n) - D_{RX\_TFB}(n,f) \quad \text{(Equation 3)}$$

In the foregoing Equation 3, PathLoss(n, f) indicates a propagation attenuation amount in an n-th slave station and at a frequency component f. In addition, $D_{TX\_TFB}(n)$ indicates power spectral density of the TFB transmission power of the n-th slave station and $D_{RX\_TFB}(n, f)$ indicates power spectral density of TFB reception power in the n-th slave station and at the frequency component f. Also, Equation 3 is a calculation equation in logarithmic (dB) values.

Subsequently, the control unit 17 decides transmission power for the uplink multiplex communication for each frequency using the propagation attenuation amount decided for each frequency. More specifically, the control unit 17 decides target reception power $D_{RX\_TARGET}$ indicated with power spectrum density. Then, the control unit 17 decides $D_{TX\_MUX}$ in which the transmission power for the uplink multiplex communication for each frequency component is indicated with power spectrum density using the following equation.

[Math. 4]

$$D_{TX\_MUX}(n,f) = D_{RX\_TARGET}(n) + \text{PathLoss}(n,f) + \text{Path-Loss}(n,f) \quad \text{(Equation 4)}$$

In the foregoing Equation 4, $D_{TX\_MUX}(n, f)$ indicates power spectrum density of the transmission power for the uplink multiplex communication in the n-th slave station and at the frequency component f and $D_{RX\_TARGET}(n)$ indicates power spectrum density of target reception power of the n-th slave station. Also, Equation 4 is a calculation equation in logarithmic (dB) values.

Also, whether the decided transmission power $D_{TX\_MUX}$ is within the transmission power setting range is also determined using a transmission power setting range indicated at the power spectrum density.

Subsequently, the control unit 17 causes the data processing unit 11 to generate a frame including the UTP information indicating the transmission power for the uplink multiplex communication decided at each frequency and causes the communication unit 12 to transmit the generated frame. More specifically, the control unit 17 groups frequency components at predetermined grading and integrates $D_{TX\_MUX}$ (n, f) at a band involved in the group for each group. Then, the control unit 17 supplies the data processing unit 11 with information for specifying a value obtained through the integration and a group corresponding to the value obtained through the integration, for example, information regarding a pair of pieces of information indicating a frequency and a bandwidth of the group, as the UTP information.

Then, the data processing unit 11 generates a trigger frame including the UTP information and the RDG information and supplies the generated trigger frame to the communication unit 12. The communication unit 12 transmits the trigger frame supplied from the data processing unit 11 to the slave station.

Subsequently, the slave station receiving the trigger frame sets transmission power of the slave station on the basis of the UTP information included in the trigger frame. More specifically, the control unit 17 specifies a group of the frequency components from the frequency indicated by the UTP information and the bandwidth of the group and specifies transmission power for each frequency component on the basis of the integrated value of $D_{TX\_MUX}$ corresponding to the group. Then, the control unit 17 causes the communication unit 12, that is, the amplification unit 16, to set the transmission power so that the transmission power is the specified transmission power for each frequency component.

In this way, according to the first modification example of the present embodiment, the master station decides the transmission power for the uplink multiplex communication at each frequency. Therefore, by optimizing the transmission power, it is possible to improve reception characteristics of the multiplexed frames transmitted from the slave stations.

Second Modification Example

According to a second modification example of the present embodiment, the master station may decide the transmission power for multiplex communication on the basis of information indicating a modulation scheme and a coding scheme used for the multiplex communication. Specifically, the control unit 17 decides target reception power on the basis of modulation and coding scheme (MCS) information used for uplink multiplex communication and decides transmission power for the uplink multiplex communication using the decided target reception power. In addition, the control unit 17 notifies the slave station of the MCS information via the communication unit 12.

For example, the control unit 17 acquires the MCS information used for the uplink multiplex communication and decides target reception power with which reception characteristics such as an SN ratio of a frame transmitted on the basis of the acquired MCS information fall within a preferable range. Subsequently, the control unit 17 decides the transmission power $P_{TX\_MUX}$ using the decided target reception power. In addition, the control unit 17 decides the RDG information on the basis of the MCS information used to decide the transmission power $P_{TX\_MUX}$. Subsequently, the control unit 17 causes the data processing unit 11 to generate a trigger frame including the UTP information, the RDG information, and the MCS information indicating the decided transmission power $P_{TX\_MUX}$. Then, the communication unit 12 transmits the generated trigger frame to the slave station. Also, as in the UTP information and the RDG information, the MCS information in the trigger frame is also stored at any position.

Also, the transmission power $P_{TX\_MUX}$ may be a different value for each slave station. This is because when a bandwidth used for uplink transmission differs for each slave station, a power level of each band differs even when sum transmission power is the same.

In addition, the example in which the information indicating the modulation scheme and the coding scheme is used has been described above. However, information indicating one of the modulation scheme and the coding scheme may be used.

In this way, according to the second modification example of the present embodiment, the master station decides the transmission power for the multiplex communication on the basis of the information indicating the modulation scheme and the coding scheme used for the multiplex communication. Here, communication quality generally changes not only in accordance with reception characteristics such as an SN ratio but also in accordance with the MCS, that is, the modulation scheme and the coding scheme. Accordingly, as in the present modification example, the transmission power of the slave station is decided so that the reception characteristics such as an SN ratio in which frames transmitted with the MCS used for the multiplex communication are received normally are achieved. Thus, it is possible to more efficiently suppress the deterioration in the reception characteristics of the multiplexed frames transmitted from the slave station.

3. SECOND EMBODIMENT (EXAMPLE IN WHICH TRANSMISSION POWER IS NOTIFIED OF WITH FREQUENCY DIVISION MULTIPLEXING FRAME

The communication apparatus 10-1 according to the first embodiment of the present disclosure has been described above. Next, the communication apparatus 10-2 according to a second embodiment of the present disclosure will be described. In the second embodiment, a frequency division multiplex scheme is used for DL communication and UL communication.

3-1. Configuration of Apparatus

A functional configuration of the communication apparatus 10-2 is substantially the same as the functional configuration according to the first embodiment, but some functions differ in both of a master station and a slave station. Also, the description of functions which are substantially the same as the functions of the first embodiment will be omitted.

((Basic function))

The signal processing unit 13 in the communication unit 12 performs processes involved in the frequency division multiplexing. Specifically, the signal processing unit 13 divides a frame supplied from the data processing unit 11 into the number of subcarriers and modulates each of the frames obtained through the division. Subsequently, the signal processing unit 13 combines signals obtained through the modulation. Then, the signal processing unit 13 performs a process of adding a guard interval to a signal obtained through the combination and supplies a signal obtained through the process, that is, a symbol stream, to the wireless interface unit 15.

In addition, the signal processing unit 13 performs a process of removing the guard interval on the symbol stream involved in a reception wave supplied from the wireless interface unit 15. Subsequently, the signal processing unit 13 extracts a subcarrier signal from the signal obtained through the previous process and demodulates the subcarrier signal for each subcarrier. Then, the signal processing unit 13 combines the frames obtained through the demodulation and supplies the combined frames to the data processing unit 11.

((Functions when Communication Apparatus Operates as Master Station))

Next, functions when the communication apparatus 10-2 operates as the master station will be described in detail.

(Function of Acquiring Channel Information)

The control unit 17 generates channel information on the basis of power involved in communication of a TRQ frame in the communication of the TRQ frame and a TFB frame. Specifically, the TFB frame includes information indicating reception power of the TRQ frame (hereinafter also referred to as TRQ reception power) as first power information. Then, the control unit 17 estimates a propagation attenuation amount on the basis of transmission power of the TRQ frame and TRQ reception power.

For example, the control unit 17 causes the data processing unit 11 to generate the TRQ frame and causes the communication unit 12 to transmit the generated TRQ frame. More specifically, unlike the first embodiment, the control unit 17 instructs the data processing unit 11 to generate a TRQ frame not including information indicating the TFB transmission power, that is, a normal TRQ frame. Then, the control unit 17 causes the communication unit 12 to transmit the TRQ frame to the slave station. At this time, the control unit 17 stores transmission power used to transmit the TRQ frame (hereinafter also referred to as TRQ transmission power) in a storage unit.

When the TFB frame is received, the control unit 17 acquires information indicating the TRQ reception power included in the TFB frame. More specifically, when the TFB frame is received, the control unit 17 causes the data processing unit 11 to acquire information indicating the reception power of the TRQ frame measured in the slave station and included in the TFB frame.

Subsequently, the control unit 17 estimates a propagation attenuation amount on the basis of the TRQ transmission power and the TRQ reception power. More specifically, the control unit 17 calculates a propagation attenuation amount PathLoss for each slave station using the following equation.

[Math. 5]

$$PathLoss(n) = P_{TX\_TRQ}(n) = P_{TX\_TRQ}(n) - P_{RX\_TRQ}(n) \quad \text{(Equation 5)}$$

In the foregoing Equation 5, $P_{TX\_TRQ}(n)$ indicates the TRQ transmission power of an n-th slave station and $P_{RX\_TRQ}(n)$ indicates reception power involved in the TRQ frame of the n-th slave station. Also, Equation 5 is a calculation equation in logarithmic (dB) values.

Also, as in the first embodiment, the propagation attenuation amount may also be calculated at power spectrum density for each frequency. For example, the control unit 17 calculates the propagation attenuation amount PathLoss for each slave station using the following equation.

[Math. 6]

$$PathLoss(n,f) = D_{TX\_TRQ}(n) - D_{RX\_TRQ}(n,f) \quad \text{(Equation 6)}$$

In the foregoing Equation 6, $D_{TX\_TRQ}(n)$ indicates power spectrum density of the TRQ transmission power of the n-th slave station and $D_{RX\_TRQ}(n, f)$ indicates power spectrum density of the TRQ reception power in the n-th slave station and at a frequency component f. Also, Equation 6 is a calculation equation in logarithmic (dB) values.

(Function of Deciding Transmission Power for Uplink Multiplex Communication)

As in the first embodiment, the control unit 17 decides the transmission power on the basis of the propagation attenuation amount in regard to each slave station. Here, in the present embodiment, as will be described, since the uplink multiplex communication is performed using the frequency division multiplex scheme, it is preferable to decide the transmission power for each frequency. Further, that target reception power preferably has power spectrum density that is uniform in all bands used for the frequency division multiplex communication.

(Function of Notifying of Transmission Power for Uplink Multiplex Communication)

The communication unit 12 transmits a frame involved in a process of notifying of transmission power for the uplink multiplex communication to each slave station in conformity to the frequency division multiplex scheme. Specifically, the communication unit 12 performs the frequency division multiplexing on a frame supplied from the data processing unit 11 and transmits the multiplexed frame to each slave station. Also, the frequency division multiplexing scheme to be used can be a frequency division multiplex scheme of allocating one or more subcarriers to other slave stations or another frequency division multiplex scheme in regard to a simple frequency division multiplex scheme or an orthogonal frequency division multiplexing (OFDM) scheme.

((Functions when Communication Apparatus Operates as Slave Station))

Next, functions when the communication apparatus 10-2 operates as the slave station will be described in detail.

(Function of Acquiring and Supporting Channel Information)

The control unit 17 controls a process of notifying the master station of the TRQ reception power. Specifically, when the TRQ frame addressed to the slave station is received from the master station, the control unit 17 causes the data processing unit 11 to generate a TFB frame including the information indicating the TRQ reception power and causes the communication unit 12 to transmit the generated TFB frame to the master station.

The communication unit 12 acquires the TRQ reception power. Specifically, when the TRQ frame is received, the communication unit 12 measures reception power of the TRQ frame and generates information indicating the TRQ reception power.

(Uplink Transmission Function)

The communication unit 12 performs a process of receiving a trigger frame transmitted in conformity to the frequency division multiplex scheme and a process of transmitting the UL frame in conformity to the frequency division multiplex scheme. Also, the UL frame is transmitted with the transmission power set on the basis of the UTP information included in the trigger frame.

3-2. Process of Apparatus

Next, processes of the communication apparatus 10-2 according to the present embodiment will be described with reference to FIGS. 13 to 16. Also, the description of substantially the same processes as the processes according to the first embodiment will be omitted.

(Flow of Channel Information Acquisition Process)

Figure 13:
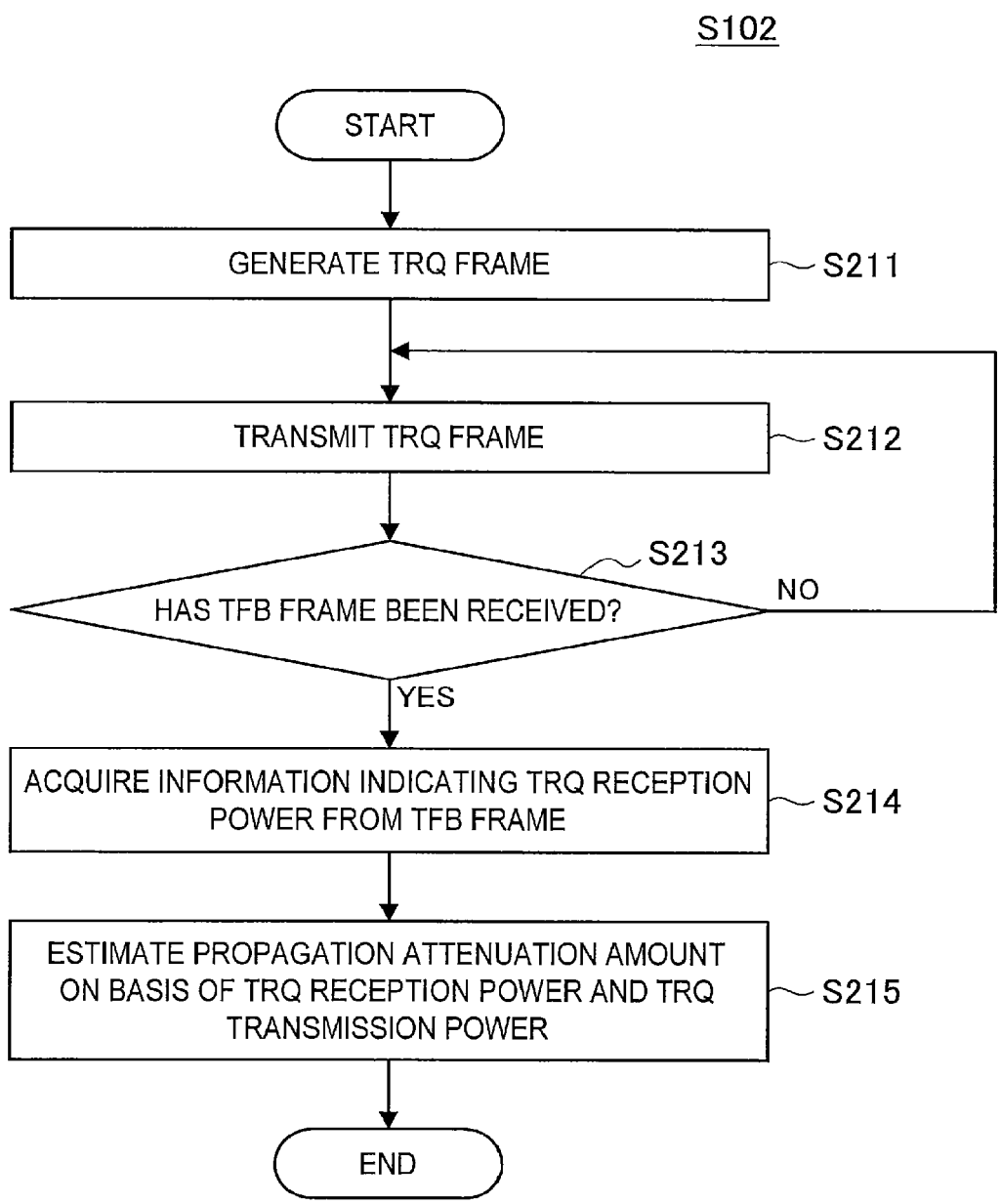
FIG. 13 is a flowchart conceptually showing a process of a master station in a channel information acquisition process according to a second embodiment of the present disclosure.

First of all, the details of the channel information acquisition process which is the process of step S102 in FIG. 5 will be described. First, a process of the master station in the channel information acquisition process will be described with reference to FIG. 13. FIG. 13 is a flowchart conceptually showing a process of a master station in the channel information acquisition process according to the present embodiment.

The master station generates a TRQ frame (step S211) and transmits the generated TRQ frame to the slave station (step S212). Specifically, the data processing unit 11 generates a normal TRQ frame on the basis of an instruction from the control unit 17 and supplies the generated TRQ frame to the communication unit 12. Then, the communication unit 12 transmits the TRQ frame supplied from the data processing unit 11 to the slave station with the transmission power instructed from the control unit 17.

Subsequently, the master station stands by until the TFB frame is received from the slave station (step S213). When the TFB frame is received from the slave station, the information indicating the TRQ reception power is acquired from the TFB frame (step S214). Specifically, when the TFB frame is received, the data processing unit 11 acquires the information indicating the TRQ reception power from the TFB frame.

Subsequently, the master station estimates a propagation attenuation amount on the basis of the TRQ reception power and the TRQ transmission power (step S215). Specifically, the control unit 17 calculates the propagation attenuation amount by applying the TRQ reception power acquired by the data processing unit 11 and the TRQ transmission power used to transmit the TRQ frame to Equation 5 described above.

Figure 14:
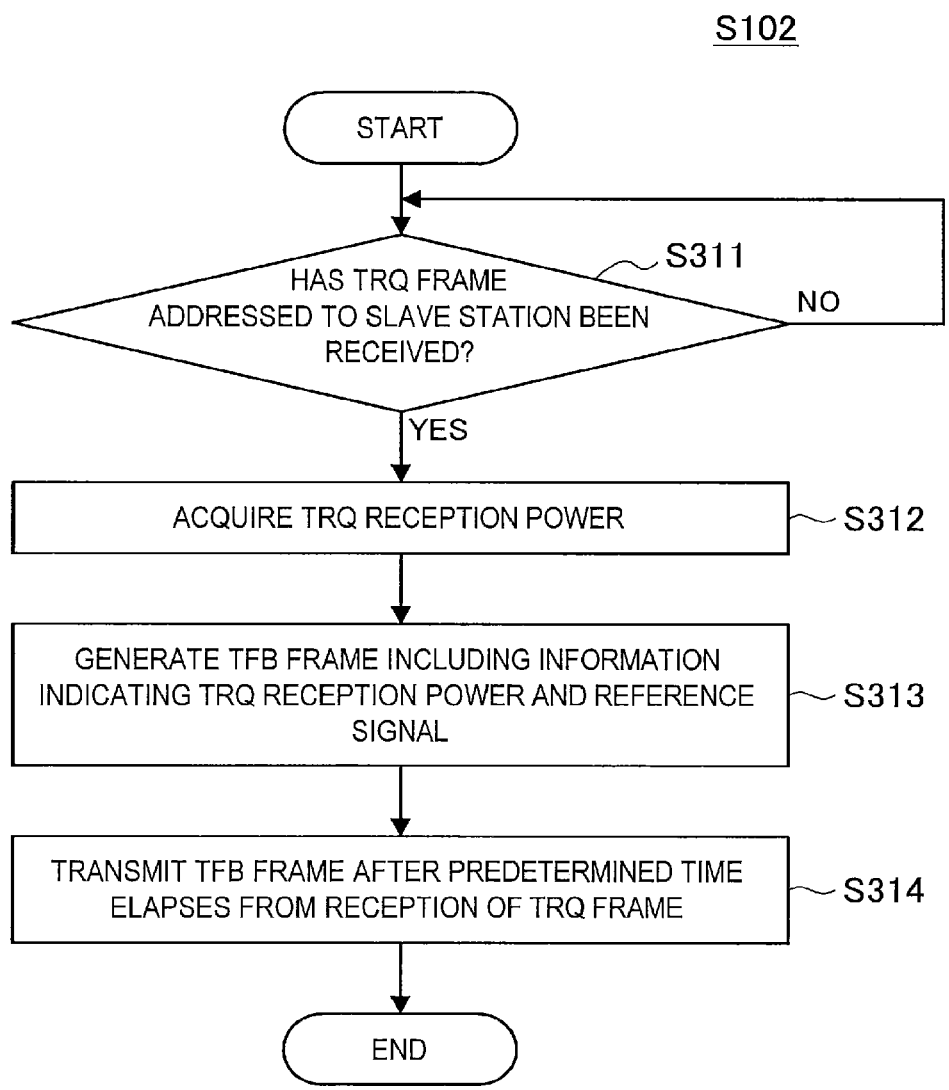
FIG. 14 is a flowchart conceptually showing a process of a slave station in the channel information acquisition process according to the present embodiment.

Next, a process of the slave station in the channel information acquisition process will be described with reference to FIG. 14. FIG. 14 is a flowchart conceptually showing a process of the slave station in the channel information acquisition process according to the present embodiment.

The slave station determines whether the TRQ frame addressed to the slave station has been received from the master station (step S311). When the slave station determines that the TRQ frame addressed to the slave station has been received, the slave station acquires the TRQ reception power (step S312). Specifically, when the TRQ frame is received, the communication unit 12 measures reception power of the TRQ frame.

Subsequently, the slave station generates the TFB frame including the information indicating the reference signal and the TRQ reception power (step S313). Specifically, the data processing unit 11 generates the TFB frame including the reference signal for training and the information indicating the TRQ reception power measured by the communication unit 12 on the basis of an instruction from the control unit 17 and supplies the generated TFB frame to the communication unit 12.

Subsequently, the slave station transmits the TFB frame to the master station after a predetermined time elapses from the reception of the TRQ frame (step S314)

(Flow of Uplink Multiplex Communication Process)

Figure 15:
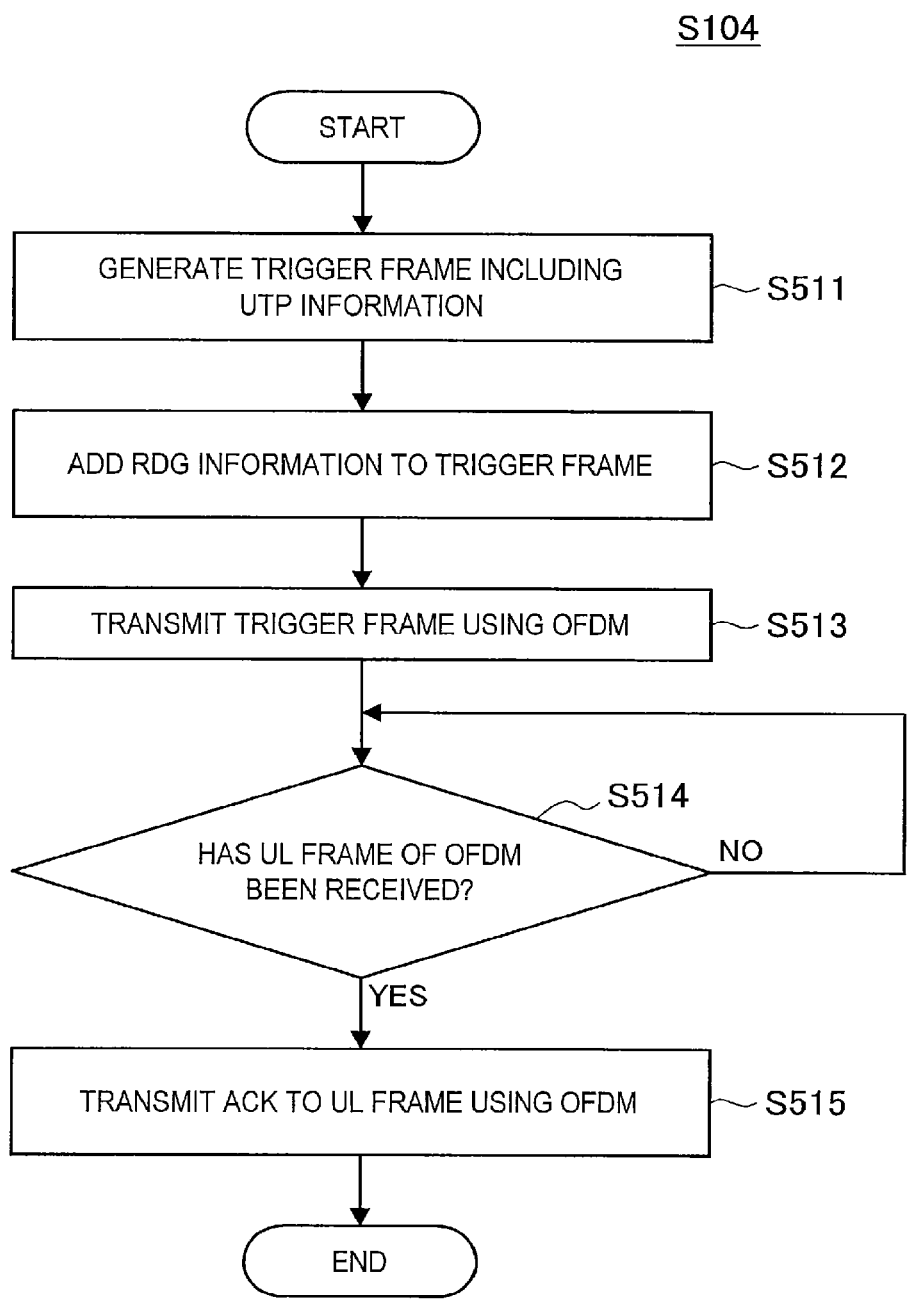
FIG. 15 is a flowchart conceptually showing a process of the master station in an uplink multiplex communication process according to the present embodiment.

Next, the details of the uplink multiplex communication process which is the process of step S104 in FIG. 5 will be described. First, a process of the master station in the uplink multiplex communication process will be described with reference to FIG. 15. FIG. 15 is a flowchart conceptually showing a process of the master station in the uplink multiplex communication process according to the present embodiment.

The master station generates a trigger frame including the UTP information (step S511) and adds the RDG information indicating the permission transmission period to the trigger frame (step S512).

Subsequently, the master station transmits the trigger frame using OFDM (step S513). Specifically, the communication unit 12 modulates and multiplexes each trigger frame generated by the data processing unit 11 using each different subcarrier and transmits the multiplexed trigger frame. Also, the data processing unit 11 includes subcarrier information indicating the subcarrier allocated to each slave station in the trigger frame.

For example, the subcarrier information can be inserted into a PHY header. The PHY header is assumed to be modulated using all of the bands of frequencies. In addition, the slave station may be notified of the subcarrier information in advance or the subcarrier information may also be fixed for each slave station.

Also, here, subcarrier information relating to multiplexing of the trigger frame (hereinafter also referred to as DL multiplexing) and subcarrier information relating to multiplexing of the UL frame transmitted as a response to the trigger frame (hereinafter also referred to as UL multiplexing) are assumed to be common, but the subcarrier information may be different. In this case, the slave station is notified of the subcarrier information relating to the DL multiplexing and the subcarrier information relating to the UL multiplexing.

Subsequently, the master station stands by until the UL frame multiplexed with OFDM is received from the slave station (step S514). Specifically, when the UL frame is received, the communication unit 12 performs a UL frame separation process using the subcarrier indicated by the subcarrier information included in the trigger frame.

Also, the communication unit 12 may retain the subcarrier information of which the slave station is notified before transmission of the trigger frame and perform the UL frame separation process using the subcarrier information. In addition, when the subcarrier information regarding the DL multiplexing is different from the subcarrier information relating to the UL multiplexing transmitted as the response to the trigger frame, the separation process is performed on the basis of the subcarrier information relating to the UL multiplexing.

When the UL frame multiplexed with OFDM is received, the master station transmits an ACK frame to the UL frame to the slave station using OFDM (step S515). Specifically, when the UL frame is determined to have been received within a predetermined time, the data processing unit 11 generates the ACK frame corresponding to each of the UL frames. Then, the communication unit 12 performs a process for the frequency division multiplexing on the generated ACK frame using the retained subcarrier information and transmits the processed ACK frame to the slave station.

Figure 16:
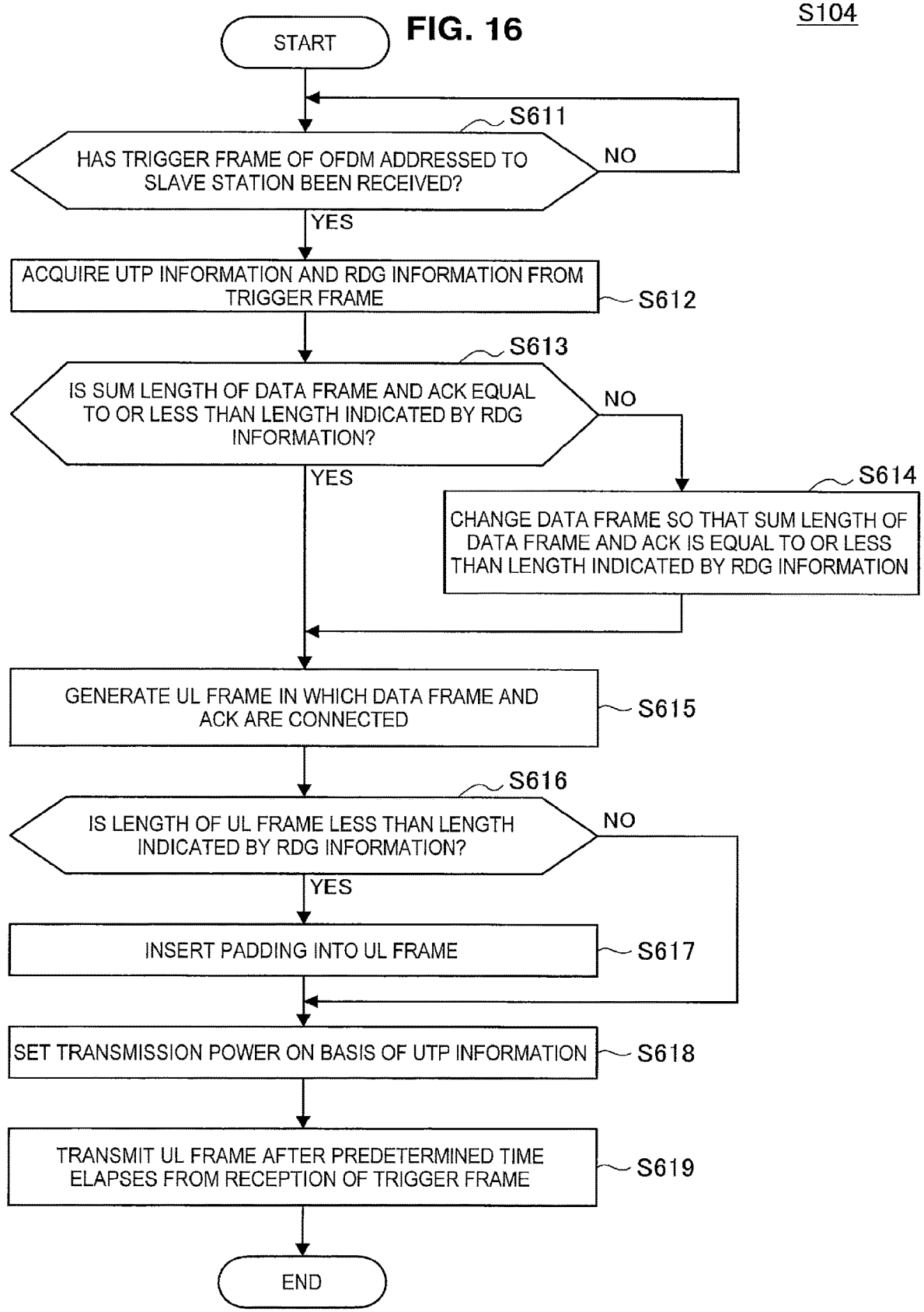
FIG. 16 is a flowchart conceptually showing a process of the slave station in the uplink multiplex communication process according to the present embodiment.

Next, a process of the slave station in the uplink multiplex communication process will be described with reference to FIG. 16. FIG. 16 is a flowchart conceptually showing a process of the slave station in the uplink multiplex communication process according to the present embodiment.

The slave station stands by until the trigger frame addressed to the slave station transmitted using OFDM is received (step S611). Specifically, when the trigger frame is received, the communication unit 12 acquires the subcarrier information from the trigger frame.

For example, the communication unit 12 acquires subcarrier information indicating a subcarrier addressed to the slave station from a PHY header of the trigger frame. Thereafter, the communication unit 12 performs a frame demodulation process and the like on the sub carrier indicated by the corresponding subcarrier information. Also, the corresponding subcarrier information is retained to be used in a post-stage process. Here, when the subcarrier information relating to DL multiplexing and the subcarrier information relating to UL multiplexing are different, the subcarrier information relating to DL multiplexing is used in the corresponding demodulation process and the like, and the subcarrier information relating to UL multiplexing is retained to be used in a post-stage process.

Processes of steps S612 to S618 are substantially the same as the processes of steps S602 to S608 according to the first embodiment. Also, the process involved in the transmission period length of the frame is performed using a frequency component allocated to the slave station, that is, a data rate when the subcarrier is used.

Subsequently, the slave station transmits the UL frame after a predetermined period elapses from the reception of the trigger frame (step S619). Specifically, when the predetermined time elapses from the reception of the trigger frame, the control unit 17 causes the communication unit 12 to transmit the generated UL frame to the master station. The communication unit 12 transmits the UL frame modulated using the acquired subcarrier information.

Also, since a frame exchange sequence according to the present embodiment is substantially the same as that according to the first embodiment, the description thereof will be omitted.

In this way, according to the second embodiment of the present disclosure, the master station and the slave station perform communication using the frequency division multiplex scheme. Therefore, even in a communication apparatus which does not correspond to the space division multiplexing scheme, it is possible to suppress deterioration in reception characteristics of the multiplexed frames in a wireless LAN.

In addition, the above-described second frame includes the second power information indicating the transmission power of the second frame. Then, the master station receives the second frame transmitted with the transmission power indicated by the second power information included in the second frame and estimates a propagation attenuation amount on the basis of the transmission power indicated by the second power information and the reception power of the second frame. In addition, the slave station generates the second frame including the first power information indicating the reception power of the first frame as a response to the first frame received from a transmission source of the transmission power information. Then, the slave station receives the first frame and transmits the second frame. Therefore, in the master station, it is possible to further simplify the process on the master station side than when a process is not added in the communication of the first and second frames.

Also, in the communication according to the present embodiment, the space multiplex communication may be used together. For example, each of the plurality of slave stations is allocated as a space multiplex communication target station to a specific frequency band among a plurality of divided frequency bands. In this case, the UTP in which the reception power spectrum density of each of the frames received in the master station and subjected to the frequency division multiplexing and the space division multiplexing is uniform in all the frequency bands is decided.

In addition, a multiplex communication scheme may differ between the UL communication and the DL communication. For example, the space division multiplex scheme may be used for the UL communication and the frequency division multiplex scheme may be used for the DL communication.

4. THIRD EMBODIMENT (EXAMPLE IN WHICH TRANSMISSION POWER IS NOTIFIED WITH AGGREGATION FRAME)

The communication apparatus 10-2 according to the second embodiment of the present disclosure has been described above. Next, the communication apparatus 10-3 according to a third embodiment of the present disclosure will be described. In the third embodiment, frame aggregation is used for DL communication and the space division multiplex scheme is used for UL communication.

4-1. Configuration of Apparatus

A functional configuration of the communication apparatus 10-3 is substantially the same as the functional configuration according to the first embodiment, but some functions differ in both of a master station and a slave station. Also, the description of functions which are substantially the same as the functions of the first and second embodiments will be omitted.

((Functions when Communication Apparatus Operates as Master Station))

First, functions when the communication apparatus 10-3 operates as the master station will be described in detail.
(Function of Acquiring Channel Information)

The control unit 17 generates channel information on the basis of power involved in communication of a TFB frame in the communication of the TRQ frame and a TFB frame. Specifically, the TFB frame includes information indicating TFB transmission power and the control unit 17 estimates a propagation attenuation amount on the basis of the TFB reception power and the TFB transmission power.

For example, as in the second embodiment, the control unit 17 causes the data processing unit 11 to generate the TRQ frame and causes the communication unit 12 to transmit the generated TRQ frame. Also, according to the present embodiment, the control unit 17 may not store the TRQ transmission power in a storage unit.

Then, when the TFB frame is received as a response to the TRQ frame, the control unit 17 acquires the TFB reception power and acquires the information indicating the TFB transmission power included in the TFB frame. More specifically, when the TFB frame is received, the control unit 17 acquires information indicating the TFB reception power from the communication unit 12 measuring reception power of the TFB frame. In addition, the control unit 17 acquires information included in the TFB frame and indicating the transmission power used for the slave station to transmit the TFB frame from the data processing unit 11.

Subsequently, the control unit 17 estimates a propagation attenuation amount on the basis of the TFB transmission power and the TFB reception power. More specifically, the control unit 17 calculates the propagation attenuation amount for each slave station using Equation 1 described above.

(Function of Notifying of Transmission Power for Uplink Multiplex Communication)

The data processing unit 11 generates a trigger frame involved in a process of notifying of transmission power for the uplink multiplex communication using frame aggregation. Specifically, the data processing unit 11 generates a trigger frame including each of a plurality of frames addressed to the slave apparatus and connected temporally. For example, the data processing unit 11 generates a frame including at least the UTP information and the RDG information for each slave station. Then, the data processing unit 11 generates a trigger frame by aggregating the generated frame for each slave using an aggregation MAC protocol data unit (A-MPDU) or the like. Also, in accordance with a destination of the aggregation frame, each slave station is implicitly notified of a slave station which is a space division multiplex communication target.

The communication unit 12 transmits the trigger frame which is the aggregation frame. Specifically, unlike the first and second embodiments, the communication unit 12 transmits the trigger frame supplied from the data processing unit 11 to each slave station without multiplexing the trigger frame. Also, the frame aggregation is also used for a confirmation response to the UL frame received from each slave station.

((Functions when Communication Apparatus Operates as Slave Station))

Next, functions when the communication apparatus 10-3 operates as the slave station will be described in detail.

(Function of Acquiring and Supporting Channel Information)

The control unit 17 controls a process of notifying the master station of the TFB transmission power. Specifically, when the TRQ frame addressed to the slave station is received from the master station, the control unit 17 causes the data processing unit 11 to generate a TFB frame including the information indicating the TFB transmission power and causes the communication unit 12 to transmit the generated TFB frame to the master station.

(Uplink Transmission Function)

Since an uplink transmission function of the slave station according to the present embodiment is substantially the same as the function according to the first embodiment, the description thereof will be omitted.

4-2. Process of Apparatus

Next, processes of the communication apparatus 10-3 according to the present embodiment will be described with reference to FIGS. 17 to 20. Also, the description of substantially the same processes as the processes according to the first and second embodiments will be omitted.

(Flow of Channel Information Acquisition Process)

Figure 17:
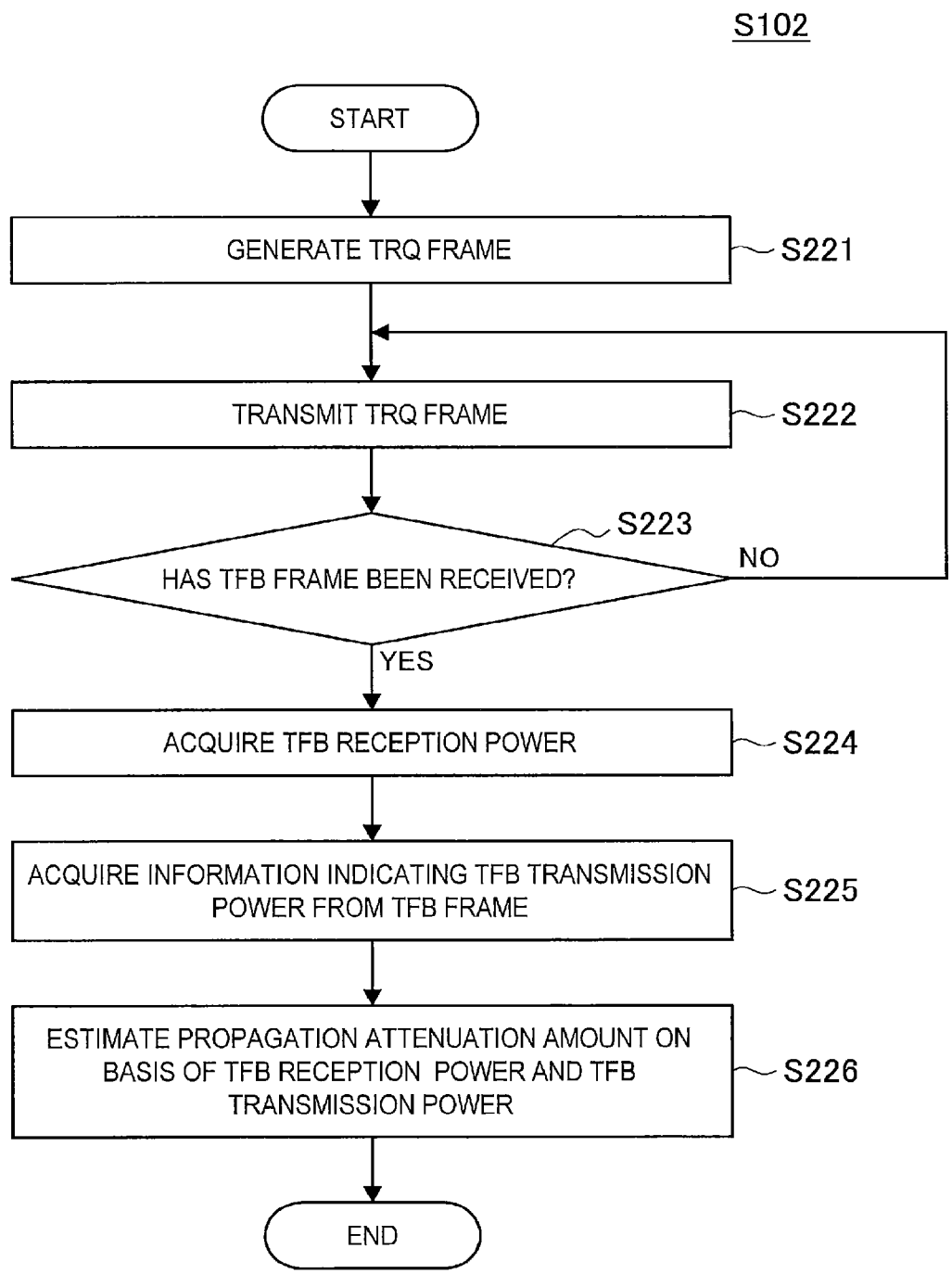
FIG. 17 is a flowchart conceptually showing a process of a master station in a channel information acquisition process according to a third embodiment of the present disclosure.

First of all, the details of the channel information acquisition process which is the process of step S102 in FIG. 5 will be described. First, a process of the master station in the channel information acquisition process will be described with reference to FIG. 17. FIG. 17 is a flowchart conceptually showing a process of the master station in a channel information acquisition process according to the present embodiment.

The master station generates a TRQ frame (step S221) and transmits the generated TRQ frame to the slave station (step S222).

Subsequently, the master station stands by until the TFB frame is received from the slave station (step S223). When the TFB frame is received from the slave station, the TFB reception power is acquired (step S224).

Subsequently, the master station acquires the information indicating the TFB transmission power from the TFB frame (step S225). Specifically, when the TFB frame is received, the data processing unit 11 acquires the information indicating the TFB reception power from the TFB frame.

Subsequently, the master station estimates a propagation attenuation amount on the basis of the TFB reception power and the TFB transmission power (step S226).

Figure 18:
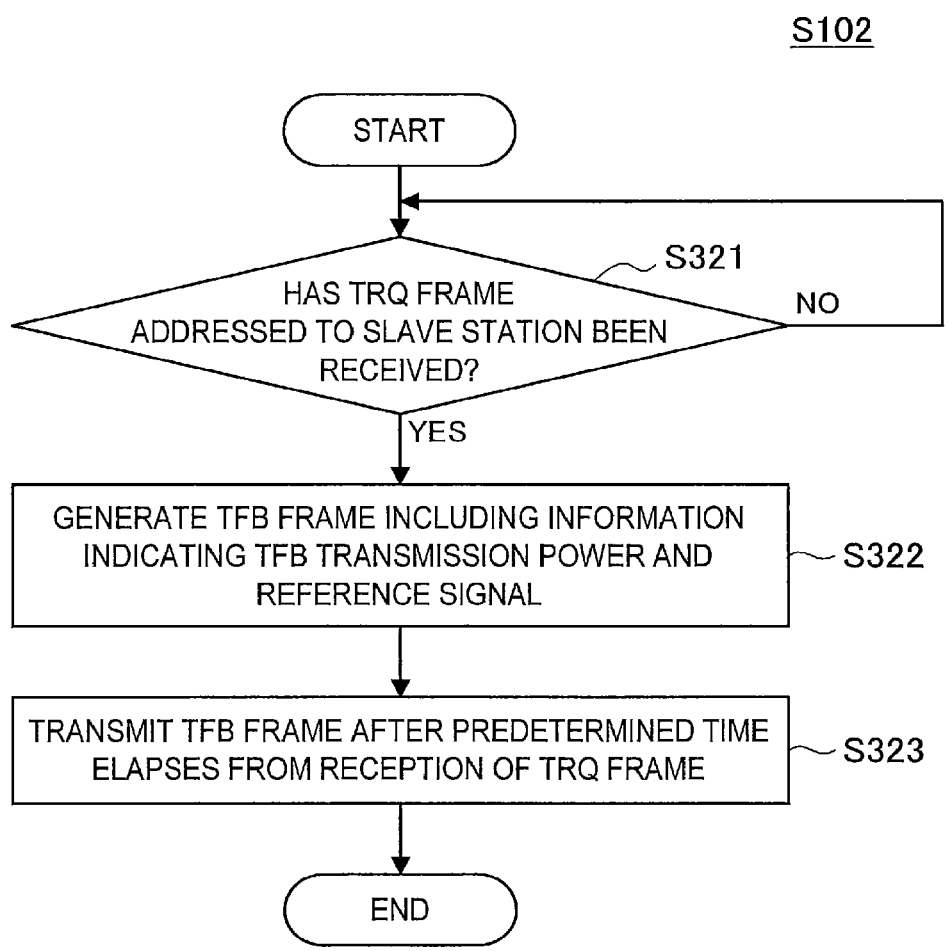
FIG. 18 is a flowchart conceptually showing a process of a slave station in the channel information acquisition process according to the present embodiment.

Next, a process of the slave station in the channel information acquisition process will be described with reference to FIG. 18. FIG. 18 is a flowchart conceptually showing a process of the slave station in the channel information acquisition process according to the present embodiment.

The slave station determines whether the TRQ frame addressed to the slave station has been received from the master station (step S321). When it is determined that the TRQ frame addressed to the slave station has been received, the TFB frame including information indicating the TFB transmission power and the reference signal is generated (step S322). Specifically, the data processing unit 11 generates a TFB frame including the information indicating the TFB transmission power set in the slave station and the reference signal for training on the basis of an instruction from the control unit 17 and supplies the generated TFB frame to the communication unit 12.

Subsequently, the slave station transmits the TFB frame to the master station after a predetermined time elapses from the reception of the TRQ frame (step S323).

(Flow of Uplink Multiplex Communication Process)

Figure 19:
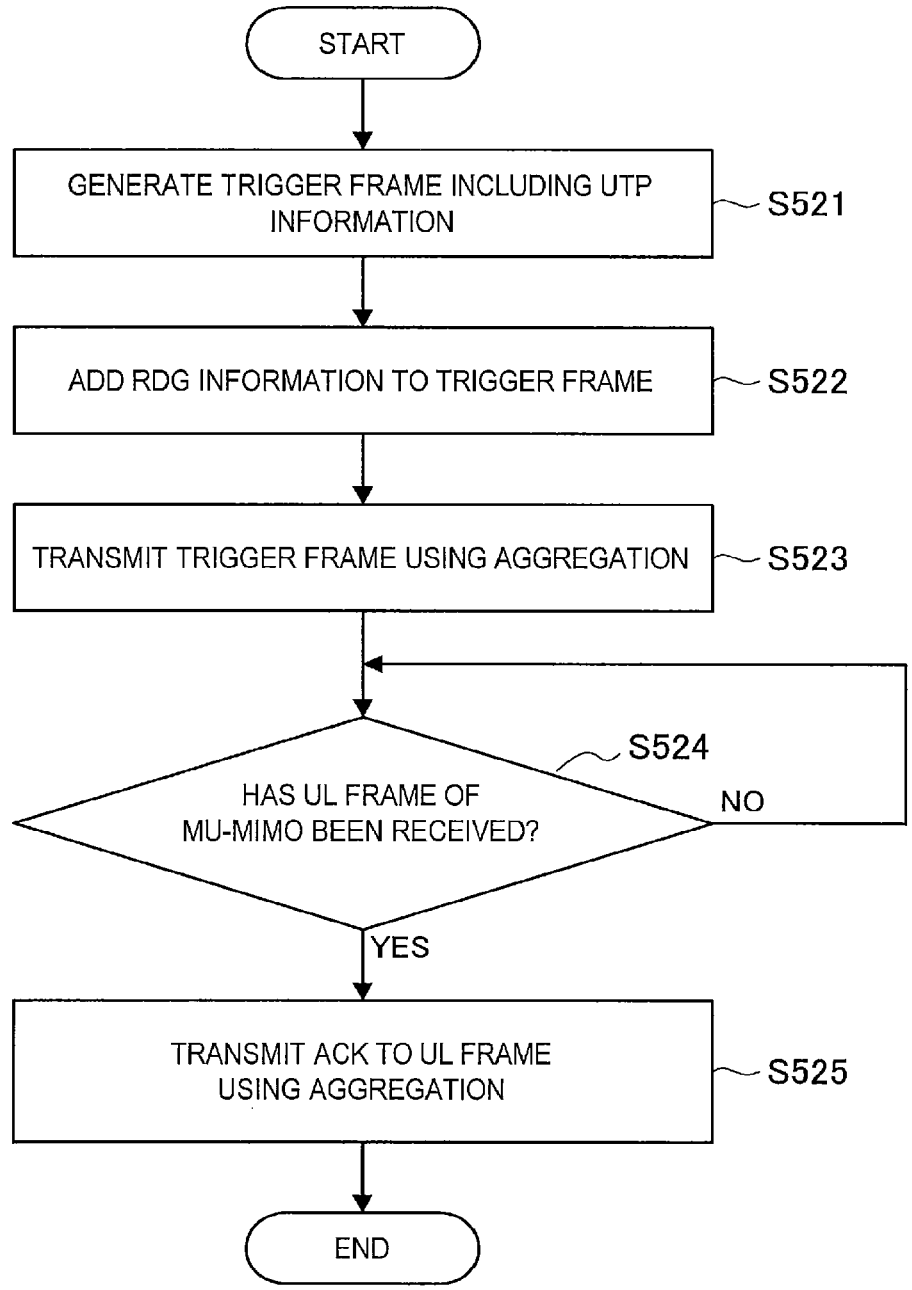
FIG. 19 is a flowchart conceptually showing a process of the master station in an uplink multiplex communication process according to the present embodiment.

Next, the details of the uplink multiplex communication process which is the process of step S104 in FIG. 5 will be described. First, a process of the master station in the uplink multiplex communication process will be described with reference to FIG. 19. FIG. 19 is a flowchart conceptually showing a process of the master station in the uplink multiplex communication process according to the present embodiment.

The master station generates a trigger frame including the UTP information (step S521) and adds the RDG information indicating the permission transmission period to the trigger frame (step S522).

Subsequently, the master station transmits the trigger frame using the aggregation (step S523). Specifically, the data processing unit 11 aggregates each trigger frame addressed to the slave station and supplies the aggregated trigger frame to the communication unit 12. Then, the communication unit 12 transmits the trigger frame supplied from the data processing unit 11 to each slave station. Also, after the trigger frame is transmitted, the control unit 17 instructs the communication unit 12 to set the retained antenna weight.

Subsequently, the master station stands by until the UL frame multiplexed with MU-MIMO is received from the slave station (step S524). When the UL frame multiplexed with MU-MIMO is received, an ACK frame to the UL frame is transmitted to the slave station using MU-MIMO (step S525). Specifically, the data processing unit 11 generates the ACK frame to each of the UL frames and aggregates each of the ACK frames. Then, the data processing unit 11 supplies the ACK frames obtained through the aggregation to the communication unit 12. The communication unit 12 transmits the ACK frame supplied from the data processing unit 11 to each slave station.

Figure 20:
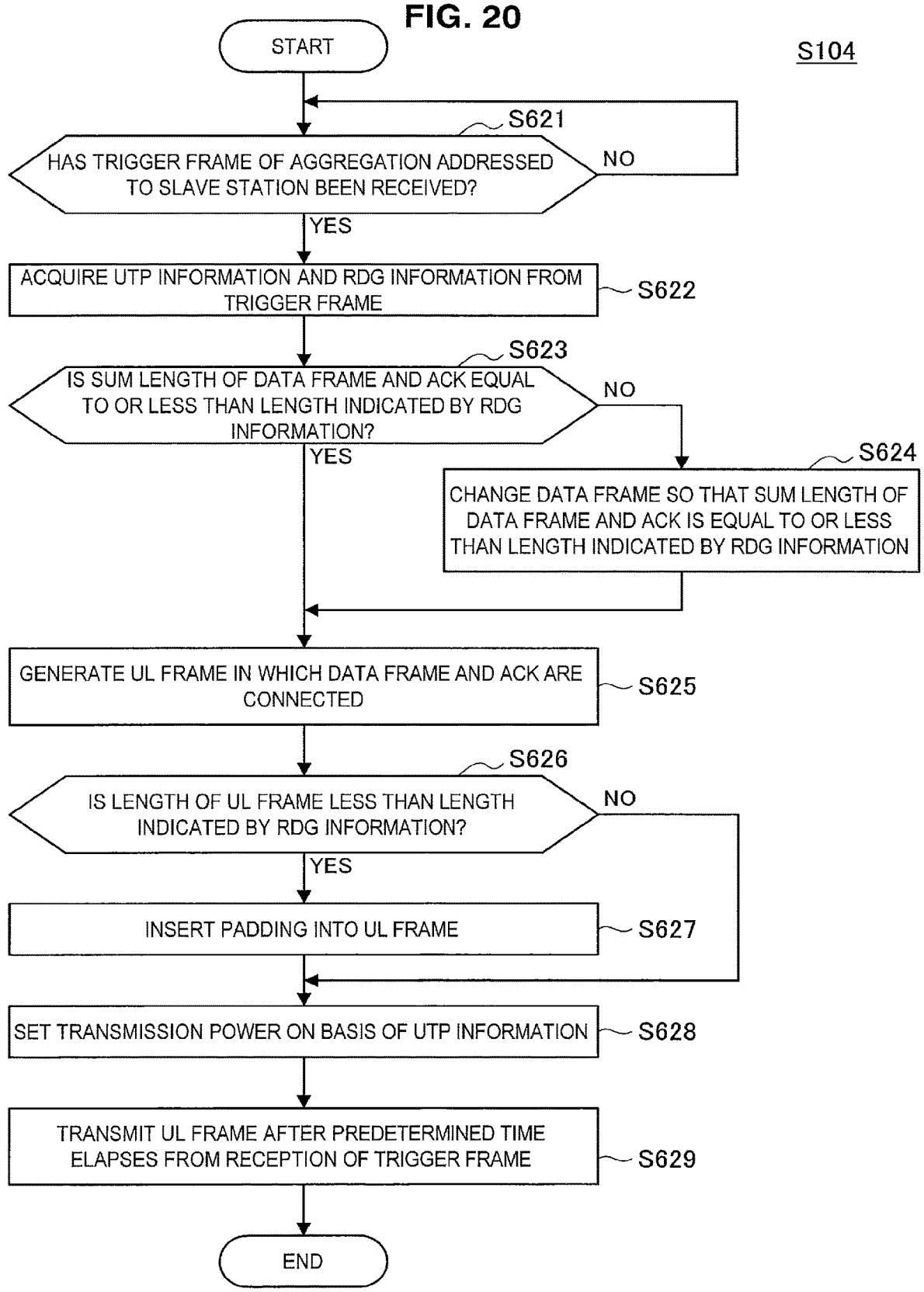
FIG. 20 is a flowchart conceptually showing a process of the slave station in the uplink multiplex communication process according to the present embodiment.

Next, a process of the slave station in the uplink multiplex communication process will be described with reference to FIG. 20. FIG. 20 is a flowchart conceptually showing a process of the slave station in the uplink multiplex communication process according to the present embodiment.

The slave station stands by until the trigger frame addressed to the slave station transmitted using the aggregation is received (step S621). Specifically, when the trigger frame is received, the data processing unit 11 determines whether there is a frame addressed to the slave station in the trigger frame. When it is determined that there is a frame addressed to the slave station in the trigger frame, a process subsequent to step S622 is performed.

Processes of steps S622 to S629 are substantially the same as the processes of steps S602 to S609 according to the first embodiment.

(Frame Exchange Sequence According to Present Embodiment)

Figure 21:
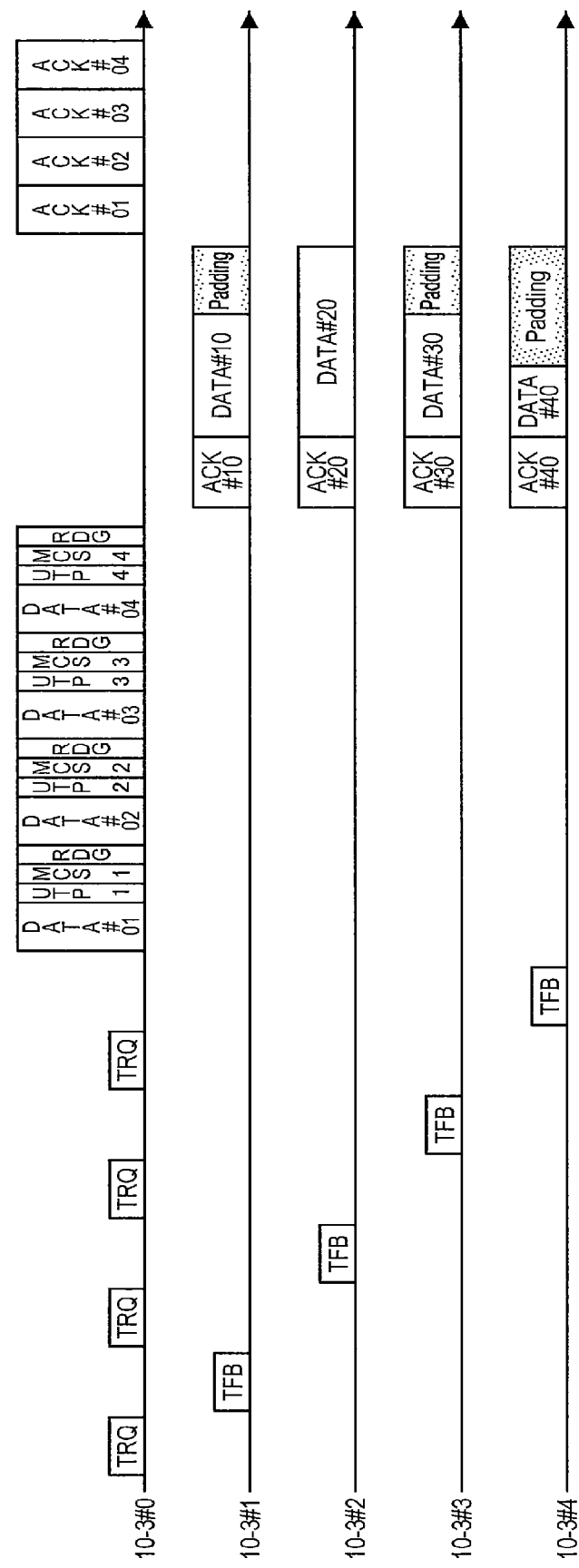
FIG. 21 is a diagram showing an example of a frame exchange sequence performed by a communication system according to the present embodiment.

The processes of the communication system and the communication apparatus 10-3 according to the present embodiment have been described above. Subsequently, transmission and reception of frames performed in the communication system will be described with reference to FIG. 21. FIG. 21 is a diagram showing an example of a frame exchange sequence performed by a communication system according to the present embodiment.

The master station sequentially performs exchanging the TRQ frame and the TFB frame with each slave station. Also, the frames may be exchanged en block with the slave stations.

Subsequently, the master station aggregates the trigger frame of each slave station which is an uplink multiplex communication target and transmits the aggregated trigger frame to each slave station. For example, the trigger frames are generated by aggregating the frames addressed to the slave stations 10-3#1 to 10-3#4 and including a data portion, the UTP information, the MCS information, and the RDG information shown in FIG. 21.

Subsequently, each slave station transmits the UL frame to the master station.
Also, the UL frames are subjected to space division multiplexing.

Subsequently, the master station transmits each ACK frame to the received UL frame to each slave station using the aggregation. For example, as shown in FIG. 21, the ACK frames addressed to the slave stations 10-3#1 to 10-3#4 are aggregated and the aggregated frame is transmitted to each of the slave stations 10-3#1 to 10-3#4. Also, the ACK frames may be transmitted through multiplex communication.

In this way, according to the third embodiment of the present disclosure, the above-described second frame transmitted from the slave station includes the second power information indicating the transmission power of the second frame. Then, the master station receives the second frame transmitted with the transmission power indicated by the second power information included in the second frame and estimates a propagation attenuation amount on the basis of the transmission power indicated by the second power information and the reception power of the second frame. In addition, the slave station generates the second frame including the second power information indicating the transmission power of the second frame as a response to the first frame received from a transmission source of the transmission power information. Therefore, the slave station does not perform the TPC in the TRQ/TFB frame exchange unlike the case of the first embodiment and does not measure the reception power of the TRQ frame unlike the case of the second embodiment. As a result, it is possible to further simplify the processes in the slave station than in the first and second embodiments.

In addition, the master station performs the communication with the slave stations using the frame aggregation. Therefore, the DL communication process of the master station is further simplified than in the case of the multiplex communication, and it is possible to reduce a process load in the DL communication.

4-3. Modification Examples

The third embodiment of the present disclosure has been described above. Also, the present embodiment is not limited to the above-described examples. Hereinafter, modification example of the present embodiment will be described.

Figure 22:
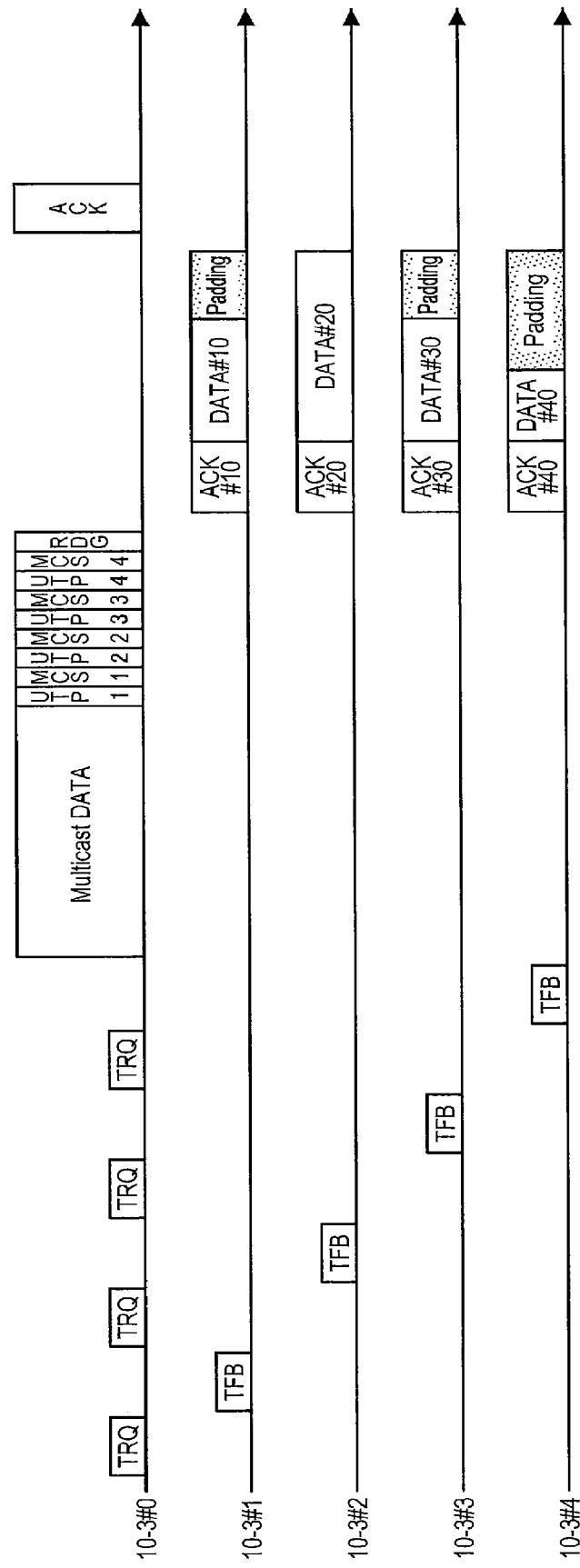
FIG. 22 is a diagram showing an example of a frame exchange sequence performed by a communication system according to a modification example of the present embodiment.

According to a modification example of the present embodiment, the master station may perform the DL communication with the slave stations using multicasting instead of frame aggregation. Processes of the master station and the slave stations according to the present modification will be described with reference to FIG. 22. FIG. 22 is a diagram showing an example of a frame exchange sequence performed by a communication system according to the modification example of the present embodiment.

The master station sequentially exchanges the TRQ frame and the TFB frame with each slave station. Also, the frames may be exchanged en block with the slave stations.

Subsequently, the master station generates a trigger frame which is a multicast frame including information regarding each slave station and transmits the trigger frame to each slave station. For example, the trigger frame includes a multicast data portion and the RDG information common to the slave stations and includes the UTP information and the MCS information regarding each slave station, as shown in FIG. 22.

Also, when none of the multicast members are uplink multiplex communication targets, information indicating the slave station which is the uplink multiplex communication target (hereinafter also referred to as multiplex communication target information) is included in the trigger frame. In addition, when the multiplex communication target information is not included in the trigger frame, the slave station which is a destination of the TRQ frame or the slave station indicated by a separate frame may be considered to be the uplink multiplex communication target.

Subsequently, each slave station transmits the UL frame to the master station. For example, when the multiplex communication target information is included in the trigger frame, the slave station receiving the trigger frame determines whether the multiplex communication target information includes the slave station. When the slave station determines that the multiplex communication target information includes the slave station, the slave station generates and transmits the UL frame. Each UL frame is consequently subjected to space multiplexing.

Conversely, when the multiplex communication target information is not included in the trigger frame and all of the multicast members are the multiplex communication targets, the slave stations generate and transmit the UL frames without performing the determination. In addition, when none of the multicast members are multiplex communication targets, the slave stations generate and transmit the UL frames on the basis of whether each slave station are the slave station indicated by the TRQ frame or a separate frame.

Subsequently, the master station transmits an ACK frame to the received UL frame to each slave station. For example, as shown in FIG. 22, the ACK frames are multicast to the slave stations 10-3#1 to 10-3#4. Also, as in the first embodiment, the ACK frames may be transmitted through the space division multiplex communication or may be transmitted through the frame aggregation.

In this way, according to the modification example of the present embodiment, the master station performs the DL communication with the slave stations using the multicasting instead of the frame aggregation. Therefore, when content transmitted to each slave station is duplicated, a frame length is further reduced than in the frame aggregation, and it is possible to efficiently use communication resources.

5. FOURTH EMBODIMENT (EXAMPLE IN WHICH TRANSMISSION POWER IS NOTIFIED WITH POLL FRAME)

The communication apparatus 10-3 according to the third embodiment of the present disclosure has been described above. Next, the communication apparatus 10-4 according to a fourth embodiment of the present disclosure will be described. In the fourth embodiment, a different frame from a data frame is used as a trigger frame.

5-1. Configuration of Apparatus

A functional configuration of the communication apparatus 10-4 is substantially the same as the functional configuration according to the first embodiment, but some functions differ in both of a master station and a slave station. Also, the description of functions which are substantially the same as the functions of the first to third embodiments will be omitted.
((Function when Communication Apparatus Operates as Master Station))

First, functions when the communication apparatus 10-4 operates as the master station will be described in detail.
(Function of Notifying of Transmission Power for Uplink Multiplex Communication)

The control unit 17 notifies of transmission power for the uplink multiplex communication using polling for each slave station. Specifically, the control unit 17 causes the data processing unit 11 to periodically generate a poll frame for each slave station and causes the communication unit 12 to transmit the generated poll frame to each slave station.

The data processing unit 11 generates a poll frame including multiplex communication target information, the UTP information, and the RDG information as a trigger frame. Also, the poll frame may include the MCS information. In addition, the multiplex communication target information may not be included in the poll frame. In this case, a slave station which is a destination of the TRQ frame or a slave station indicated by a separate frame is considered to be an uplink multiplex communication target.
((Function when Communication Apparatus Operates as Slave Station))

Next, a function when the communication apparatus 10-4 operates as the slave station will be described in detail.

(Uplink Transmission Function)
The data processing unit 11 generates an UL frame as a response to the poll frame. For example, the data processing unit 11 generates a data frame on the basis of data to be transmitted and supplies the generated frame as the UL frame to the communication unit 12.

5-2. Process of Apparatus

Since a process flow according to the present embodiment is substantially the same as that of the processes according to the third embodiment, the description thereof will be omitted and only a frame exchange sequence will be described.
(Frame Exchange Sequence According to Present Embodiment)

Transmission and reception of frames performed in the communication system will be described with reference to FIG. 23.

Figure 23:
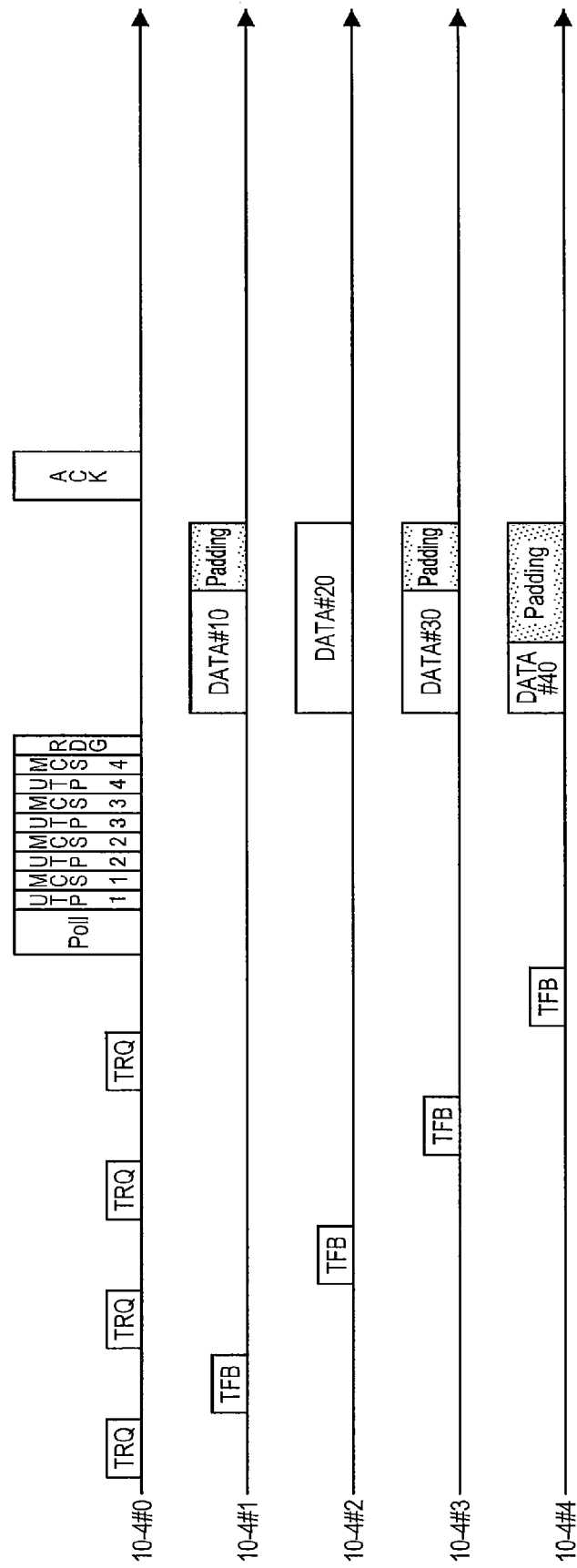
FIG. 23 is a diagram showing an example of a frame exchange sequence performed by a communication system according to a fourth embodiment of the present disclosure.

FIG. 23 is a diagram showing another example of a frame exchange sequence performed by a communication system according to the present embodiment.

The master station sequentially exchanges the TRQ frame and the TFB frame with each slave station. Also, the frames may be exchanged en block with the slave stations.

Subsequently, the master station transmits the poll frame in which data destined for each slave station which is the uplink multiplex communication target is stored to each slave station. For example, the poll frame includes a header, the UTP information, the MCS information, and the RDG information destined for each slave station which is the multiplex communication target shown in FIG. 23.

Subsequently, each slave station transmits the UL frame to the master station. For example, as shown in FIG. 23, the UL frame of the slave station 10-4#1 includes a data portion DATA#10 and a padding and does not include an ACK as in the first to third embodiments. Also, the UL frame is subjected to the space division multiplexing.

Subsequently, the master station transmits an ACK frame to the received UL frame to each slave station. For example, as shown in FIG. 23, the ACK frame is transmitted to each of the slave stations 10-4#1 to 10-4#4. Also, the ACK frame may be transmitted through the multiplex communication or may be transmitted using frame aggregation, multicasting, or the like.

In this way, according to the fourth embodiment of the present disclosure, the master station notifies of the transmission power for the uplink multiplex communication using polling for each slave station. Therefore, a known communication is used to notify of the transmission power for the uplink multiplex communication, and it is possible to avoid an increase in the number of communications. Also, a control frame or a management frame such as a beacon may be used as a trigger frame.

Also, the poll frame according to the present embodiment may be used in combination with another embodiment. For example, in another embodiment, the poll frame is used as a trigger frame in the slave stations for which there is no data to be transmitted through DL communication in the master station and a data frame can be used as a trigger frame in the other slave stations.

6. FIFTH EMBODIMENT (EXAMPLE IN WHICH TRANSMISSION POWER FOR CHANNEL ESTIMATION IS SHARED IN ADVANCE)

The communication apparatus 10-4 according to the fourth embodiment of the present disclosure has been described above. Next, a communication apparatus 10-5 according to a fifth embodiment of the present disclosure will be described. In the fifth embodiment, the TFB transmission power used for the TRQ/TFB frame exchange is shared in advance between the master station and the slave stations.

6-1. Configuration of Apparatus

A functional configuration of the communication apparatus 10-5 is substantially the same as the functional configuration according to the first embodiment, but some functions differ in both of a master station and a slave station. Also, the description of functions which are substantially the same as the functions of the first to fourth embodiments will be omitted.
((Functions when Communication Apparatus Operates as Master Station))
First, functions when the communication apparatus 10-4 operates as the master station will be described in detail.
(Function of Sharing Transmission Power for Channel Information Acquisition in Advance)
The control unit 17 notifies the slave station of the TFB transmission power using a frame communicated earlier than the TRQ/TFB frame exchange. Specifically, the control unit 17 notifies the slave station of the TFB transmission power using a beacon. For example, the control unit 17 causes the data processing unit 11 to periodically generate a beacon including information indicating the TFB transmission power and causes the communication unit 12 to transmit the generated beacon to each slave station. Also, the TFB transmission power may differ in each slave station. In this case, information for matching each slave station with the TFB transmission power is included in the beacon.
(Function of Acquiring Channel Information)
The control unit 17 estimates a propagation attenuation amount on the basis of the reception power of the TFB frame and the TFB transmission power decided in advance. Specifically, the control unit 17 causes the communication unit 12 to transmit the TRQ frame to the slave station. When the TFB frame is received, the control unit 17 estimates a propagation attenuation amount on the basis of the reception power of the TFB frame and the TFB transmission power of which the slave station is notified using the beacon in advance. Also, the propagation attenuation amount is calculated using Equation 1 described above.
((Functions when Communication Apparatus Operates as Slave Station))
Next, functions when the communication apparatus 10-5 operates as the slave station will be described in detail.
(Function of Sharing Transmission Power for Channel Information Acquisition in Advance)
The control unit 17 retains the TFB transmission power of which the master station notifies using the frame communicated earlier than the TRQ/TFB frame exchange. Specifically, when the beacon including the information indicating the TFB transmission power is received from the master station, the control unit 17 stores the information indicating the TFB transmission power acquired from the beacon by the data processing unit 11 in a storage unit.
(Function of Acquiring and Supporting Channel Information)
When the TRQ frame addressed to the slave station is received from the master station, the control unit 17 causes the communication unit 12 to transmit the TFB frame using the TFB transmission power of which the communication unit 12 is notified in advance. Specifically, when the TRQ frame is received, the control unit 17 causes the data processing unit 11 to generate the TFB frame and causes the communication unit 12 to set the transmission power of the slave station to the TFB transmission power stored in the storage unit. Then, the communication unit 12 transmits the generated TFB frame with the set TFB transmission power to the master station.

6-2. Process of Apparatus

Since a process flow and a frame exchange sequence according to the present embodiment are substantially the same as the processes according to one of the first to fourth embodiments except for the process of sharing the transmission power for the channel information acquisition in advance, the description thereof will be omitted.

In this way, according to the fifth embodiment of the present disclosure, the master station receives the second frame transmitted with the transmission power of the second frame decided in advance and estimates the propagation attenuation amount on the basis of the reception power of the second frame and the transmission power of the second frame decided in advance. Therefore, additional information is not added to the TRQ/TFB frame, and thus it is possible to exchange the TRQ/TFB frame in conformity to a known protocol.

Also, the example in which the frame for sharing the TFB transmission power in advance is the beacon has been described above. However, the frame for sharing the TFB transmission power in advance may be another management frame such as an association response.

In addition, the example in which the master station notifies the slave station of the TFB transmission power in advance has been described above, but the slave station may notify the master station of the TFB transmission power in advance. For example, the slave station notifies the master station of the TFB transmission power in advance by including the TFB transmission power in the management frame such as an association request transmitted from the slave station. Subsequently, the slave station transmits the TFB frame with the TFB transmission power of which the master station is notified. Then, the master station estimates the propagation attenuation amount on the basis of the received reception power of the TFB frame and the TFB transmission power notified of in advance.

7. SIXTH EMBODIMENT (EXAMPLE IN WHICH LENGTH OF TRANSMISSION PERIOD OF FRAME IS ADJUSTED)

The communication apparatus 10-5 according to the fifth embodiment of the present disclosure has been described above. Next, a communication apparatus 10-6 according to a sixth embodiment of the present disclosure will be described. In the sixth embodiment, a permission transmission period of a frame notified as the RDG information is optimized.

7-1. Configuration of Apparatus

A functional configuration of the communication apparatus 10-6 is substantially the same as the functional configuration according to the first embodiment, but some functions differ in both of a master station and a slave station. Also, the description of functions which are substantially the same as the functions of the first to fifth embodiments will be omitted.

((Functions when Communication Apparatus Operates as Master Station))

First, functions when the communication apparatus 10-6 operates as the master station will be described in detail.

(Function of Deciding Frame Transmission Period for Uplink Multiplex Communication)

The control unit 17 decides the permission transmission period, that is, the RDG information, on the basis of information (hereinafter also referred to as reverse direction request (RDR) information) indicating a transmission period of the frames requested by the plurality of slave stations (hereinafter, a request transmission period). Specifically, the RDR information indicates a time length desired to be used to transmit user data retained by each slave station. In addition, the user data may be a data frame or may be a management frame or a control frame. Then, the control unit 17 decides the permission transmission period on the basis of a transmission period longer than the other transmission periods (hereinafter also referred to as $R_{max}$) among transmission periods indicated by the pieces of RDR information included in the TFB frames received from the slave stations.

For example, the control unit 17 decides a permission transmission period expressed by an equation $R_{max}+T_{ack}$. Here, $T_{ack}$ indicates an ACK transmission period for a trigger frame from the master station to the slave station. Also, a modulation scheme or a modulation speed of the ACK frame is assumed to be the same in each slave station.

Also, the example in which the control unit 17 decides the permission transmission period on the basis of $R_{max}$ has been described above. However, the control unit 17 may decide the permission transmission period on the basis of a mode in the transmission period indicated by each piece of RDR information included in the TFB frame transmitted from the slave station. In this case, in accordance with a bias of the transmission period indicated by the RDR information, utilization efficiency of communication resources can be further improved than when the UL frame is transmitted from the slave station using the permission transmission period based on $R_{max}$, that is, the maximum value.

In addition, the example in which the RDR information is the information indicating the transmission period has been described above. However, the RDR information may be information with which the transmission period can be calculated. For example, the RDR information may be a pair of information indicating an amount of data to be transmitted and information indicating a modulation speed. In addition, the example in which the RDR information is the information indicating the transmission period has been described above. However, the RDR information may be information obtained by quantizing the transmission period at predetermined grading.

(Function of Notifying Division of Frame for Uplink Multiplex Communication)

Further, the control unit 17 notifies the slave station of information for giving an instruction to divide the UL frame to be transmitted by the slave station. Specifically, when one of the TFB frames including the RDR information indicates that the slave station has not transmitted the UL frame as a response to the trigger frame, the control unit 17 causes the data processing unit 11 to generate a trigger frame including information for giving an instruction to transmit an ACK frame to the trigger frame for an independent transmission period (hereinafter also referred to as ACK independent instruction information).

For example, the control unit 17 determines whether the request transmission period indicated by the RDR information included in the TFB frame received from the slave station is 0 or a value equivalent to 0. When the control unit 17 determines that the request transmission period is 0 or a value equivalent to 0, the control unit 17 instructs the data processing unit to generate a trigger frame including the ACK independent instruction information.

The data processing unit generates the trigger frame including the ACK independent instruction information on the basis of the instruction from the control unit 17. For example, the trigger frame includes a flag Split_Ack_Flag as the ACK independent instruction information. For example, when the control unit 17 instructs the data processing unit 11 to generate the trigger frame including the ACK independent instruction information, the data processing unit 11 inserts flag information indicating that the flag is turned on, that is, Split_Ack_Flag=1, into a predetermined position of the trigger frame, for example, a part of a reserved region in a MAC header. Also, the insertion position of the flag is not limited thereto. For example, another dedicated field may be added to the trigger frame and the flag may be inserted into the added field.

In addition, the data processing unit 11 includes information indicating two kinds of permission transmission periods in the trigger frame. Specifically, the data processing unit 11 includes $RDG_0$ information indicating the permission transmission period of the ACK frame decided by the control unit 17 and $RDG_1$ information indicating the permission transmission period of the ACK frame and the UL frame in the trigger frame. Also, when the permission transmission period of the ACK frame is known in the slave station, the data processing unit 11 may not include the $RDG_0$ information in the trigger frame. In addition, the data processing unit 11 may not include the $RDG_1$ information in the trigger frame involved in the slave station in which the request transmission period is 0. In addition, the $RDG_1$ information can include a transmission interval $T_{IFS}$ between the ACK frame and the data frame.

Also, when the control unit 17 instructs the data processing unit 11 to generate a trigger frame not including the ACK independent instruction information, the data processing unit 11 inserts flag information indicating that the flag is turned off, that is, Split_Ack_Flag=0, into the trigger frame. In addition, the data processing unit 11 includes the RDG information indicating the permission transmission period calculated with the equation $R_{max}+T_{ack}$ in the trigger frame.

((Functions when Communication Apparatus Operates as Slave Station))

Next, functions when the communication apparatus 10-6 operates as the slave station will be described in detail.

(Function of Deciding and Supporting Frame Transmission Period for Uplink Multiplex Communication)

The control unit 17 controls a process of notifying the master station of the request transmission period. Specifically, the control unit 17 decides the request transmission period on the basis of the amount of data to be transmitted and generates the RDR information indicating the decided request transmission period. Then, the control unit 17 causes the data processing unit 11 to generate the TFB frame including the RDR information. For example, the control unit 17 calculates the amount of data to be transmitted by referring to a transmission buffer. Then, the control unit 17 decides the request transmission period on the basis of the calculated amount of data and a modulation scheme and generates the RDR information indicating the decided request transmission period.

(Function of Dividing Frame for Uplink Multiplex Communication)

When information for giving an instruction to divide the UL frame is included in the trigger frame, the control unit 17 gives an instruction to divide the UL frame. Specifically, when the ACK independent instruction information is included in the trigger frame, the control unit 17 instructs the data processing unit 11 to generate an ACK frame as a confirmation response to be transmitted individually. In addition, the control unit 17 instructs the data processing unit 11 to generate the UL frame not including an ACK frame.

Then, when the UL frame is divided, the control unit 17 causes the communication unit 12 to transmit each of the divided frames during each permission transmission period. Specifically, when both the ACK frame and the data frame are separately generated, the control unit 17 causes the communication unit 12 to first transmit only the ACK frame to the master station during the permission transmission period indicated by the $RDG_0$ information. Subsequently, the control unit 17 causes the communication unit 12 to transmit the data frame to the master station during the permission transmission period indicated by the $RDG_1$ information.

Also, the example in which the ACK frame is transmitted before the transmission of the data frame has been described above. However, the ACK frame may be transmitted after the transmission of the data frame.

The data processing unit 11 determines whether the ACK independent instruction information is included in the trigger frame. Specifically, the data processing unit 11 determines whether it is indicated that the flag information included in the trigger frame is turned on, that is, Split_Ack_Flag=1. When the data processing unit 11 determines that the flag is turned on, the data processing unit 11 notifies the control unit 17 that the ACK independent instruction information is included in the trigger frame.

In addition, the data processing unit 11 generates the ACK frame and the UL frame on the basis of the instruction from the control unit 17. Specifically, the data processing unit 11 first generates the ACK frame to the trigger frame on the basis of the $RDG_0$ information. Subsequently, when there is data to be transmitted to the master station, the data processing unit 11 generates the data frame on the basis of the $RDG_1$ information. At this time, the data frame is generated in consideration of the ACK transmission period and the transmission interval $T_{IFS}$ between the ACK frame and the data frame.

7-2. Process of Apparatus

Figure 24:
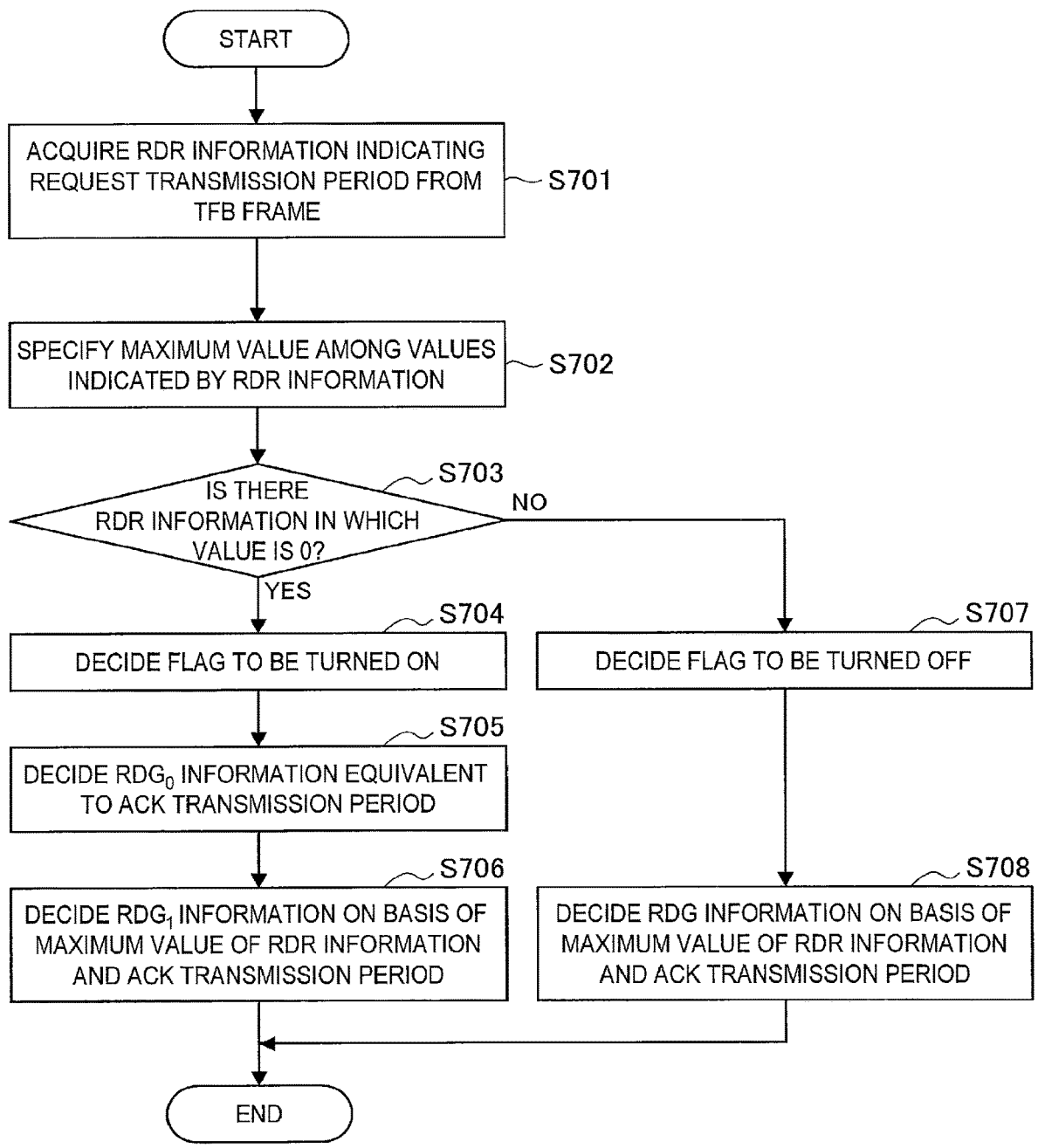
FIG. 24 is a flowchart conceptually showing a process of deciding a frame transmission period for uplink multiplex communication in a master station according to a sixth embodiment of the present disclosure.
Figure 25:
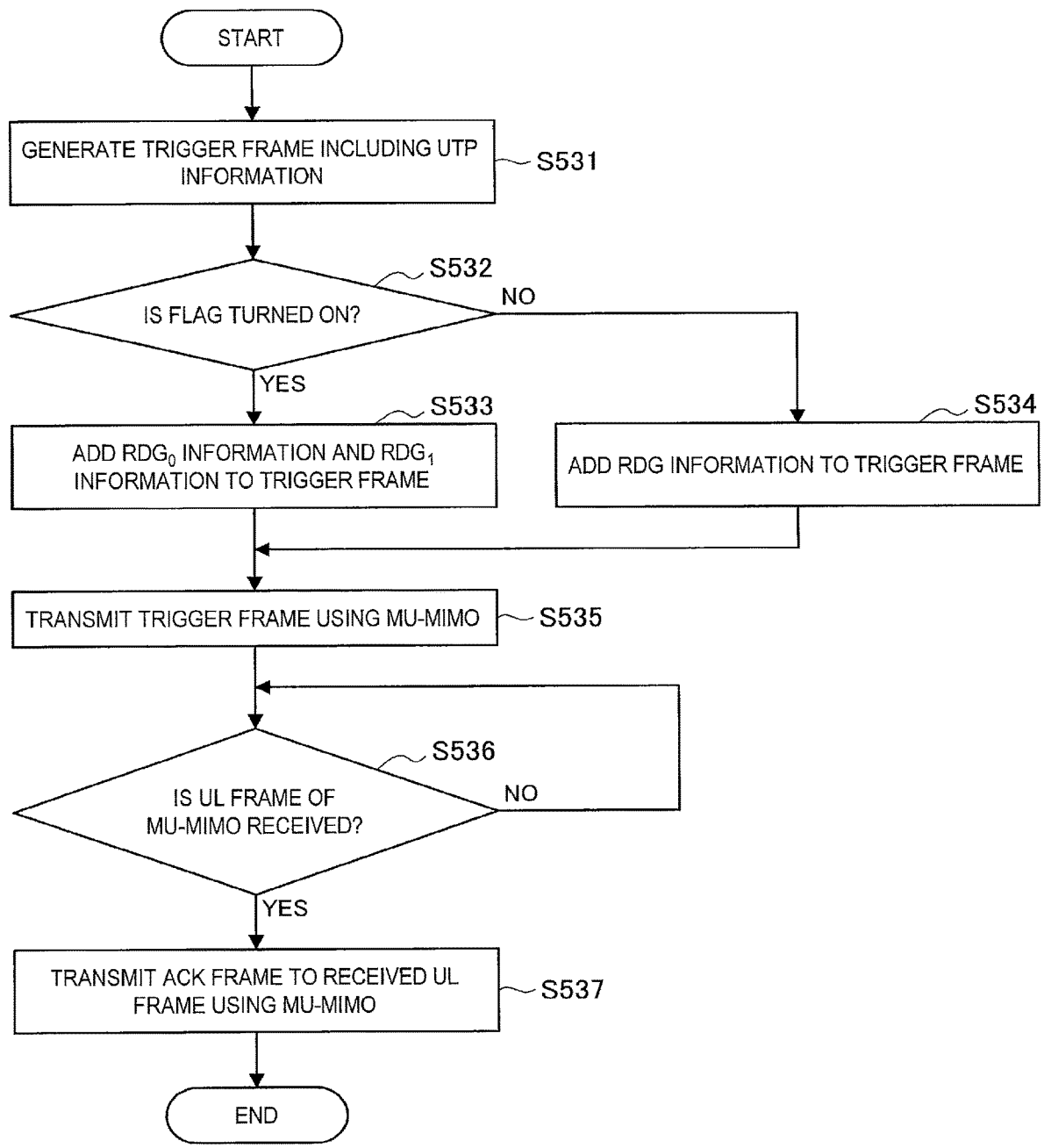
FIG. 25 is a flowchart conceptually showing a process of the master station in an uplink multiplex communication process according to the present embodiment.
Figure 26:
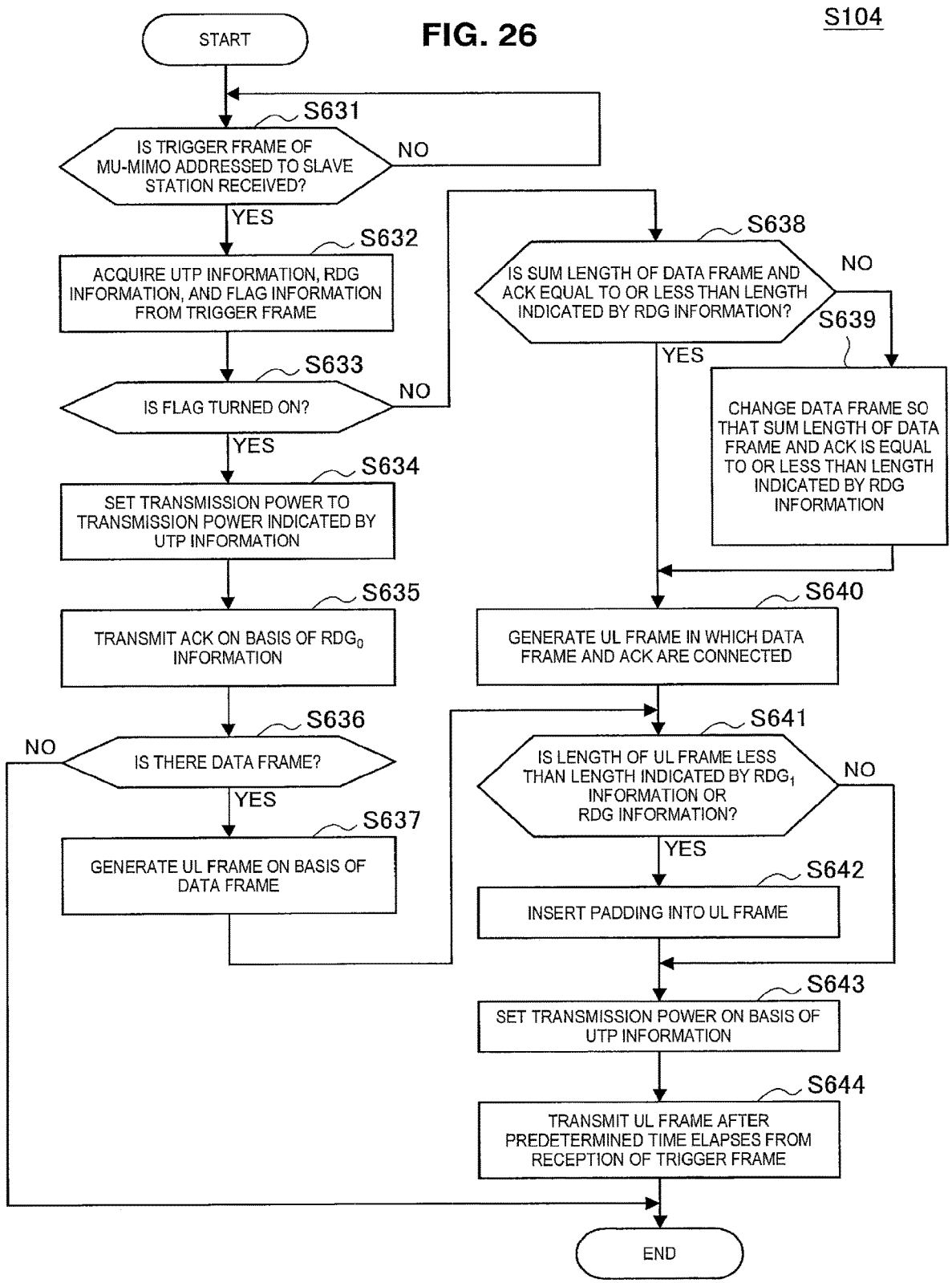
FIG. 26 is a flowchart conceptually showing a process of the slave station in the uplink multiplex communication process according to the present embodiment.

Next, processes of the communication apparatus 10-6 according to the present embodiment will be described with reference to FIGS. 24 to 26. Also, the description of substantially the same processes as the processes according to the first to fifth embodiments will be omitted.

(Flow of Process of Deciding Frame Transmission Period for Uplink Multiplex Communication)

First, a process of deciding the frame transmission period for the uplink multiplex communication performed before or after step S103 in FIG. 5 will be described with reference to FIG. 24. FIG. 24 is a flowchart conceptually showing the process of deciding the frame transmission period for uplink multiplex communication in the master station according to the present embodiment.

The master station acquires the RDR information indicating the request transmission period from the TFB frame (step S701). Specifically, when the TFB frame is received, the data processing unit 11 acquires the RDR information from the TFB frame.

Subsequently, the master station specifies a maximum value among values indicated by the RDR information (step S702). Specifically, the control unit 17 specifies the maximum value of the request transmission period from the RDR information acquired by the data processing unit 11.

Subsequently, the master station determines whether there is the RDR information in which the value is 0 (step S703). Specifically, for each piece of RDR information, the control unit 17 determines whether there is the RDR information in which the value is 0. Also, the process of the present step may be performed together with step S702.

When it is determined that there is the RDR information in which the value is 0, the master station decides the flag to be turned on (step S704). Specifically, when the control unit 17 determines that there is the RDR information in which the value is 0, the control unit 17 generates flag information indicating Split_Ack_Flag=1.

Subsequently, the master station decides the $RDG_0$ information equivalent to the ACK transmission period (step S705). Specifically, the control unit 17 decides the $RDG_0$ information indicating the transmission period of the ACK frame to be transmitted from the slave station as a response to the trigger frame.

Subsequently, the master station decides the $RDG_1$ information on the basis of the maximum value of the RDR information and the ACK transmission period (step S706). Specifically, the control unit 17 decides a sum of the maximum value of the RDR information, the ACK transmission period, and a standby time from transmission of the ACK frame to transmission of the UL frame as the $RDG_1$ information.

When it is determined in step S703 that there is no RDR information in which the value is 0, the master station decides the flag to be turned off (step S707). Specifically, when it is determined that there is no RDR information in which the value is 0, the control unit 17 generates the flag information indicating Split_Ack_Flag=0.

Subsequently, the master station decides the RDG information on the basis of the maximum value of the RDR information and the ACK transmission period (step S708). Specifically, the control unit 17 decides a sum of the maximum value of the RDR information and the ACK transmission period as the RDG information.

(Flow of Uplink Multiplex Communication Process)

Next, the details of an uplink multiplex communication process which is the process of step S104 in FIG. 5 will be described. First, a process of the master station in the uplink multiplex communication process will be described with reference to FIG. 25. FIG. 25 is a flowchart conceptually showing a process of the master station in an uplink multiplex communication process according to the present embodiment.

The master station generates a frame including the UTP information (step S531) and determines whether the flag is turned on (step S532). Specifically, the control unit 17 determines whether the flag information indicating Split_Ack_Flag=1 is generated.

When it is determined that the flag is turned on, the master station adds the $RDG_0$ information and the $RDG_1$ information to the trigger frame (step S533). Specifically, when it is determined that the flag information indicating Split_Ack_Flag=1 is generated, the control unit 17 causes the data processing unit 11 to add the $RDG_0$ information and the $RDG_1$ information to the trigger frame.

Conversely, when it is determined that the flag is turned off, the master station adds the RDG information to the trigger frame (step S534). Specifically, when it is determined that the flag information indicating Split_Ack_Flag=0 is generated, the control unit 17 causes the data processing unit 11 to add the RDG information to the trigger frame.

Subsequently, the master station transmits the trigger frame using MU-MIMO (step S535) and stands by until the UL frame multiplexed with MU-MIMO is received from the slave station (step S536). When the UL frame of MU-MIMO is received, the master station transmits ACK to the UL frame using MU-MIMO (step S537).

Subsequently, a process of the slave station in the uplink multiplex communication process will be described with reference to FIG. 26. FIG. 26 is a flowchart conceptually showing a process of the slave station in the uplink multiplex communication process according to the present embodiment.

The slave station stands by until the trigger frame addressed to the slave station and transmitted using MU-MIMO is received (step S631). When the trigger frame addressed to the slave station is received, the UTP information, the RDG information, and the flag information are acquired from the trigger frame (step S632). Specifically, the data processing unit 11 acquires the UTP information, the $RDG_0$ information and the $RDG_1$ information or the RDG information, and the flag information from the received trigger frame.

Subsequently, the slave station determines whether the flag is turned on (step S633). Specifically, the control unit 17 determines whether the acquired flag information indicates Split_Ack_Flag=1.

When it is determined that the flag is turned on, the slave station sets transmission power on the basis of the UTP information (step S634). Specifically, when it is determined that the flag information indicates Split_Ack_Flag=1, the control unit 17 causes the communication unit 12 to set the transmission power of the slave station on the basis of the acquired UTP information.

Subsequently, the slave station transmits ACK on the basis of the $RDG_0$ information (step S635). Specifically, the control unit 17 causes the data processing unit 11 to generate the ACK frame and causes the communication unit 12 to transmit the ACK frame to the master station within the transmission period indicated by the $RDG_0$ information.

Subsequently, the slave station determines whether there is a data frame (step S636). Specifically, the control unit 17 determines whether there is the data frame to be transmitted with reference to a data buffer.

When the slave station determines that there is a data frame, the slave station generates the UL frame on the basis of the data frame (step S637). Specifically, when it is determined that there is a data frame to be transmitted, the control unit 17 causes the data processing unit 11 to generate the data frame as the UL frame. Conversely, when the slave station determines in step S636 that there is not data frame, the slave station ends the present process. In this case, the data frame is not transmitted.

Processes of steps S638 to S644 are substantially the same as the processes of steps S603 to S609 according to the first embodiment.

(Frame Exchange Sequence According to Present Embodiment)

Figure 27:
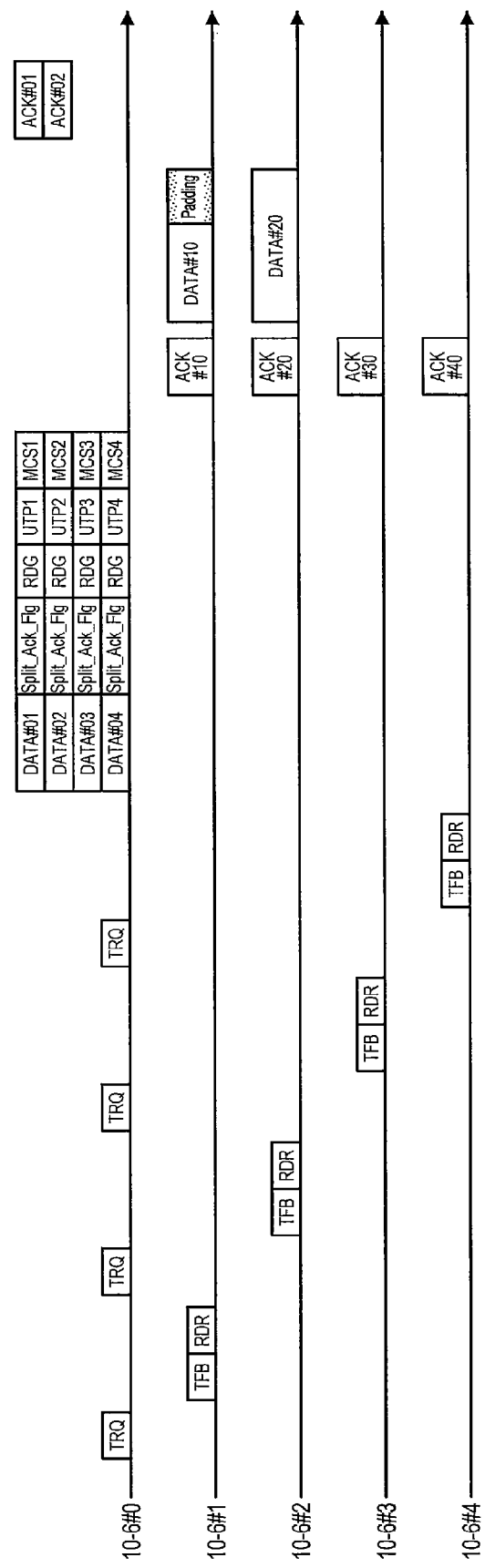
FIG. 27 is a diagram showing an example of a frame exchange sequence performed by a communication system according to the present embodiment.

The processes of the communication system and the communication apparatus 10-6 according to the present embodiment have been described above. Subsequently, transmission and reception of frames performed in the communication system will be described with reference to FIG. 27. FIG. 27 is a diagram showing an example of a frame exchange sequence performed by a communication system according to the present embodiment.

The master station sequentially performs exchanging the TRQ frame and the TFB frame with each slave station. For example, the RDR information of each slave station 10-6 is added to each TFB frame, as shown in FIG. 27. Also, the frames may be exchanged en block with the slave stations.

Subsequently, the master station transmits the trigger frame to each slave station using the space division multiplex communication. For example, the trigger frame includes Split_Ack_Flag as the flag information in addition to the data portion, the RDG information, the UTP information, and the MCS information, as shown in FIG. 27.

Subsequently, each slave station transmits the ACK frame to the master station and subsequently transmits the data frame as the UL frame to the master station. For example, each of the slave stations 10-6#1 to 10-6#4 first transmits the ACK frame to the master station. Then, only the slave stations 10-6#1 and 10-6#2 having the data frames transmit the data frames to the master station 10-6#0 after a predetermined time elapses from the transmission of the ACK frame. Also, the slave stations 10-6#3 and 10-6#4 do not transmit the subsequent UL frames. This is because the slave stations 10-6#3 and 10-6#4 do not have data to be transmitted.

Subsequently, when the UL frame is received, the master station transmits the ACK frames to transmission sources of the UL frames. For example, the master station 10-6#0 transmits the ACK frames to the received UL frames to the slave stations 10-6#1 and 10-6#2. Also, FIG. 27 shows an example in which the ACK frames are subjected to the space division multiplexing, but the ACK frames may be transmitted using frame aggregation, multicasting, or the like.

In this way, according to the sixth embodiment of the present disclosure, the master station receives the frame including the request transmission period information indicating the transmission period of the frame requested by the slave station from the slave station and decides the permission transmission period on the basis of the transmission period indicated by the request transmission period information. Therefore, since the permission transmission period in accordance with the transmission period scheduled by the slave station is directly decided, it is possible to optimize the permission transmission period and realize more efficient use of communication resources.

In addition, when the frame including the request transmission period information indicates that the frame is not transmitted as the response to the frame including the transmission power information, the master station includes information for giving an instruction to transmit the transmission power information during an independent transmission period of a confirmation response to the frame including the transmission power information in the frame including the transmission power information. Therefore, since the slave station in which there is no data to be transmitted transmits only the ACK frame, the transmission period is optimized. Thus, it is possible to realize efficient utilization of communication resources and reduce a power consumption amount in the slave station.

8. APPLICATION EXAMPLES

The technology according to the present disclosure can be applied to various products. For example, the communication apparatus 10 operating as the slave station may be realized as a mobile terminal such as a smartphone, a tablet personal computer (PC), a notebook type PC, a portable game terminal, or a digital camera, a fixed terminal such as a television receiver, a printer, a digital scanner or a network storage, or an in-vehicle terminal such as a car navigation apparatus. In addition, the slave station may be realized as a terminal (also referred to as a machine type communication (MTC) terminal) that performs machine to machine (M2M) communication, such as a smart meter, a vending machine, a remote monitoring apparatus, or a point of sale (POS) terminal. Further, the slave station may be a wireless communication module (for example, an integrated circuit module configured with one die) mounted on the terminal.

On the other hand, for example, the communication apparatus 10 operating as the master station may be realized as a wireless LAN access point (also referred to as a wireless base station) that has a router function or does not have a router function. In addition, the master station may be realized as a mobile wireless LAN router. Further, the master station may be a wireless communication module (for example, an integrated circuit module configured with one die) mounted on the apparatus.

8-1. First Application Example

Figure 28:
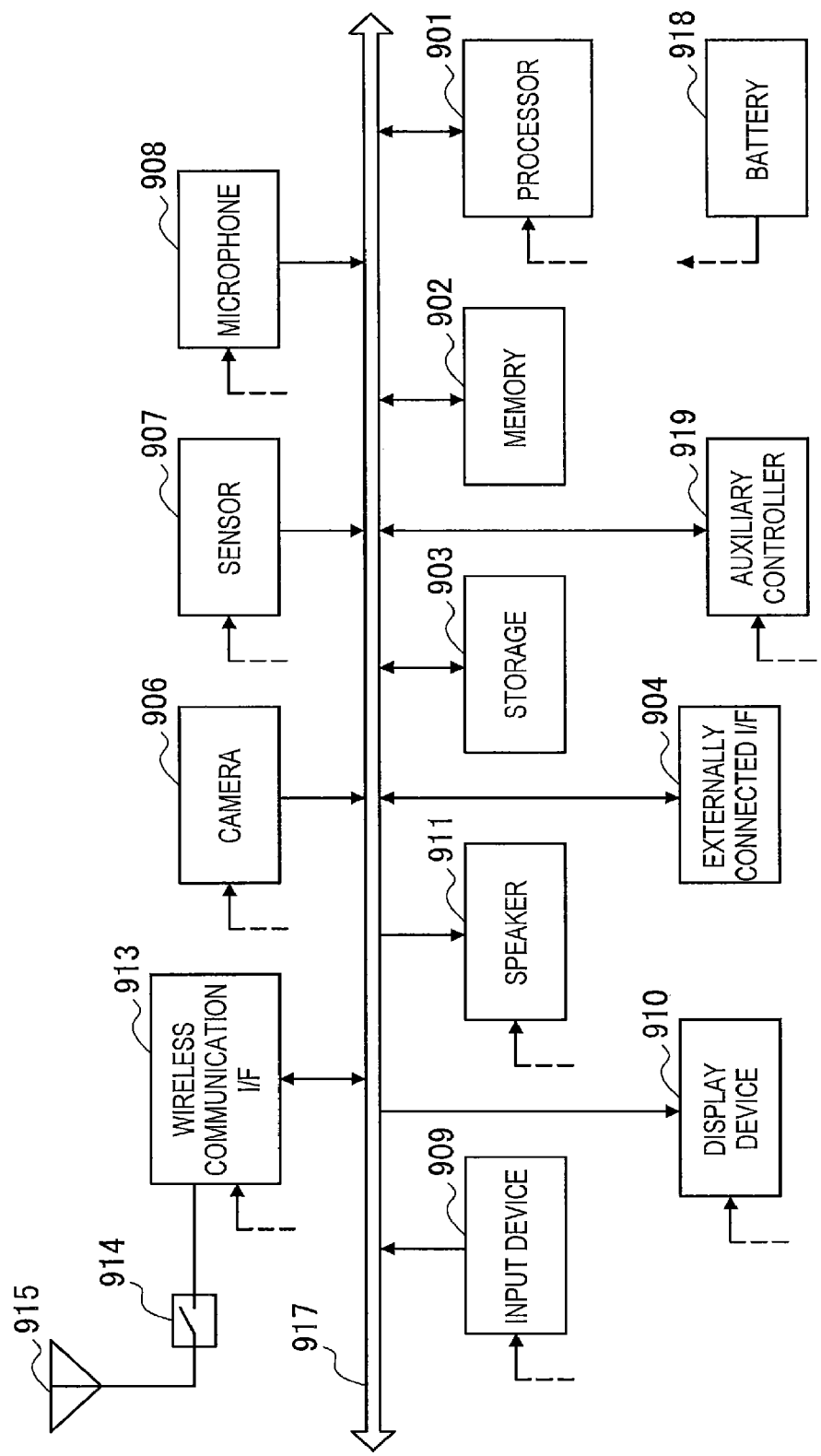
FIG. 28 is a block diagram showing an example schematic configuration of a smartphone.

FIG. 28 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 28. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 28 via power supply lines partially indicated by dashed lines in the drawing. The auxiliary controller 919 causes, for example, necessary minimum functions of the smartphone 900 to be operated in a sleep mode.

In the smartphone 900 shown in FIG. 28, the data processing unit 11, the communication unit 12, and the control unit 17 described with reference to FIG. 2 may be mounted on the wireless communication interface 913. In addition, at least some of the functions may be mounted on the processor 901 or the auxiliary controller 919. For example, the control unit 17 sets transmission power of the own apparatus on the basis of the transmission power for multiplex communication in a wireless LAN decided on the basis of information obtained through reception from the smartphone 900. Then, the communication unit 12 receives a frame including the transmission power information indicating the transmission power for the multiplex communication and transmits the frame with the transmission power set on the basis of the transmission power information by the control unit 17. Thus, it is possible to suppress deterioration in reception characteristics of multiplexed frames to be transmitted in the smartphone 900 in the wireless LAN.

Note that the smartphone 900 may operate as a wireless access point (software AP) as the processor 901 executes the function of an access point at an application level. In addition, the wireless communication interface 913 may have the function of a wireless access point.

8-2. Second Application Example

Figure 29:
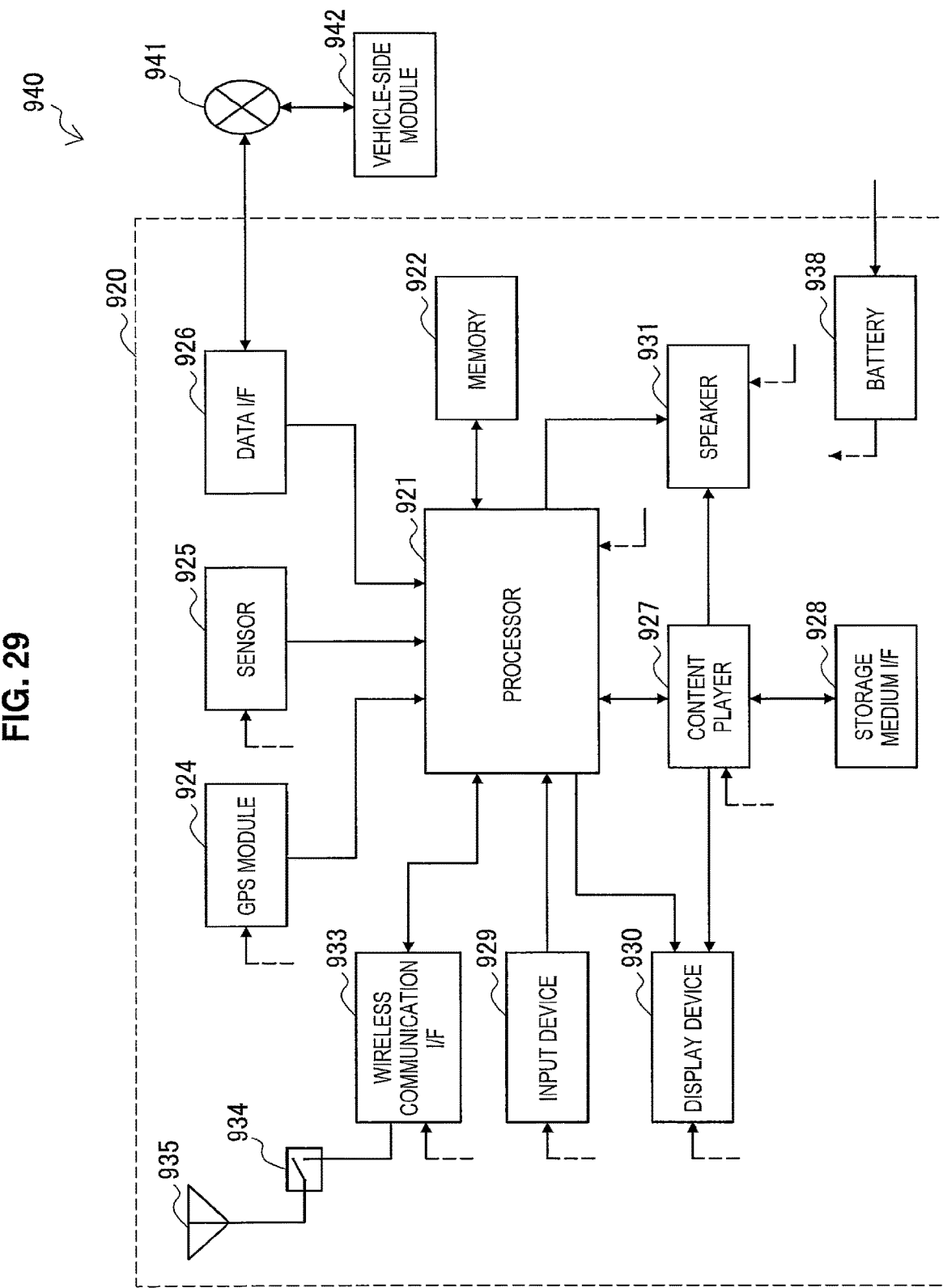
FIG. 29 is a block diagram showing an example schematic configuration of a car navigation device.

FIG. 29 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 29. In this case, the antenna switch 934 may be omitted from the configuration of the car navigation device 920.

The battery 938 supplies electric power to each of the blocks of the car navigation device 920 shown in FIG. 29 via power supply lines partially indicated by dashed lines in the drawing. In addition, the battery 938 accumulates electric power supplied from the vehicle.

In the car navigation device 920 shown in FIG. 29, the data processing unit 11, the communication unit 12, and the control unit 17 described with reference to FIG. 2 may be mounted on the wireless communication interface 933. In addition, at least some of the functions may be mounted on the processor 921. For example, the control unit 17 sets transmission power of the own apparatus on the basis of the transmission power for multiplex communication in a wireless LAN decided on the basis of information obtained through reception from the car navigation device 920. Then, the communication unit 12 receives a frame including the transmission power information indicating the transmission power for the multiplex communication and transmits the frame with the transmission power set by the control unit 17. Thus, it is possible to suppress deterioration in reception characteristics of multiplexed frames to be transmitted in the car navigation device 920 in the wireless LAN.

In addition, the wireless communication interface 933 may operate as the above-described master station and provide wireless connection to a terminal carried by a user getting on a vehicle. At this time, for example, the control unit 17 decides transmission power for multiplex communication in a wireless LAN on the basis of information obtained through reception from another communication apparatus. Then, the data processing unit 11 generates a frame including the transmission power information indicating the transmission power for the multiplex communication decided by the control unit 17. Further, the communication unit 12 transmits the frame generated by the data processing unit 11 to the other communication apparatus. Thus, it is possible to suppress deterioration in reception characteristics of multiplexed frames received from the other communication apparatus in the car navigation device 920 in the wireless LAN.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

8-3. Third Application Example

Figure 30:
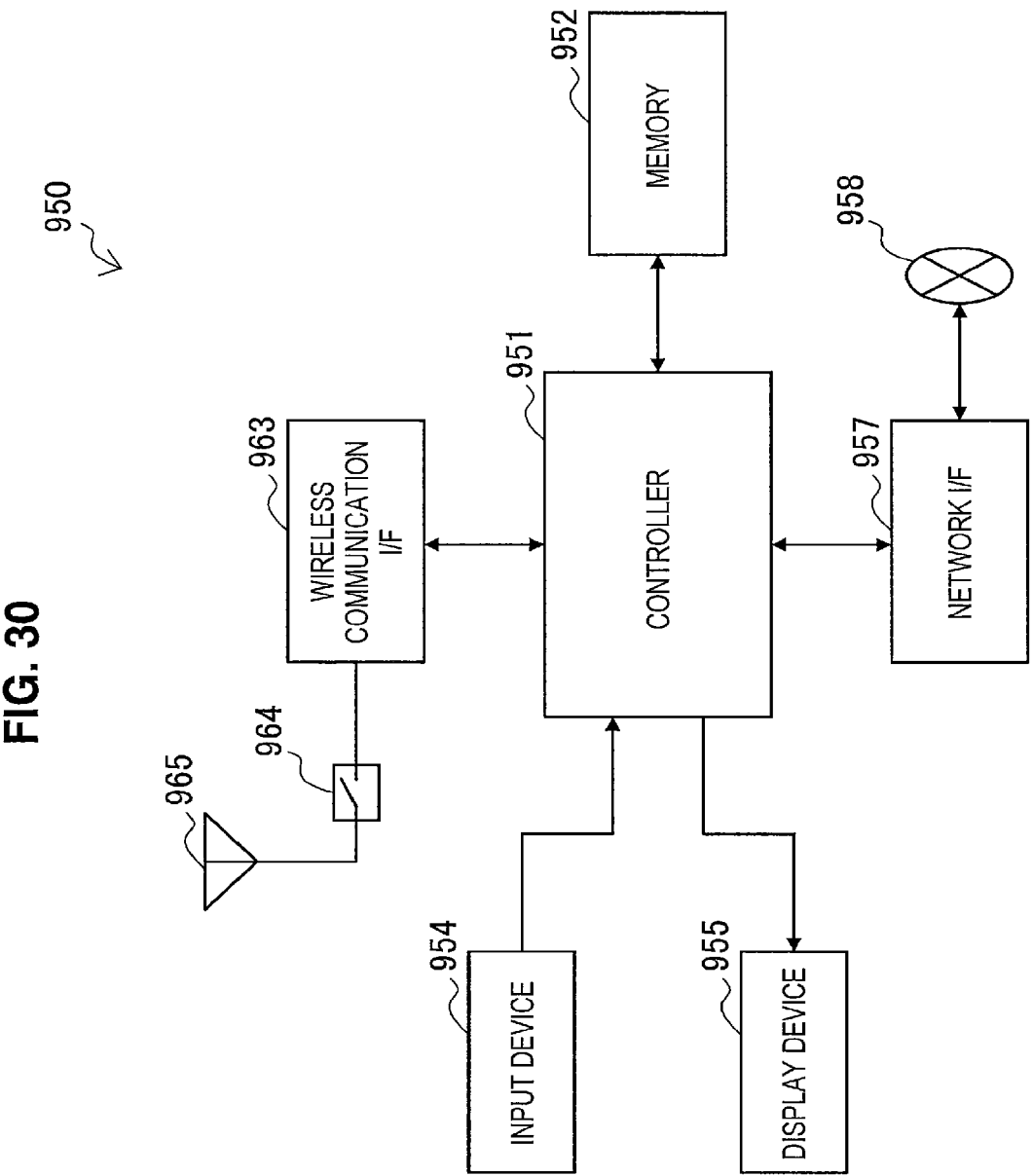
FIG. 30 is a block diagram showing an example schematic configuration of a wireless access point.

FIG. 30 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 30, the data processing unit 11, the communication unit 12, and the control unit 17 described with reference to FIG. 2 may be mounted on the wireless communication interface 963. In addition, at least some of the functions may be mounted on the controller 951. For example, the control unit 17 decides transmission power for multiplex communication in a wireless LAN on the basis of information obtained through reception from another communication apparatus. Then, the data processing unit 11 generates a frame including the transmission power information indicating the transmission power for the multiplex communication decided by the control unit 17. Further, the communication unit 12 transmits the frame generated by the data processing unit 11 to the other communication apparatus. Thus, it is possible to suppress deterioration in reception characteristics of multiplexed frames received from the other communication apparatus in the wireless access point 950 in the wireless LAN.

9. CONCLUSION

As described above, according to the first embodiment of the present disclosure, since the transmission power of the multiplexed frames received from the slave station is controlled by the master station, the reception power of the frame is adjusted so that the frame is received normally. Thus, it is possible to suppress deterioration in reception characteristics of the multiplexed frames in the wireless LAN.

In addition, according to the second embodiment of the present disclosure, even in a communication apparatus which does not correspond to a space division multiplexing scheme, it is possible to suppress deterioration in reception characteristics of the multiplexed frames in a wireless LAN.

In addition, according to the third embodiment of the present disclosure, the slave station does not perform the TPC in the TRQ/TFB frame exchange unlike the case of the first embodiment and the reception power of the TRQ frame is not measured unlike the case of the second embodiment. As a result, it is possible to further simplify the processes in the slave station than in the first and second embodiments.

In addition, according to the fourth embodiment of the present disclosure, a known communication is used to notify of the transmission power for the uplink multiplex communication, and it is possible to avoid an increase in the number of communications.

In addition, according to the fifth embodiment of the present disclosure, additional information is not added to the TRQ/TFB frame, and thus it is possible to exchange the TRQ/TFB frame in conformity to a known protocol.

In addition, according to the sixth embodiment of the present disclosure, since the permission transmission period in accordance with the transmission period scheduled by the slave station is directly decided, it is possible to optimize the permission transmission period and realize more efficient use of communication resources.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiment, the process of separating the UL frame subjected to the space division multiplexing is performed using the antenna weight obtained through the TRQ/TFB frame exchange, but the present technology is not limited to this example. For example, the process of separating the UL frame may be performed using the reference signal in the UL frame. Specifically, the communication unit 12 acquires the antenna weight using the reference signal transmitted in the preamble of the UL frame and performs the process of separating a subsequent portion of the UL frame using the acquired antenna weight. Also, the reference signal can be encoded to be separable using an orthogonal code or the like different for each slave station.

In addition, in the foregoing embodiment, the example in which the TFB frames are sequentially transmitted in the slave stations has been described. However, the TFB frames may be transmitted at the same timing from the slave stations. For example, a reference signal part of the TFB frame is coded using an orthogonal code or the like and the master station separates the TFB frame on the basis of a coding method used for the coding and the coded reference signal. Then, the master station acquires the antenna weight on the basis of the reference signal of the TFB frame to be separated. Also, the coding method may be notified between the master station and the slave stations or may be shared in advance.

In addition, frame exchange equivalent to the TRQ/TFB frame exchange in the foregoing embodiment may be performed in RTS/CTS frame exchange or may be performed in exchange of a data frame and an ACK frame in the uplink multiplex communication. In addition, this frame exchange may be performed in exchange of an A-MPDU frame and a block ACK frame or may be performed in exchange independent of the frame exchange in the uplink multiplex communication.

In addition, the information indicating the TFB transmission power, the UTP information, and the like in the foregoing embodiment may be a transmission power value or may be information for calculating a transmission power value. For example, the UTP information or the like can be a request value for an increase or decrease in transmission power or information capable of specifying the request value.

In addition, the processes according to each of the foregoing embodiments and each modification example may be rearranged or combined. For example, the processes according to the sixth embodiment may be combined with the processes according to the first to fifth embodiments.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication control apparatus including:

a control unit configured to decide transmission power for multiplex communication in a wireless local area network (WLAN) on the basis of information obtained through reception from another communication apparatus;

a processing unit configured to generate a frame including transmission power information indicating the transmission power for the multiplex communication decided by the control unit; and a communication unit configured to transmit the frame generated by the processing unit to the other communication apparatus.

(2)

The communication control apparatus according to (1), in which the information obtained through the reception includes information that changes in accordance with a propagation path.

(3)

The communication control apparatus according to (2), in which the information that changes in accordance with the propagation path includes information indicating a propagation attenuation amount.

(4)

The communication control apparatus according to (3), in which, in communication of a first frame generated by the processing unit and a second frame received as a response to the first frame, the control unit estimates the propagation attenuation amount on the basis of power involved in the communication of the first frame or the second frame.

(5)

The communication control apparatus according to (4), in which the first frame includes second power information indicating transmission power of the second frame, the communication unit receives the second frame transmitted with the transmission power indicated by the second power information included in the first frame, and the control unit estimates the propagation attenuation amount on the basis of the transmission power indicated by the second power information and reception power of the second frame.

(6)

The communication control apparatus according to (4), in which the second frame includes second power information indicating transmission power of the second frame, the communication unit receives the second frame transmitted with the transmission power indicated by the second power information included in the second frame, and the control unit estimates the propagation attenuation amount on the basis of the transmission power indicated by the second power information and reception power of the second frame.

(7)

The communication control apparatus according to (4), in which the communication unit receives the second frame transmitted with pre-decided transmission power of the second frame, and the control unit estimates the propagation attenuation amount on the basis of the pre-decided transmission power of the second frame and reception power of the second frame.

(8)

The communication control apparatus according to (4), in which the second frame includes first power information indicating reception power of the first frame, and the control unit estimates the propagation attenuation amount on the basis of transmission power of the first frame and the reception power indicated by the first power information.

(9)

The communication control apparatus according to any one of (4) to (8), in which the first frame includes a frame indicating a request for a reference signal, and the second frame received as the response to the first frame includes a frame including the reference signal.

(10)

The communication control apparatus according to any one of (1) to (9), in which the control unit decides the transmission power for the multiplex communication for each frequency.

(11)

The communication control apparatus according to any one of (1) to (10), in which the control unit decides the transmission power for the multiplex communication on the basis of information indicating a modulation scheme and a coding scheme used for the multiplex communication.

(12)

The communication control apparatus according to any one of (1) to (11), in which the communication unit receives a frame including transmission power range information indicating a range of transmission power settable in the other communication apparatus, from the other communication apparatus, and the control unit decides transmission power which falls within the range indicated by the transmission power range information as the transmission power for the multiplex communication.

(13)

The communication control apparatus according to any one of (1) to (12), in which the frame including the transmission power information includes information indicating a permission transmission period in which a frame is permitted to be transmitted as a response to the frame including the transmission power information.

(14)

The communication control apparatus according to any one of (1) to (13), in which a multiplex scheme of the multiplex communication includes a space division multiplex scheme or a frequency division multiplex scheme.

(15)

A communication apparatus including:

a control unit configured to set transmission power of the own apparatus on the basis of transmission power information indicating transmission power for multiplex communication in a wireless local area network (WLAN) decided on the basis of information obtained through reception from the communication apparatus; and a communication unit configured to receive a frame including the transmission power information and transmit a frame with the transmission power set by the control unit.

(16)

The communication apparatus according to (15), further including:

a processing unit configured to generate a second frame including first power information indicating reception power of a first frame or second power information indicating transmission power of the second frame as a response to the first frame received from a transmission source of the transmission power information, in which the communication unit receives the first frame and transmits the second frame.

(17)

A communication control method including:

deciding, by a control unit, transmission power for multiplex communication in a wireless local area network (WLAN) on the basis of information obtained through reception from another communication apparatus;

generating a frame including transmission power information indicating the decided transmission power for the multiplex communication; and transmitting the generated frame to the other communication apparatus.

(18)

A communication method including:

receiving, by a communication unit, a frame including the transmission power information indicating transmission power of multiplex communication in a wireless local area network (WLAN);

setting transmission power of an own apparatus on the basis of the transmission power information decided on the basis of information obtained through reception from a communication apparatus; and transmitting a frame with the set transmission power.

(19)

A program causing a computer to realize:

a control function of deciding transmission power for multiplex communication in a wireless local area network (WLAN) on the basis of information obtained through reception from another communication apparatus;

a processing function of generating a frame including transmission power information indicating the transmission power for the multiplex communication decided through the control function; and a communication function of transmitting the frame generated by the processing function to the other communication apparatus.

(20)

A program causing a computer to realize:

a communication function of receiving a frame including transmission power information indicating transmission power for multiplex communication in a wireless local area network (WLAN);

a control function of setting transmission power of an own apparatus on the basis of the transmission power information decided on the basis of information obtained through reception from a communication apparatus; and a communication function of transmitting a frame with the set transmission power.

REFERENCE SIGNS LIST

10 communication apparatus
11 data processing unit
12 communication unit
13 signal processing unit
14 channel estimation unit
15 wireless interface unit
16 amplification unit

The invention claimed is:

1. A communication control apparatus, comprising:

control circuitry configured to decide transmission power information, for uplink multiplex communication from a plurality of communication apparatuses in a wireless local area network (WLAN), on a basis of information obtained through reception from the plurality of communication apparatuses;

processing circuitry configured to generate a trigger frame, which includes the transmission power information and modulation and coding scheme (MCS) information specific to each communication apparatus of the plurality of communication apparatuses, for setting a transmission power and setting an MCS of the uplink multiplex communication decided by the control circuitry; and communication circuitry configured to transmit, using multicasting, the trigger frame to each communication apparatus of the plurality of communication apparatuses; and receive a frame from each communication apparatus of the plurality of communication apparatuses transmitted with the transmission power and the MCS, wherein the control circuitry is further configured to decide a target reception power of the trigger frame used for setting the transmission power, the trigger frame further includes a multicast data portion and reverse direction grant (RDG) information common to each communication apparatus of the plurality of communication apparatuses, and the transmission power information indicates a transmission power range, settable by the control circuitry for a communication apparatus of the plurality of communication apparatuses, allowing the communication apparatus to set a transmission power for uplink transmission.

2. The communication control apparatus according to claim 1, wherein the information obtained through the reception includes information that changes in accordance with a propagation path.

3. The communication control apparatus according to claim 2, wherein the information that changes in accordance with the propagation path includes information indicating a propagation attenuation amount.

4. The communication control apparatus according to claim 3, wherein the control circuitry estimates the propagation attenuation amount on a basis of power involved in the communication of a first frame generated by the processing circuitry and a second frame received as a response to the first frame.

5. The communication control apparatus according to claim 4, wherein
the first frame includes second power information indicating a transmission power of the second frame,
the communication circuitry receives the second frame transmitted with the transmission power indicated by the second power information included in the first frame, and
the control circuitry estimates the propagation attenuation amount on a basis of the transmission power indicated by the second power information and a reception power of the second frame.

6. The communication control apparatus according to claim 4, wherein
the second frame includes second power information indicating a transmission power of the second frame,
the communication circuitry receives the second frame transmitted with the transmission power indicated by the second power information included in the second frame, and
the control circuitry estimates the propagation attenuation amount on a basis of the transmission power indicated by the second power information and a reception power of the second frame.

7. The communication control apparatus according to claim 4, wherein
the communication circuitry receives the second frame transmitted with a pre-decided transmission power of the second frame, and
the control circuitry estimates the propagation attenuation amount on a basis of the pre-decided transmission power of the second frame and a reception power of the second frame.

8. The communication control apparatus according to claim 4, wherein
the second frame includes first power information indicating a reception power of the first frame, and
the control circuitry estimates the propagation attenuation amount on a basis of transmission power of the first frame and the reception power indicated by the first power information.

9. The communication control apparatus according to claim 4, wherein
the first frame includes a frame indicating a request for a reference signal, and
the second frame is received as the response to the first frame.

10. The communication control apparatus according to claim 1, wherein the control circuitry decides the transmission power information for the uplink multiplex communication for each frequency band among a plurality of divided frequency bands.

11. The communication control apparatus according to claim 1, wherein the control circuitry decides the transmission power for the uplink multiplex communication on the basis of information indicating the MCS used for the uplink multiplex communication.

12. The communication control apparatus according to claim 1, wherein
the trigger frame further includes information indicating a first length of a first permission transmission period and a second length of a second permission transmission period,
in the first permission transmission period a first subsequent frame is permitted to be transmitted as a response to the trigger frame, and
in the second permission transmission period the first subsequent frame and a second subsequent frame are permitted to be transmitted.

13. The communication control apparatus according to claim 1, wherein the uplink multiplex communication includes a space division multiplex scheme or a frequency division multiplex scheme.

14. A communication control method executed in a communication control apparatus, the communication control method comprising:
deciding, by a control circuitry, transmission power information for uplink multiplex communication in a wireless local area network (WLAN) on a basis of information obtained through reception from a plurality of communication apparatuses;
generating a trigger frame, which includes the transmission power information and modulation and coding scheme (MCS) information specific to each communication apparatus of the plurality of communication apparatuses, for setting a transmission power and setting an MCS of the uplink multiplex communication;
transmitting, using multicasting, the trigger frame to each communication apparatus of the plurality of communication apparatuses;
receiving a frame from each communication apparatus of the plurality of communication apparatuses, transmitted with the transmission power and the MCS; and
deciding, by the control circuitry, a target reception power of the trigger frame used for setting the transmission power, wherein
the trigger frame further includes a multicast data portion and reverse direction grant (RDG) information common to each communication apparatus of the plurality of communication apparatuses, and
the transmission power information indicates a transmission power range, settable by the control circuitry for a communication apparatus of the plurality of communication apparatuses, allowing the communication apparatus to set a transmission power for uplink transmission.

* * * * *